(12) United States Patent
Shin et al.

(10) Patent No.: US 12,091,553 B2
(45) Date of Patent: Sep. 17, 2024

(54) CORE-SHELL DYE, NEAR-INFRARED ABSORBING COMPOSITION INCLUDING THE SAME, AND NEAR-INFRARED ABSORBING FILM

(71) Applicant: SAMSUNG SDI CO., LTD., Yongin-si (KR)

(72) Inventors: Insub Shin, Suwon-si (KR); Gyuseok Han, Suwon-si (KR); Euisoo Jeong, Suwon-si (KR); Chaehyuk Ko, Suwon-si (KR); Baek Soung Park, Suwon-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 18/083,652

(22) Filed: Dec. 19, 2022

(65) Prior Publication Data
US 2023/0348724 A1  Nov. 2, 2023

(30) Foreign Application Priority Data
Feb. 24, 2022 (KR) .......................... 10-2022-0024688

(51) Int. Cl.
*C09B 23/16* (2006.01)
*C08J 5/18* (2006.01)
(Continued)

(52) U.S. Cl.
CPC ............. *C09B 67/0011* (2013.01); *C08J 5/18* (2013.01); *C08K 9/04* (2013.01); *C09B 23/16* (2013.01);
(Continued)

(58) Field of Classification Search
CPC ... C09B 55/002; C09B 67/0001; C09B 23/16; C09B 67/0011; C09B 67/0063;
(Continued)

(56) References Cited

U.S. PATENT DOCUMENTS 5,312,722 A * 5/1994 Harada .................. G03C 1/832
430/944
2006/0292462 A1  12/2006 Seo et al.
(Continued)

FOREIGN PATENT DOCUMENTS

CN  107793327     3/2018
CN  108349280 A   7/2018
(Continued)

OTHER PUBLICATIONS

Liu et al., J. Phys. Chem. B, vol. 120, pp. 995-1001 (2016).
(Continued)

*Primary Examiner* — Bijan Ahvazi
(74) *Attorney, Agent, or Firm* — Lee IP Law, P.C.

(57) ABSTRACT

A core-shell dye, a near-infrared absorbing resin composition including the same, a near-infrared absorbing film, an optical filter, and a CMOS image sensor, the core-shell dye includes a core represented by Chemical Formula 1; and a shell surrounding the core, the shell being represented by Chemical Formula 2;

[Chemical Formula 1]

(Continued)

[Chemical Formula 2]

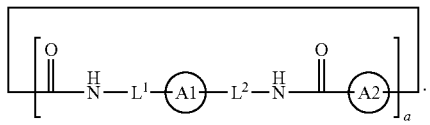

29 Claims, 1 Drawing Sheet

(51) Int. Cl.
 *C08K 9/04* (2006.01)
 *C09B 67/08* (2006.01)
 *C09B 67/20* (2006.01)
 *G02B 1/04* (2006.01)
 *G02B 5/20* (2006.01)
 *H04N 25/20* (2023.01)

(52) U.S. Cl.
 CPC ............ *C09B 67/0063* (2013.01); *G02B 1/04* (2013.01); *G02B 5/208* (2013.01); *C08J 2333/10* (2013.01); *H04N 25/20* (2023.01)

(58) Field of Classification Search
 CPC ........ G03F 7/0007; G03F 7/031; G03F 7/033; G02B 5/223; G02B 1/04; G02B 5/208; H10K 19/20; H10K 30/87; H10K 85/636; C08J 5/18; C08J 2333/10; C08K 9/04; H04N 25/20
 See application file for complete search history.

(56) References Cited

U.S. PATENT DOCUMENTS

2015/0118494 A1 4/2015 Vilner et al.
2015/0147275 A1* 5/2015 Ke .................. C07D 257/10
 424/9.1
2018/0311991 A1 11/2018 Kecht et al.
2019/0048196 A1* 2/2019 Kobzev .................. C09B 57/00
2019/0185407 A1 6/2019 Vogl et al.
2019/0256713 A1* 8/2019 Jeong .................. G02B 5/22
2019/0382587 A1 12/2019 Seo et al.
2020/0142301 A1 5/2020 Kwon et al.
2021/0355327 A1 11/2021 Seo et al.

FOREIGN PATENT DOCUMENTS

| CN | 109312169 A | 2/2019 | |
|---|---|---|---|
| CN | 109689612 | 4/2019 | |
| CN | 111848571 A | 10/2020 | |
| JP | 2884277 B2 | 4/1999 | |
| JP | 2002-122729 A | 4/2002 | |
| JP | 2006-243219 A | 9/2006 | |
| JP | 2019-530765 A | 10/2019 | |
| JP | 2020-076995 A | 5/2020 | |
| JP | 2020-184073 A | 11/2020 | |
| JP | 2022-545559 A | 10/2022 | |
| KR | 10-2007-0000168 | 1/2007 | |
| KR | 10-2018-0026967 A | 3/2018 | |
| KR | 10-2019-0034262 A | 4/2019 | |
| KR | 10-2020-0023948 A | 3/2020 | |
| KR | 10-2020-0072212 A | 6/2020 | |
| KR | 10-2021-0028564 A | 3/2021 | |
| TW | 201345975 A | 11/2013 | |
| WO | WO 2018/088052 A1 | 5/2018 | |
| WO | WO-2019154974 A1 * | 8/2019 | ......... B29C 65/1616 |

OTHER PUBLICATIONS

McGarraugh et al., Eur. J. Org. Chem., pp. 3489-3494 (2019).
Spence et al., Chem. Eur. J., vol. 20, pp. 12628-12635 (2014).
Chinese Office action dated May 27, 2024.

* cited by examiner

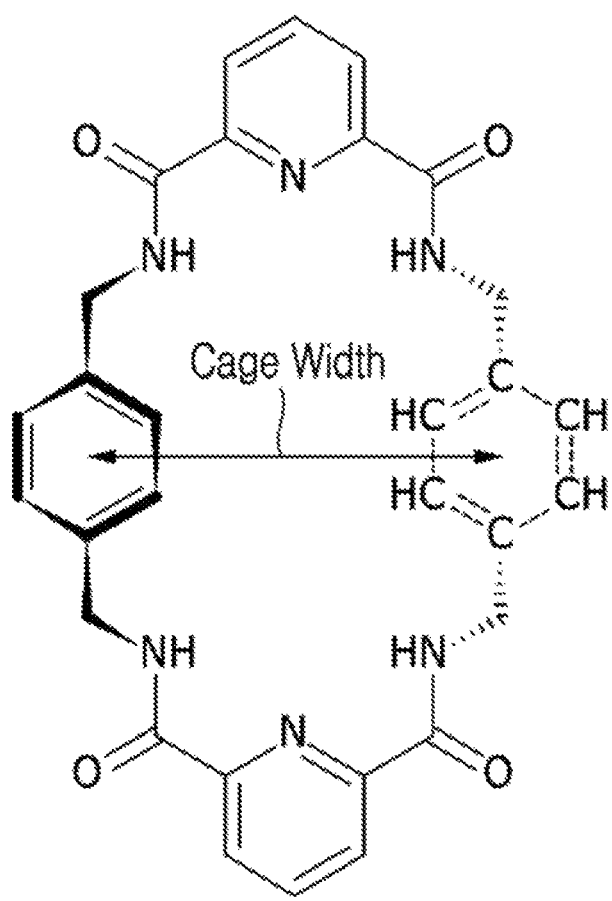

CORE-SHELL DYE, NEAR-INFRARED ABSORBING COMPOSITION INCLUDING THE SAME, AND NEAR-INFRARED ABSORBING FILM

CROSS-REFERENCE TO RELATED APPLICATION

This application claims priority to and the benefit of Korean Patent Application No. 10-2022-0024688 filed in the Korean Intellectual Property Office on Feb. 24, 2022, the entire contents of which are incorporated herein by reference.

BACKGROUND

1. Field

Embodiments relate to a core-shell dye, a near-infrared absorbing composition including the same, and a near-infrared absorbing film.

2. Description of the Related Art

An image sensor is a semiconductor that converts photons into electrons and displays them on a display device or stores them in a storage device.

The image sensor may be classified into a charge coupled device (CCD) image sensor and a complementary metal-oxide semiconductor (CMOS) image sensor according to a manufacturing process and an application method.

The CMOS image sensor may include a color filter including filter segments of additive and mixed primary colors of red, green, and blue. A silicon photodiode (Si-photodiode) of the CMOS image sensor may have sensitivity in a near-infrared wavelength region (e.g., about 750 nm to about 1,000 nm) and may also have an optical filter including a near-infrared absorbing film.

The near-infrared absorbing film may help reduce or prevent optical distortion caused by light (e.g., near-infrared ray) other than light of a visible region and may be formed by coating and drying a composition including a specific compound.

SUMMARY

The embodiments may be realized by providing a core-shell dye, including a core represented by Chemical Formula 1; and a shell surrounding the core, the shell being represented by Chemical Formula 2;

[Chemical Formula 1]

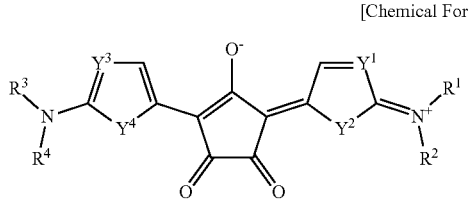

wherein, in Chemical Formula 1; $Y^1$ and $Y^3$ are each independently =CH—, or a nitrogen atom; $Y^2$ and $Y^4$ are each independently —$CH_2$—, a sulfur atom, —NH—, or an oxygen atom; and $R^1$ to $R^4$ are each independently a substituted or unsubstituted C6 to C30 aryl group;

[Chemical Formula 2]

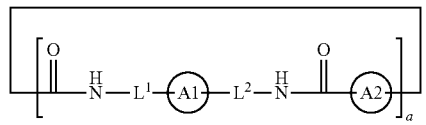

wherein, in Chemical Formula 2, A1 and A2 are each independently a divalent substituted or unsubstituted C6 to C30 aromatic ring group; $L^1$ and $L^2$ are each independently a single bond or a substituted or unsubstituted C1 to C30 alkylene group; and a is an integer of 2 to 10.

The embodiments may be realized by providing a near-infrared absorbing resin composition comprising the core-shell dye according to an embodiment.

The embodiments may be realized by providing a near-infrared absorbing film manufactured by using the near-infrared absorbing resin composition according to an embodiment.

The embodiments may be realized by providing an optical filter comprising the near-infrared absorbing film according to an embodiment.

The embodiments may be realized by providing a CMOS image sensor comprising the optical filter according to an embodiment.

BRIEF DESCRIPTION OF THE DRAWING

Features will be apparent to those of skill in the art by describing in detail exemplary embodiments with reference to the attached drawing in which:

the FIGURE is a view showing a cage width of the shell represented by Chemical Formula 2.

DETAILED DESCRIPTION

Example embodiments will now be described more fully hereinafter with reference to the accompanying drawing; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figure, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present.

As used herein, when specific definition is not otherwise provided, "substituted" refers to replacement of at least one hydrogen of a compound by a halogen atom (F, Cl, Br, or I), a hydroxy group, a C1 to C20 alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, or a combination thereof. As used herein, the term "or" is not an exclusive term, e.g., "A or B" would include A, B, or A and B.

As used herein, when specific definition is not otherwise provided, "heterocycloalkyl group," "heterocycloalkenyl group," "heterocycloalkynyl group," and "heterocycloalkylene group" may refer to presence of at least one N, O, S, or P in a cyclic compound of cycloalkyl, cycloalkenyl, cycloalkynyl, and cycloalkylene.

As used herein, when specific definition is not otherwise provided, "(meth)acrylate" refers to both "acrylate" and "methacrylate."

As used herein, when specific definition is not otherwise provided, the term "combination" refers to mixing or copolymerization.

In the chemical formula of the present specification, unless a specific definition is otherwise provided, hydrogen is bonded at the position when a chemical bond is not drawn where supposed to be given.

As used herein, when specific definition is not otherwise provided, when a plurality of substituents having the same number exist, these substituents are the same or different. For example, when there are four "$X_1$"s in Chemical Formula 2 to be described later, all four "$X_1$"s may be the same as "F"; one "$X_1$" may be "F," two "$X_1$"s may be "Cl," and one "$X_1$" may be "Br."

In addition, as used herein, when specific definition is not otherwise provided, a dotted line "$\vdots$" or "*" means a portion linked to the same or different atoms or chemical formulas, e.g., a linking point.

(Core-Shell Dye)

The embodiments relate to a compound for manufacturing a near-infrared absorbing film, e.g., an organic compound colorant that exhibits high near-infrared absorption intensity while ensuring durability.

One or more embodiments may provide a core-shell dye including, e.g., a core represented by Chemical Formula 1; and a shell surrounding the core and represented by Chemical Formula 2:

[Chemical Formula 1]

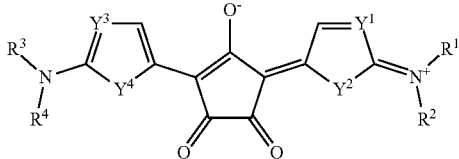

In Chemical Formula 1, $Y^1$ and $Y^3$ may each independently be or include, e.g., —CH—, or a nitrogen atom; $Y^2$ and $Y^4$ may each independently be or include, e.g., —CH$_2$—, a sulfur atom, —NH—, or an oxygen atom.

[Chemical Formula 2]

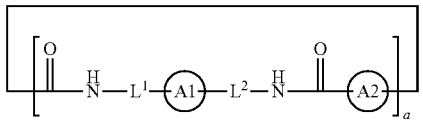

In Chemical Formula 2, A1 and A2 may each independently be or include, e.g., a divalent substituted or unsubstituted C6 to C30 aromatic ring. $L^1$ and $L^2$ may each independently be or include, e.g., a single bond or a substituted or unsubstituted C1 to C30 alkylene group. a may be, e.g., an integer of 2 to 10.

The core represented by Chemical Formula 1 is a croconium-based organic dye, and may have a maximum absorption peak at a wavelength of, e.g., about 750 nm to about 850 nm. An intensity at the maximum absorption peak may be higher than that of the inorganic dye. In addition, the core represented by Chemical Formula 1 is an organic dye that does not form particles, unlike an organic pigment.

Accordingly, the core-shell dye including the core represented by Chemical Formula 1 may be effectively used in a relatively smaller amount, thereby increasing processability, thinning the film, and the like, when manufacturing a near-infrared absorbing film, compared to inorganic dyes, organic pigments, or the like.

The core represented by Chemical Formula 1 could have relatively lower durability, when compared to inorganic dyes, organic pigments, or the like. The shell represented by Chemical Formula 2 is a type of macrocyclic compound having a sufficient size to surround the core represented by Chemical Formula 1, and may help compensate for the relatively lower durability of the core represented by Chemical Formula 1.

A core-shell dye, in which a halogen group (e.g., a halogen atom) is not included in the shell represented by Chemical Formula 2, may have a maximum absorption peak at about 800 nm to about 900 nm. In an implementation, when a halogen group is included in the shell represented by Chemical Formula 2, the core-shell dye may exhibit a maximum absorption peak between about 850 nm and about 1,000 nm. The shift of the maximum absorption peak of the core-shell dye to a longer wavelength region by including a halogen group in the shell represented by Chemical Formula 2 means that the matching to the near-infrared absorption wavelength band may be further improved.

The core-shell dye of an embodiment may exhibit improved matching to the near-infrared absorption wavelength band, as an effect of the core represented by Chemical Formula 1 alone; or alternatively, as a synergistic effect of the core represented by Chemical Formula 1 and the shell represented by Chemical Formula 2. In addition, the core-shell dye of an embodiment may have excellent durability as a result of the shell represented by Chemical Formula 2 surrounding the core represented by Chemical Formula 1.

Hereinafter, the core-shell dye of one embodiment will be described in more detail.

Core Represented by Chemical Formula 1

The core represented by Chemical Formula 1 may be a croconium-based organic dye. In an implementation, Y2 and Y4 may both be sulfur atoms, and Y1 and Y3 may both be =CH -.

In an implementation, the four substituents (R1 to R4) of the core represented by Chemical Formula 1 may each independently be, e.g., a substituted or unsubstituted C6 to C30 aryl group, and a maximum absorption peak may be shifted to a longer wavelength region and durability may be improved, compared to a case where substituents at the same position are each independently a substituted or unsubstituted C1 to C30 alkyl group or a substituted or unsubstituted C3 to C30 cycloalkyl group.

In an implementation, R1 to R4 may each independently be, e.g., a substituted or unsubstituted C6 to C30 aryl group.

In an implementation, R1 to R4 may each independently be, e.g., unsubstituted or substituted with a C1 to C10 alkyl group, a C1 to C10 alkoxy group, an epoxy group, a (meth)acrylate group, or a cyano group, at a terminal end (e.g., a pendent group that is not in the backbone of the molecule).

In an implementation, R1 to R4 may each independently be, e.g., a substituted or unsubstituted phenyl group. In an implementation, R1 to R4 may each independently be, e.g., a group represented by Chemical Formula 3.

[Chemical Formula 3]

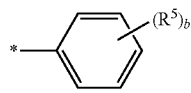

In Chemical Formula 3, $R^5$ may be, e.g., a substituent represented by Chemical Formula 3-1. b may be, e.g., an integer from 0 to 5.

[Chemical Formula 3-1]

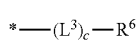

In Chemical Formula 3-1, $L^3$ may be or may include, e.g., a single bond, an oxygen atom, or a substituted or unsubstituted C1 to C10 alkylene group. $R^6$ may be or may include, e.g., a substituted or unsubstituted C1 to C10 alkyl group, a substituted or unsubstituted C1 to C10 alkoxy group, an epoxy group, a (meth)acrylate group, or a cyano group. c may be, e.g., an integer of 1 to 5.

In an implementation, $R^1$ to $R^4$ may all be the same. In an implementation, in a case in which R1 to R4 are all different, a maximum absorption peak may be shifted to a long wavelength region and durability may be improved.

In an implementation, the core represented by Chemical Formula 1 may be represented by one of the following Chemical Formulae.

[Chemical Formula 1-1]

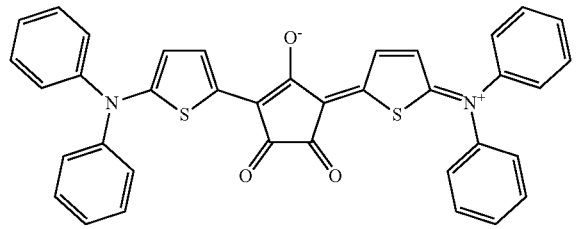

[Chemical Formula 1-2]

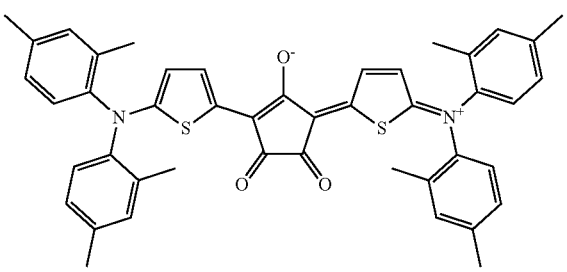

[Chemical Formula 1-3]

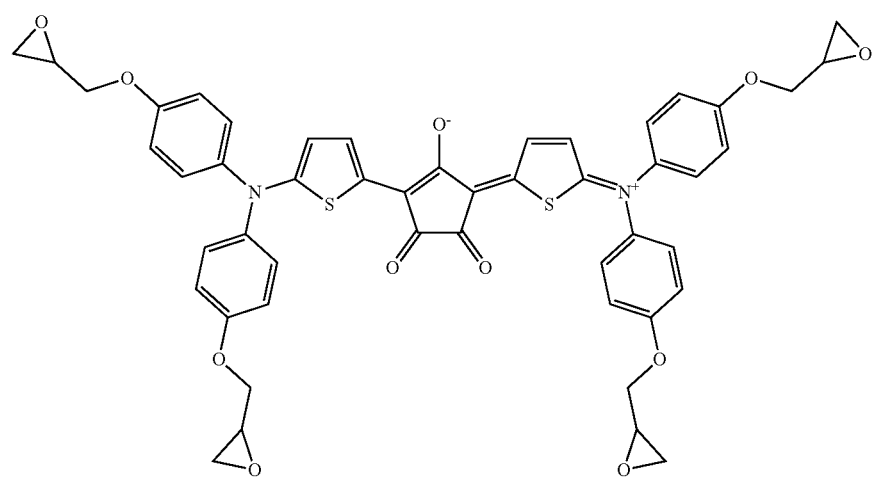

[Chemical Formula 1-4]

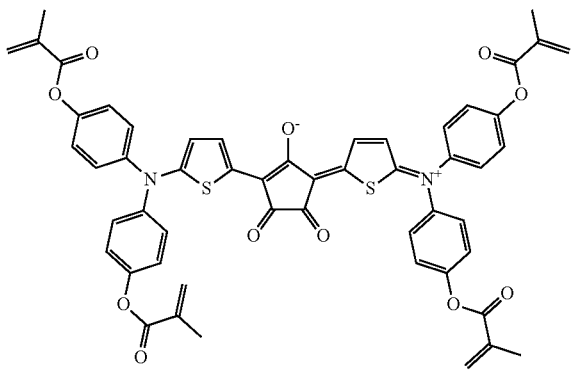

[Chemical Formula 1-5]

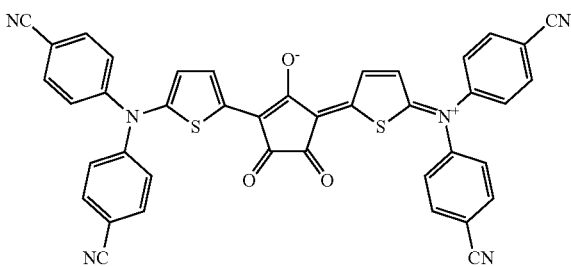

In an implementation, a length of the core represented by Chemical Formula 1 may be, e.g., about 1 nm to about 3 nm, or about 1.5 nm to about 2 nm. When the core represented by Chemical Formula 1 has a length within the above ranges, a core-shell dye may be easily formed.

In an implementation, the core represented by Chemical Formula 1 may have a length within the above ranges, and the shell, which is the macrocyclic compound, may be obtained in a structure surrounding the compound represented by Chemical Formula 1. If other compounds not falling within the above ranges were to be used, it could be difficult to expect improvement in durability because the shell could be difficult to form around the core.

The core itself represented by Chemical Formula 1 may have a maximum absorption peak at a wavelength of about 750 nm to about 850 nm. The core-shell dye including a core having the spectral characteristics may be applied to a composition for a near-infrared absorbing film of a CMOS image sensor. The optical filter including the near-infrared absorbing film may smoothly transmit a wavelength of about 350 nm to about 650 nm while effectively implementing a near-infrared absorption function.

In an implementation, the maximum absorption peak of the core-shell dye may vary depending on whether a halogen group is included the shell represented by Chemical Formula 2, which will be described below.

In an implementation, the core represented by Chemical Formula 1 may include four resonance structures, as shown in the following scheme, but in the present specification, only one structure is shown for the compound represented by Chemical Formula 1 for convenience.

[Chemical Formula 1-6]

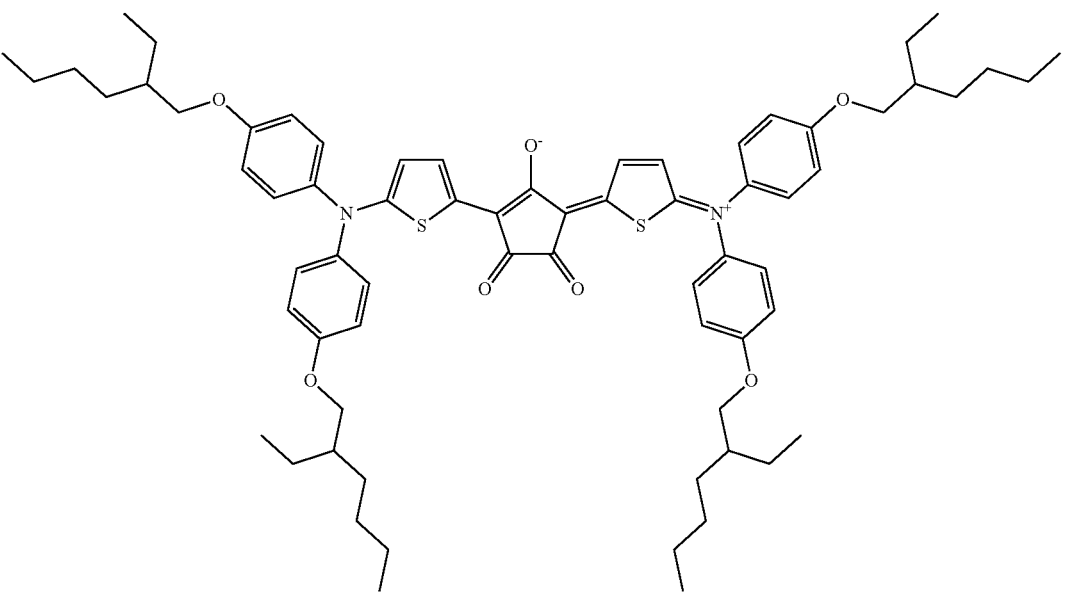

[Scheme]

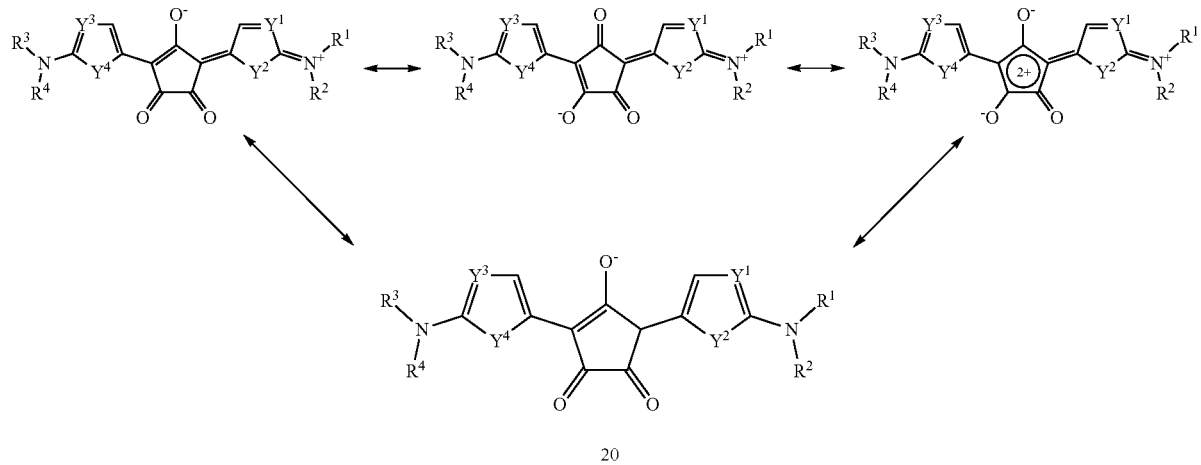

In an implementation, the core represented by Chemical Formula 1 may be represented by any one of the four resonance structures.

Shell Represented by Chemical Formula 2

The shell represented by Chemical Formula 2 may be, e.g., a rotaxane-based macrocyclic compound, and may include an amide bond (—CONH—). In an implementation, the hydrogen atom included in the amide bond of the shell represented by Chemical Formula 2 may form a non-covalent bond with the oxygen atom of the compound represented by Chemical Formula 1. In an implementation, the two atoms may form a hydrogen bond, thereby enhancing durability of the core-shell dye.

In Chemical Formula 2, A1 and A2 may each independently be or include, e.g., a divalent substituted or unsubstituted benzene ring, a divalent substituted or unsubstituted pyridine ring, or a divalent substituted or unsubstituted anthracene ring. In an implementation, A1 and A2 may each independently be, e.g., represented by Chemical Formula 4-1 or 4-2.

[Chemical Formula 4-1]

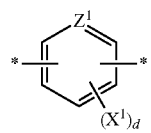

[Chemical Formula 4-2]

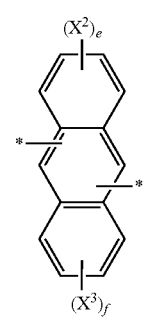

In Chemical Formulae 4-1 and 4-2, $Z^1$ may be, e.g., *—CH—* or a nitrogen atom. $X^1$ to $X^3$ may each independently be, e.g., a halogen group or a substituted or unsubstituted C1 to C20 alkyl group. d, e, and f may each independently be, e.g., an integer of 0 to 4.

In an implementation, Chemical Formula 2 may be represented by, e.g., Chemical Formula 2-1 or Chemical Formula 2-2.

[Chemical Formula 2-1]

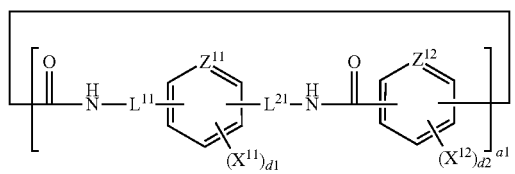

In Chemical Formula 2-1, $L^{11}$ and $L^{21}$ may each independently be, e.g., a substituted or unsubstituted C1 to C10 alkylene group. $Z^{11}$ and $Z^{12}$ may each independently be, e.g., *—CR—* or a nitrogen atom, in which R may be, e.g., a hydrogen atom or a substituted or unsubstituted C1 to C10 alkyl group. $X^{11}$ and $X^{12}$ may each independently be, e.g., a halogen group or a substituted or unsubstituted C1 to C10 alkyl group. d1 and d2 may each independently be, e.g., an integer of 0 to 4. a1 may be, e.g., an integer of 2 to 10.

[Chemical Formula 2-2]

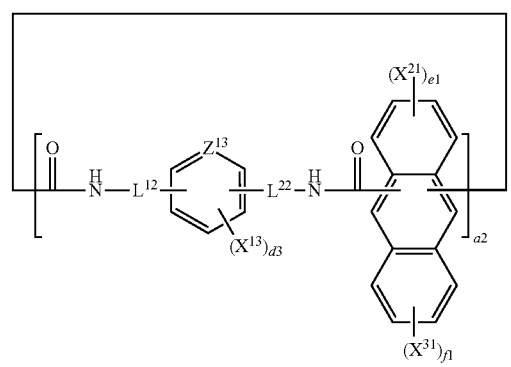

In Chemical Formula 2-2, $L^{12}$ and $L^{22}$ may each independently be, e.g., a single bond or a substituted or unsubstituted C1 to C10 alkylene group. $Z^{13}$ may be, e.g., *—CR—* or a nitrogen atom, in which R may be, e.g., a hydrogen atom or a substituted or unsubstituted C1 to C10 alkyl group. $X^{13}$, $X^{21}$, and $X^{31}$ may each independently be, e.g., a halogen group or a substituted or unsubstituted C1 to C10 alkyl group. d3, e1, and f1 may each independently be, e.g., an integer of 0 to 4. a2 may be, e.g., an integer of 2 to 10.

A description of the case in which Chemical Formula 2 is Chemical Formula 2-1 is as follows.

In an implementation, one of $Z^{11}$ and $Z^{12}$ may be *—CH—* or a nitrogen atom, and the other of $Z^{11}$ and $Z^{12}$ may be *—CH—*. In an implementation, one of $Z^{11}$ and $Z^{12}$ may be a nitrogen atom, and a non-covalent bond between the shell and the core or a non-covalent bond inside the shell may increase to further enhance the durability of the core-shell dye, compared to a case in which a nitrogen atom is not included.

$X^{11}$ and $X^{12}$ may each independently be, e.g., a halogen group, and d1+d2 may be, e.g., an integer of 1 to 8. In an implementation, one of $X^{11}$ and X12 may be a halogen atom (e.g., a fluorine atom), and the maximum absorption peak of the core-shell dye may shift to a long wavelength region, so that it is possible to implement excellent matching to the near-infrared absorption wavelength band compared to a case in which no halogen (e.g., fluorine) atom is introduced. In an implementation, both $X^{11}$ and $X^{12}$ may be fluorine atoms, and d1+d2 may be 8.

$L^{11}$ and L21 may each independently be, e.g., a substituted or unsubstituted C1 to C10 alkylene group. In this case, the solubility may be improved, and it may be easy to form a structure in which the shell surrounds the core. In an implementation, both $L^{11}$ and $L^{21}$ may be, e.g., a methylene group (*—$CH_2$—*).

In an implementation, a1 may be, e.g., 2.

A description of the case in which Chemical Formula 2 is Chemical Formula 2-2 is as follows.

$Z^{13}$ may be, e.g., a nitrogen atom. When $Z^{13}$ is a nitrogen atom, a non-covalent bond between the shell and the core or a non-covalent bond inside the shell may increase, to further enhance the durability of the core-shell dye, compared to a case in which a nitrogen atom is not included.

$X^{13}$, $X^{21}$, and $X^{31}$ may each independently be, e.g., a halogen group, and d3+e1+f1 may be, e.g., an integer of 1 to 12. In an implementation, at least one of $X^{13}$, $X^{21}$, and $X^{31}$ may be a halogen group, and a maximum absorption peak of the core-shell dye shifts to a long wavelength region, in contrast to a case in which a halogen group (e.g., fluorine atom) is included, and thus it is possible to implement excellent matching to the near-infrared absorption wavelength band. In an implementation, $X^{13}$, $X^{21}$, and $X^{31}$ may all be, e.g., fluorine atoms, and d3+e1+f1 may be, e.g., 12.

$L^{12}$ and $L^{22}$ may each independently be, e.g., a substituted or unsubstituted C1 to C10 alkylene group. In an implementation, the solubility may be excellent, and it may be easy to form a structure in which the shell surrounds the core. In an implementation, both $L^{12}$ and $L^{22}$ may be a methylene group (*—$CH_2$—*).

In an implementation, a2 may be, e.g., 2.

In an implementation, the shell may be represented by, e.g., one of the following Chemical Formulae.

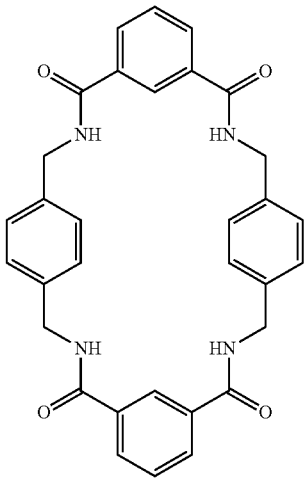

[Chemical Formula 2-1-1]

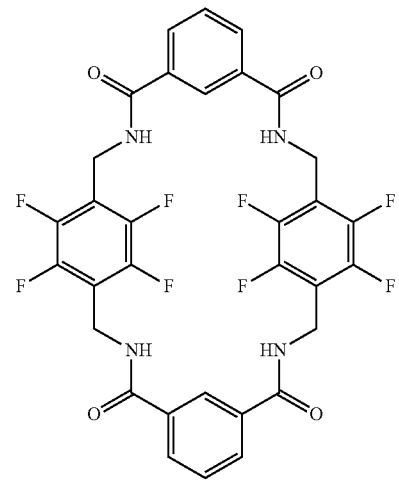

[Chemical Formula 2-1-2]

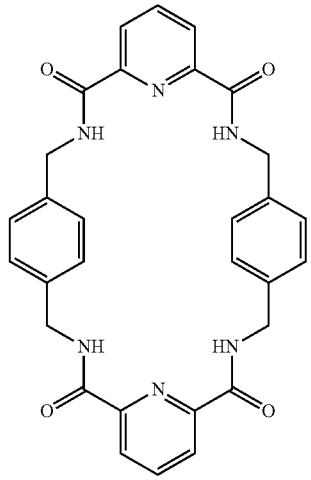

[Chemical Formula 2-1-3]

[Chemical Formula 2-1-4]

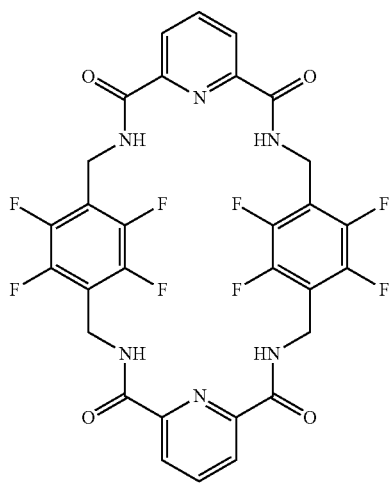

[Chemical Formula 2-2-1]

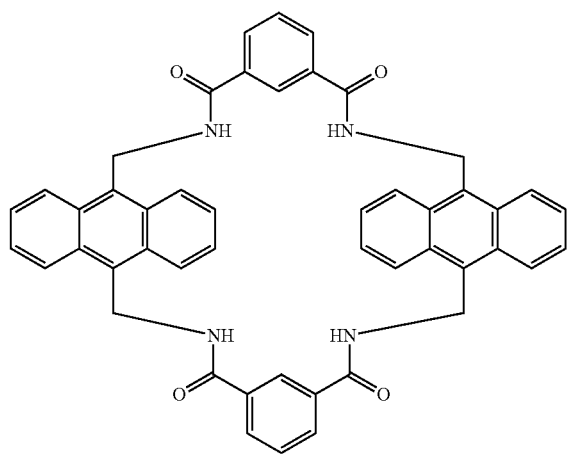

[Chemical Formula 2-2-2]

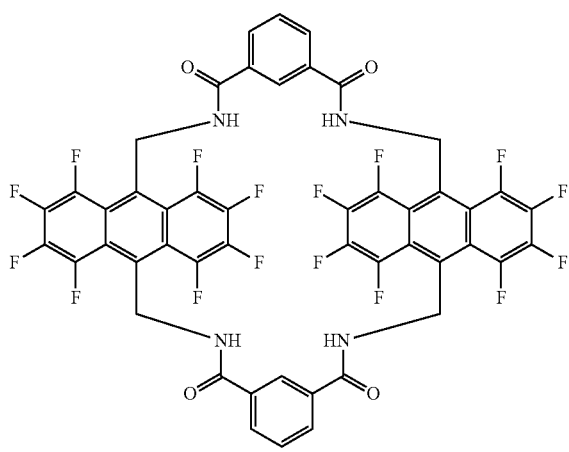

[Chemical Formula 2-2-3]

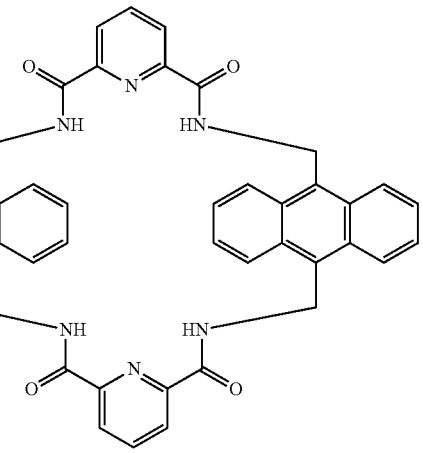

[Chemical Formula 2-2-4]

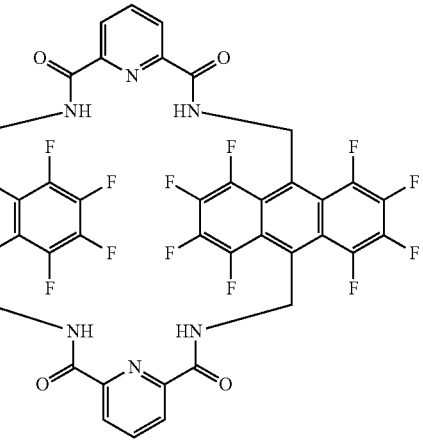

Compared to the shells represented by Chemical Formulae 2-1-1, 2-1-2, 2-1-3, and 2-1-4, the durability of the core-shell dye using the shells represented by Chemical Formulae 2-2-1, 2-2-2, 2-2-3, and 2-2-4 may be stronger. When the structure of the parent nucleus is the same, there may be an effect of shifting the maximum absorption peak of the core-shell dye using a shell substituted with a fluorine atom to a longer wavelength region.

A cage width of the shell may be, e.g., about 6.5 Å to about 7.5 Å, and a volume of the shell may be, e.g., about 10 Å$^3$ to about 16 Å$^3$. The cage width in this disclosure refers to an internal distance of the shell, e.g., in the shell represented by Chemical Formula 2, a distance between two different phenylene groups in which both methylene groups are linked (See the FIGURE). When the shell has a cage width within the above range, a core-shell dye having a structure surrounding the core represented by Chemical Formula 1 may be obtained, and thus when the core-shell dye is added to the near-infrared absorbing resin composition, a near-infrared absorbing film having excellent durability and high brightness may be realized.

Core-Shell Dye

The core-shell dye may include a core including the compound (e.g., represented by Chemical Formula 1) and the shell (e.g., represented by Chemical Formula 2) in a mole ratio of about 1:1. When the core and the shell are present in the mole ratio, a coating layer (shell) surrounding the core including the compound represented by Chemical Formula 1 may be well formed.

In an implementation, the core-shell dye may be represented by, e.g., one of the following Chemical Formulae.

[Chemical Formula 5-1]

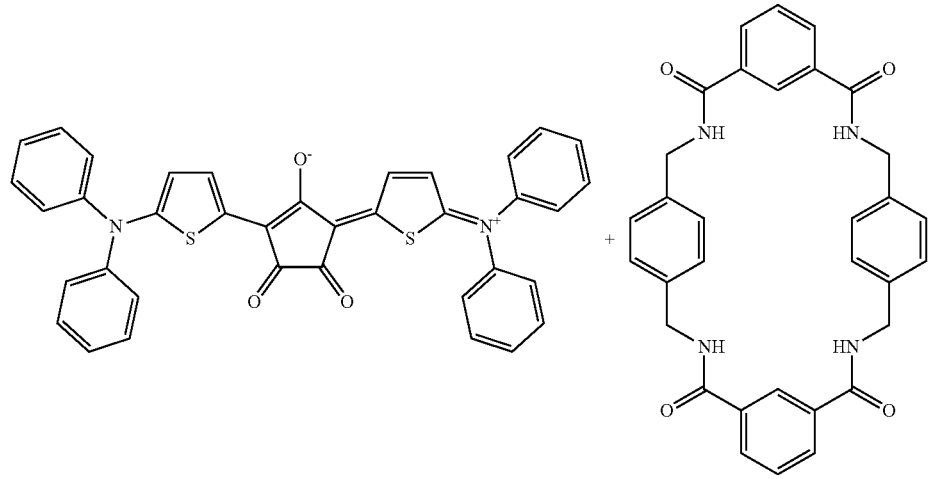

[Chemical Formula 5-2]

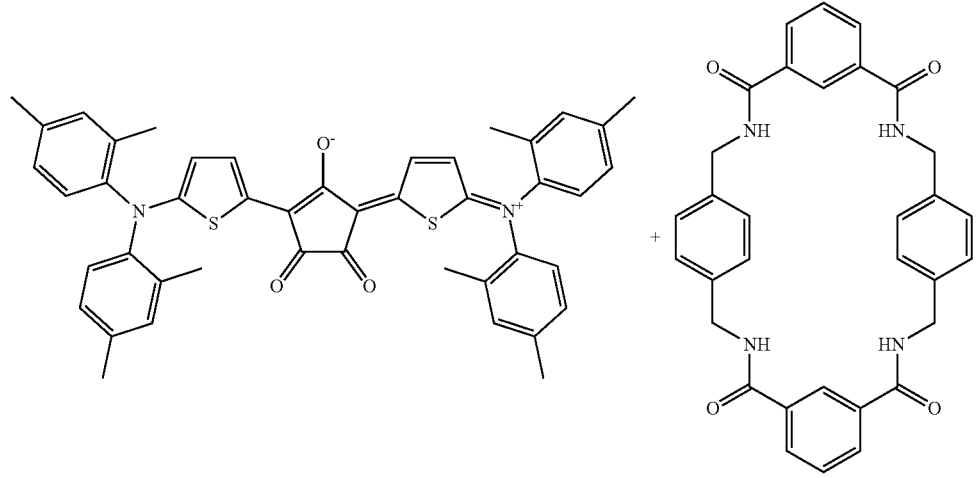

[Chemical Formula 5-3]

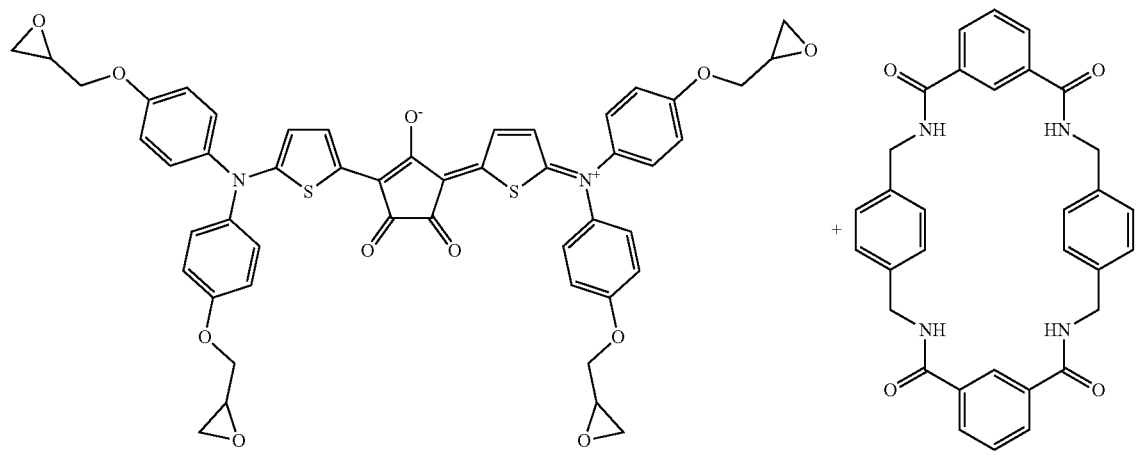

17
18
-continued
[Chemical Formula 5-4]
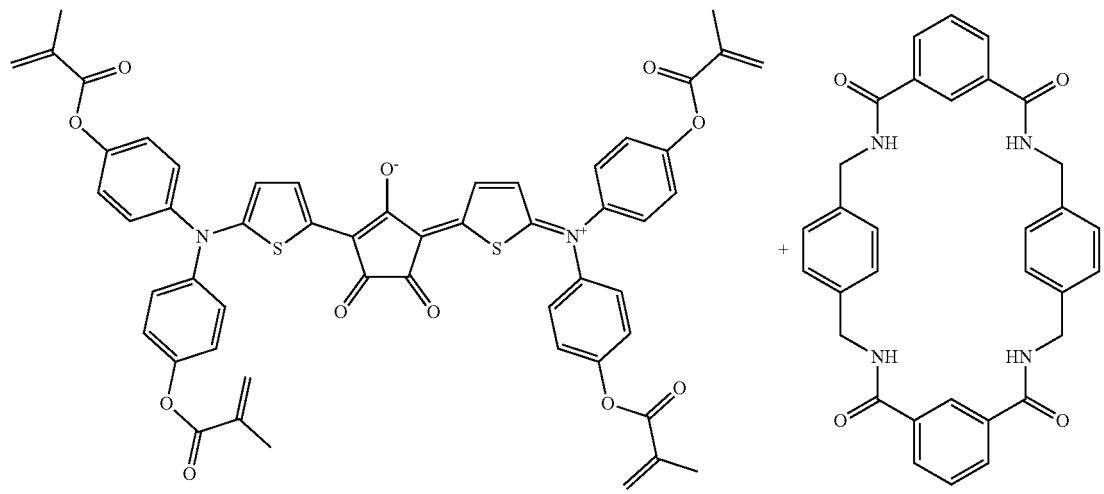
[Chemical Formula 5-5]
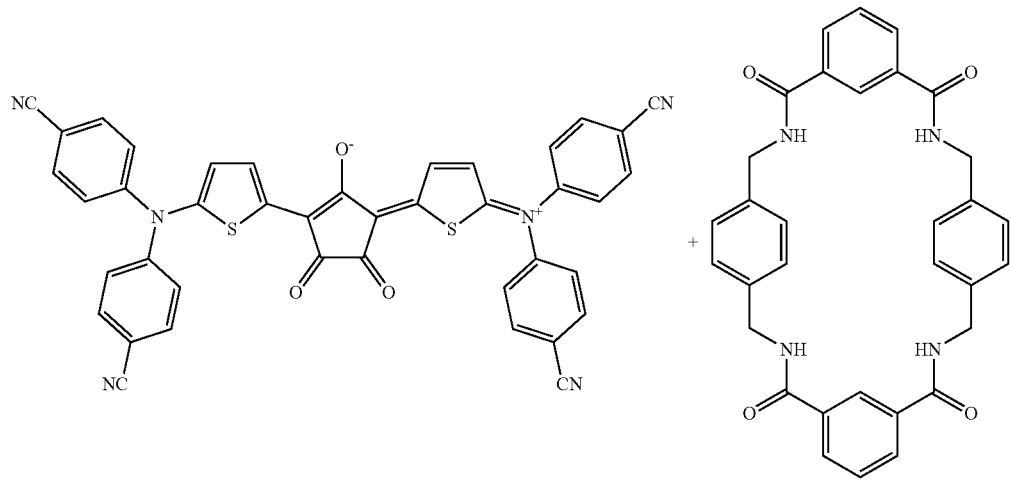
[Chemical Formula 5-6]
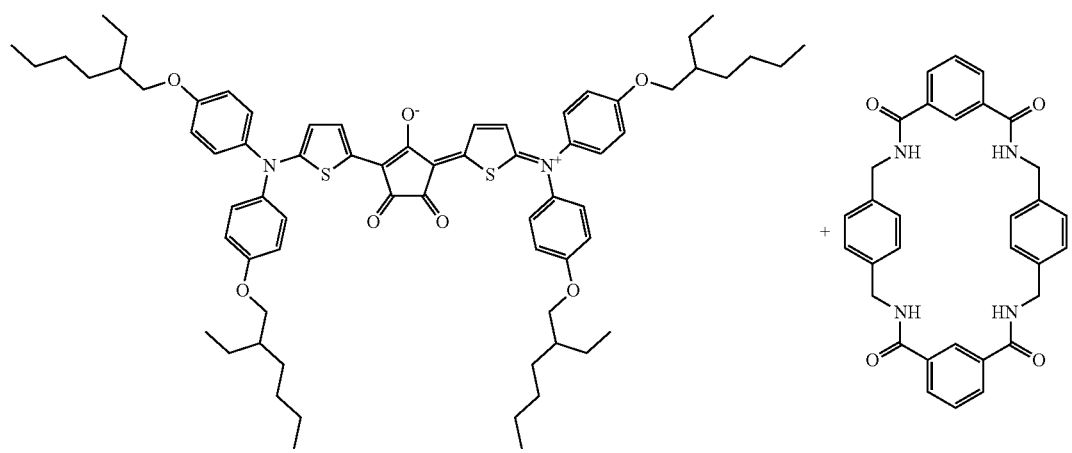

[Chemical Formula 5-7]
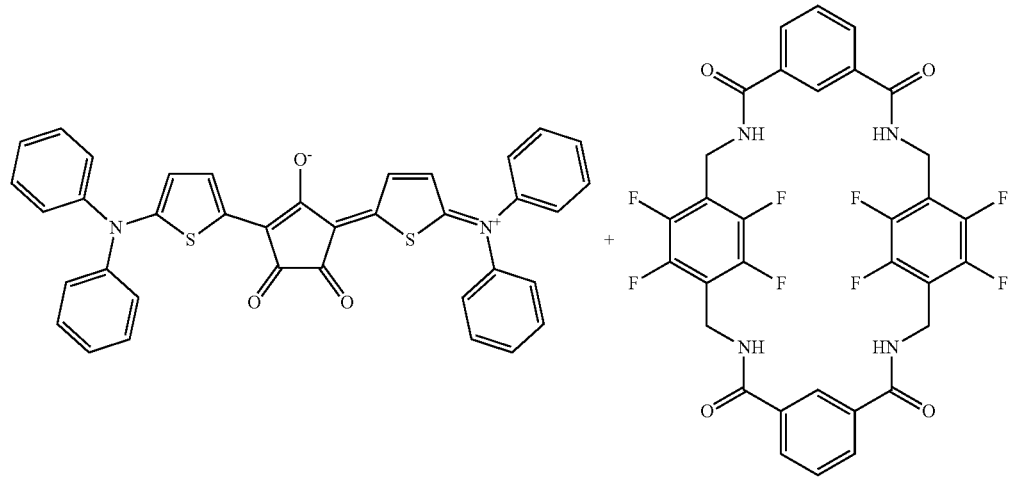
[Chemical Formula 5-8]
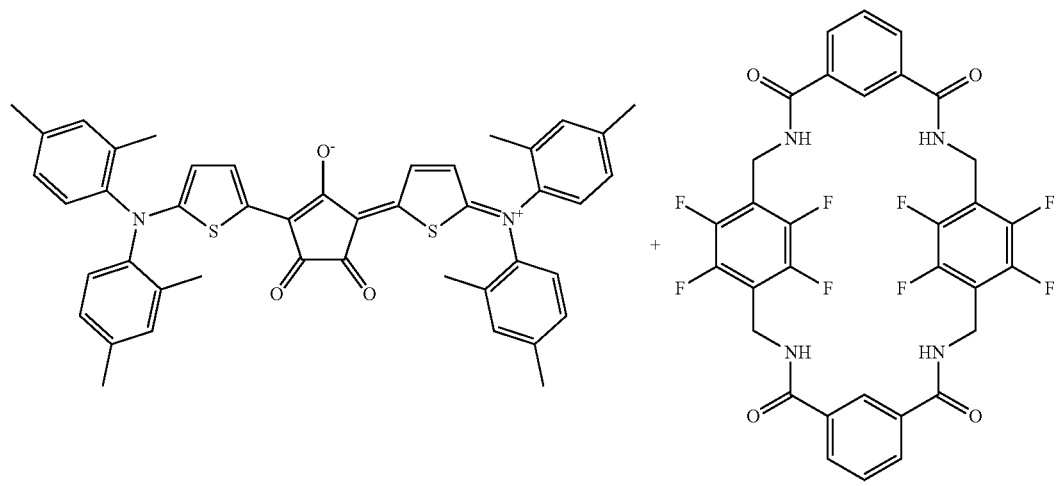
[Chemical Formula 5-9]
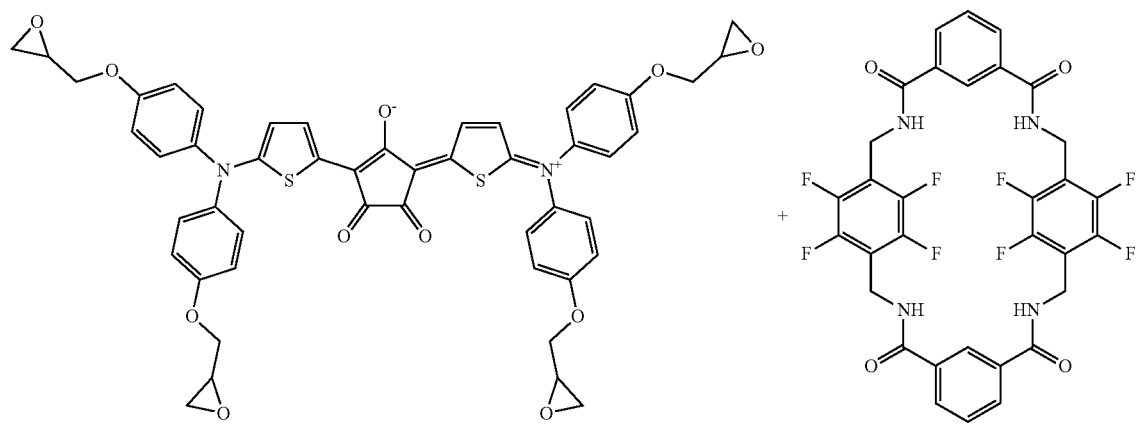

[Chemical Formula 5-10]
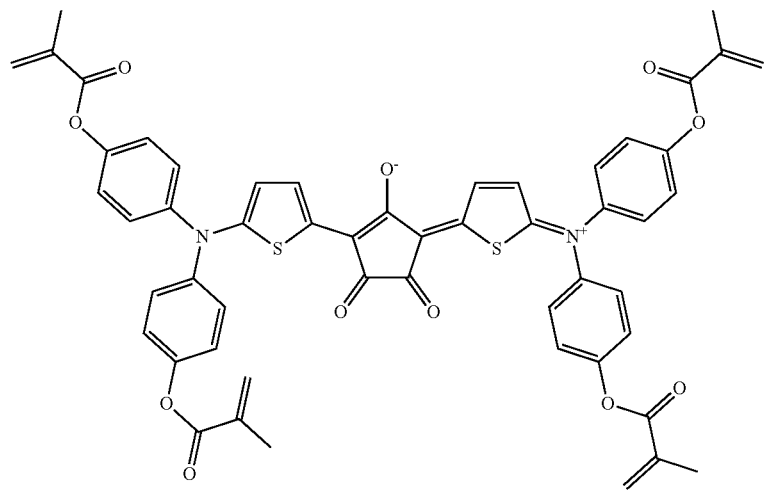 + 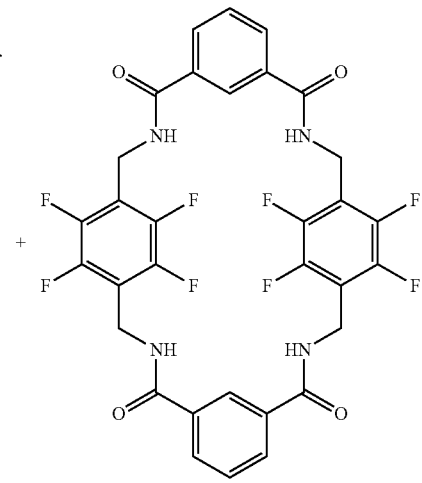
[Chemical Formula 5-11]
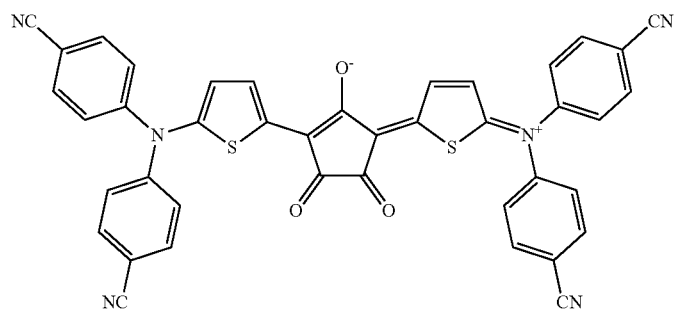 + 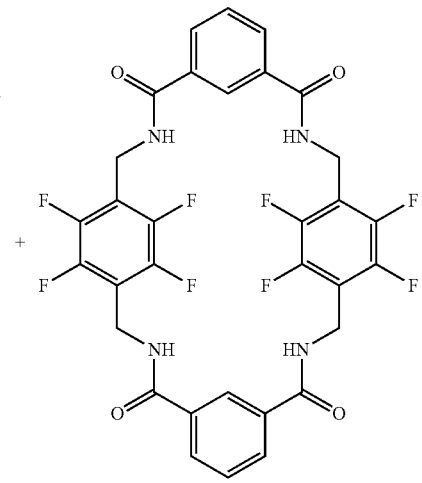
[Chemical Formula 5-12]
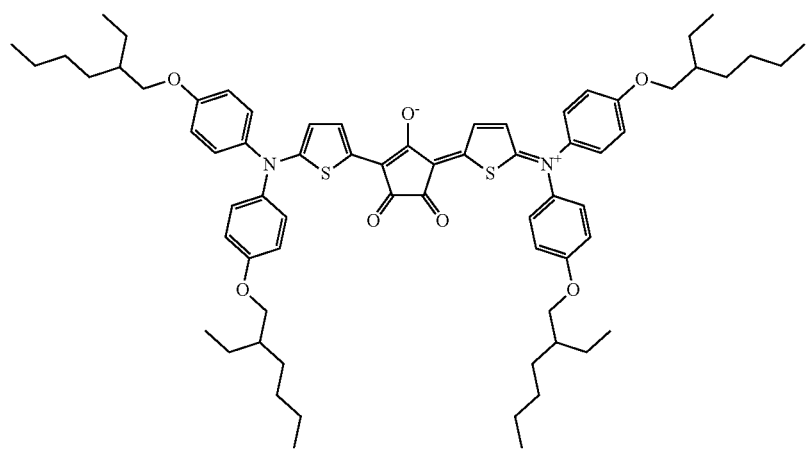 + 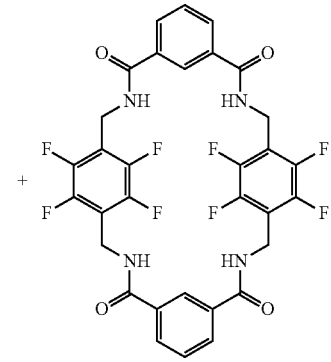

[Chemical Formula 5-13]
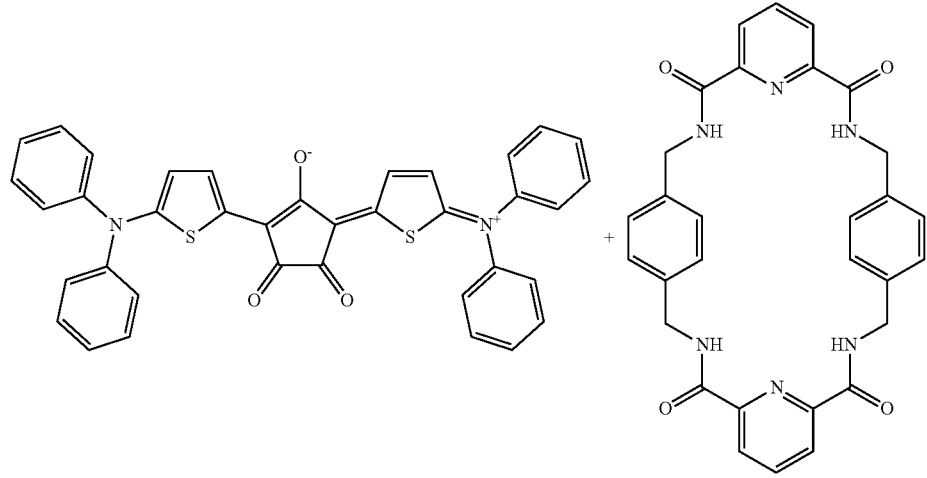
[Chemical Formula 5-14]
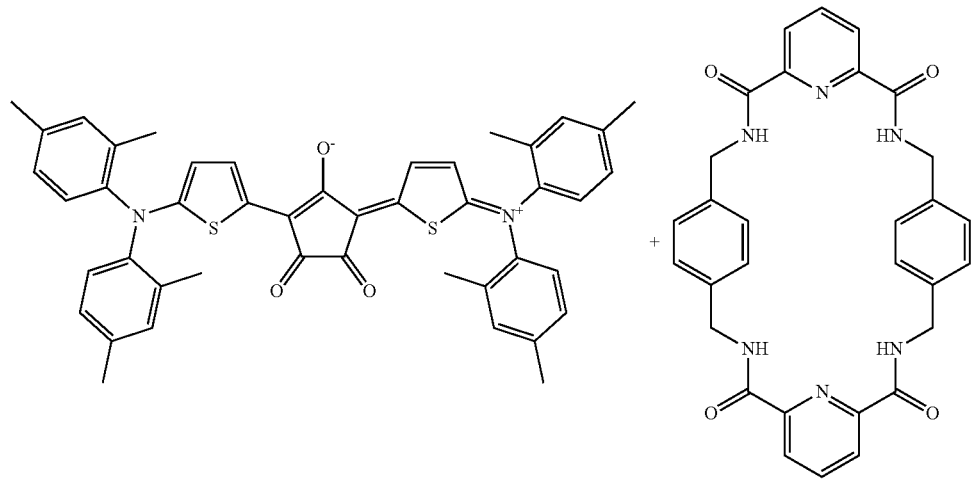
[Chemical Formula 5-15]
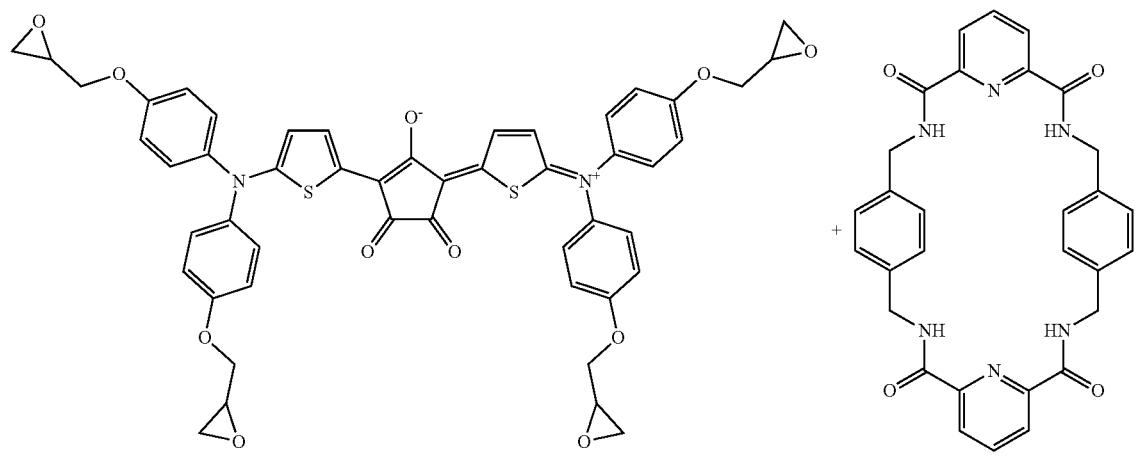

[Chemical Formula 5-16]
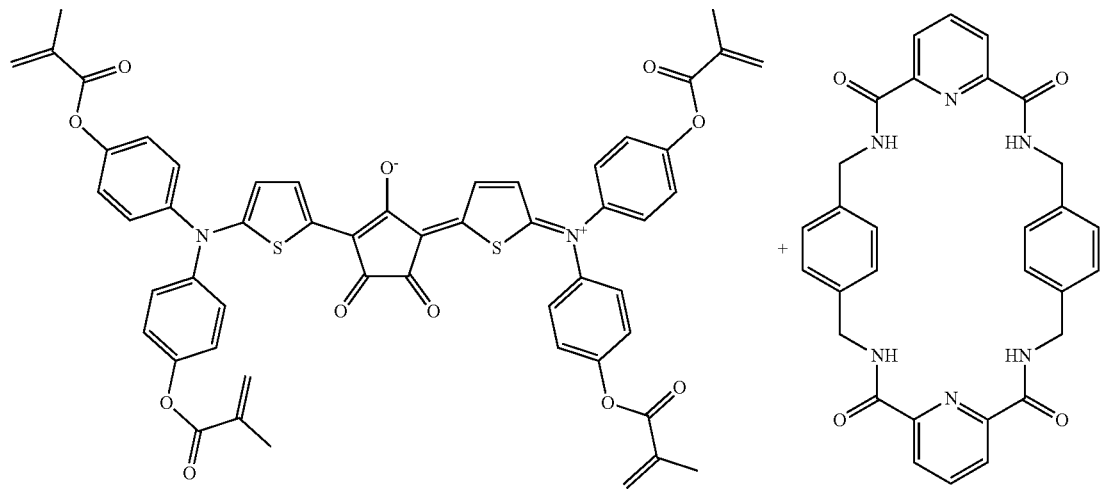
[Chemical Formula 5-17]
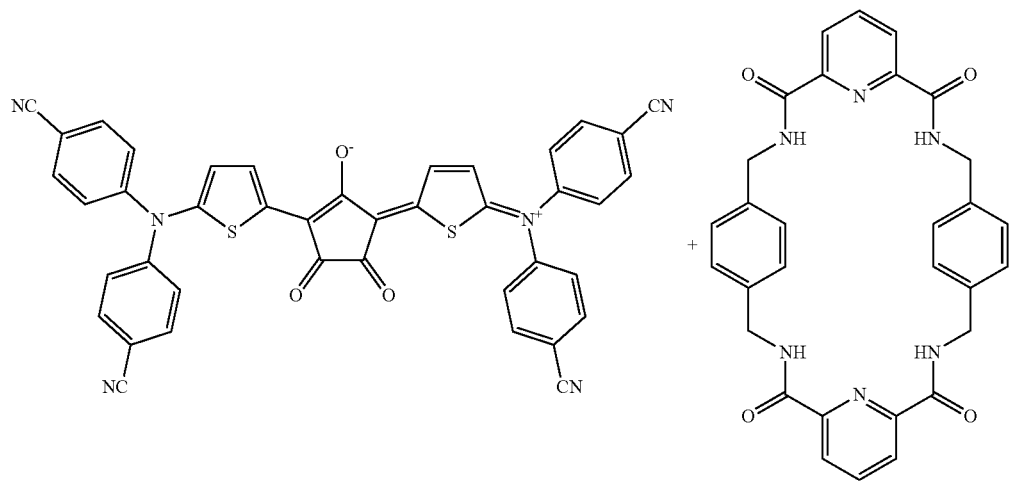
[Chemical Formula 5-18]
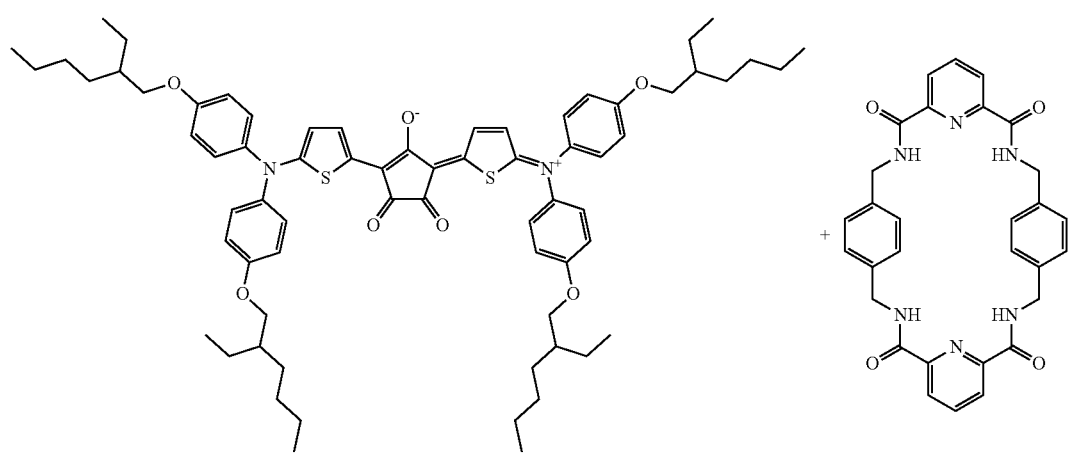

[Chemical Formula 5-19]
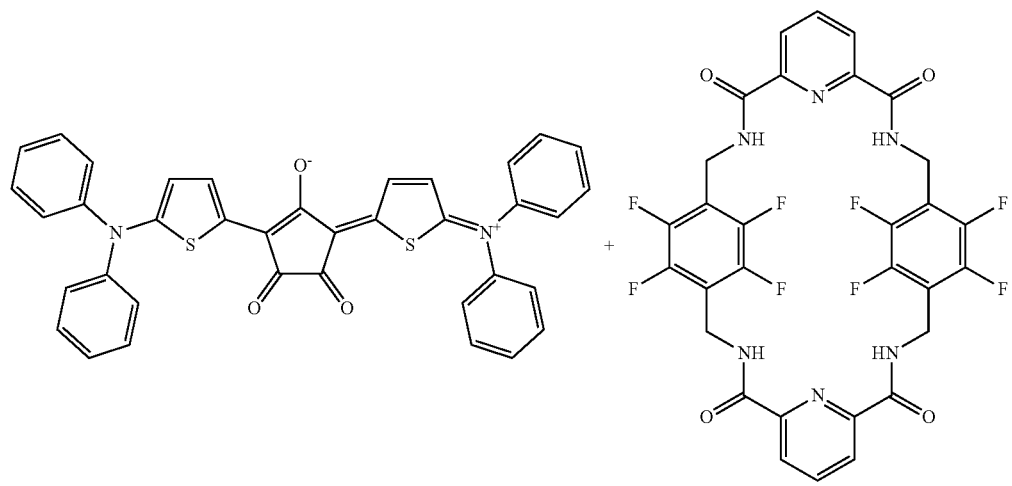
[Chemical Formula 5-20]
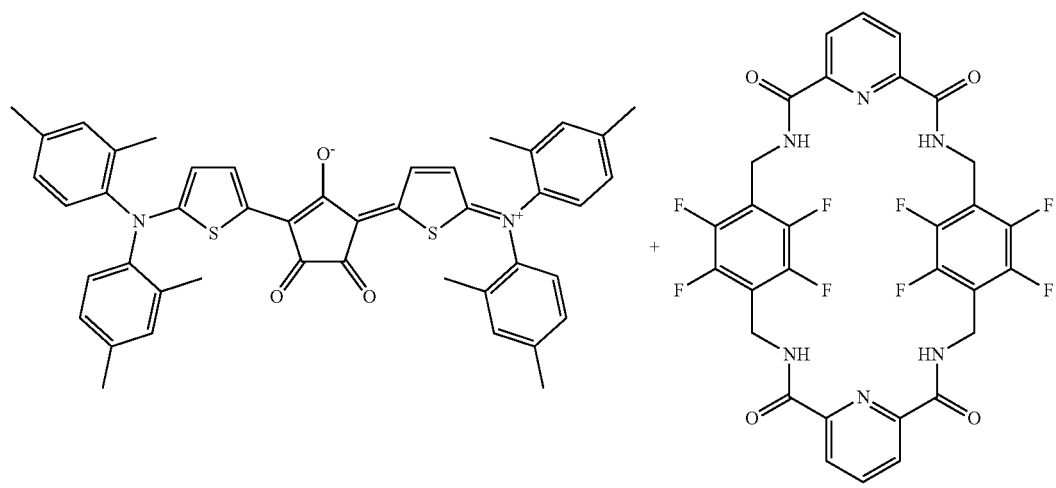
[Chemical Formula 5-21]
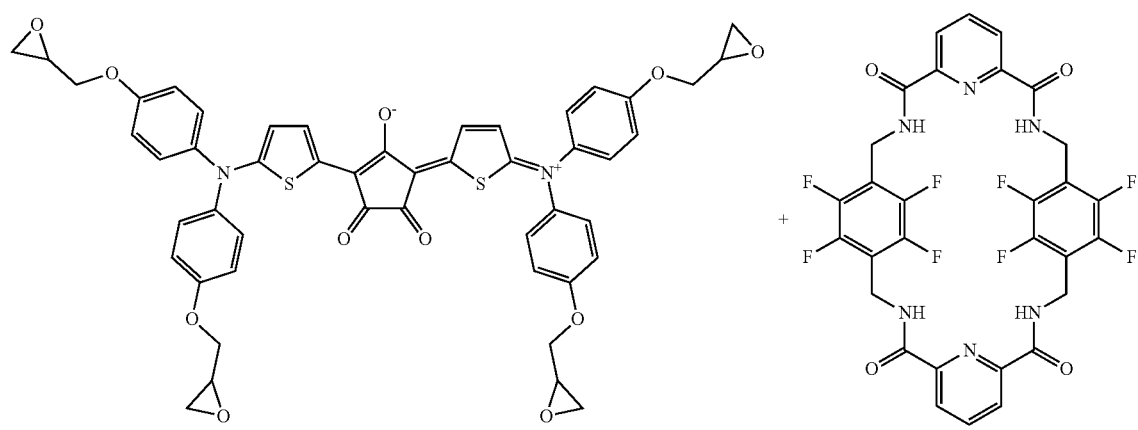

-continued
[Chemical Formula 5-22]
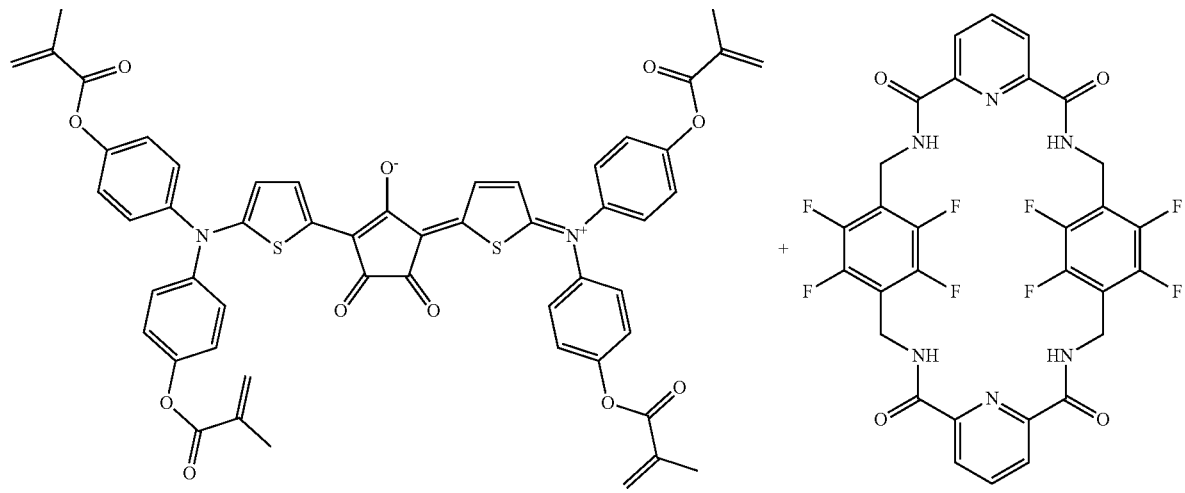
[Chemical Formula 5-23]
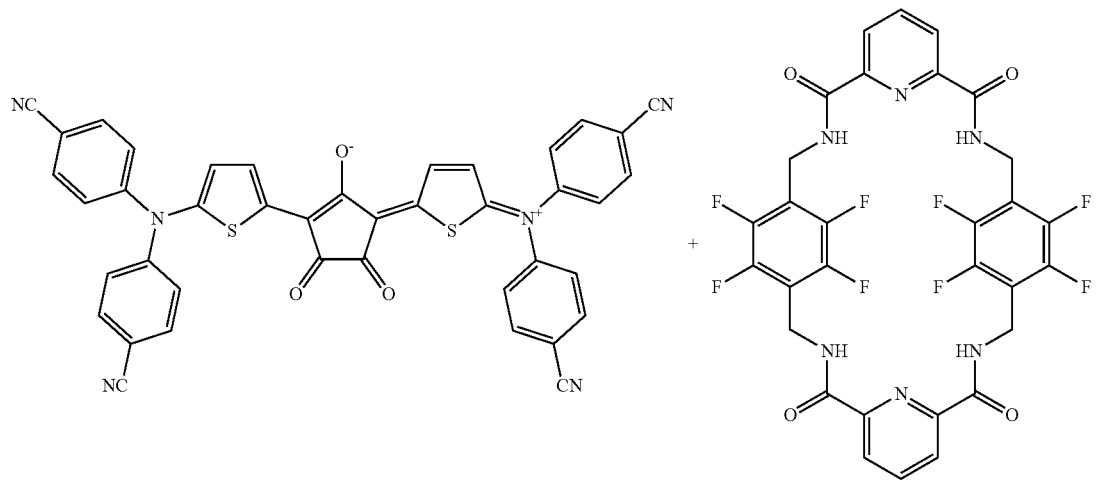
[Chemical Formula 5-24]
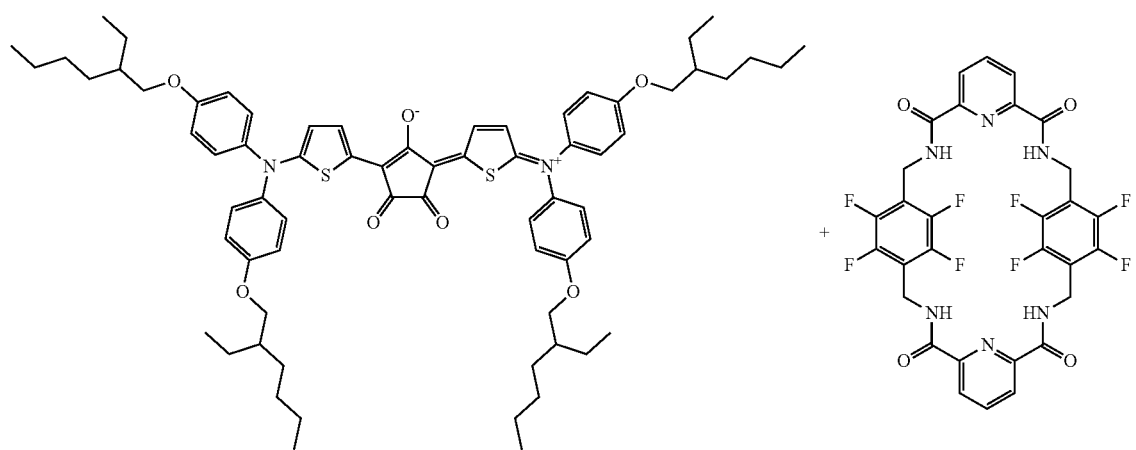

[Chemical Formula 5-25]
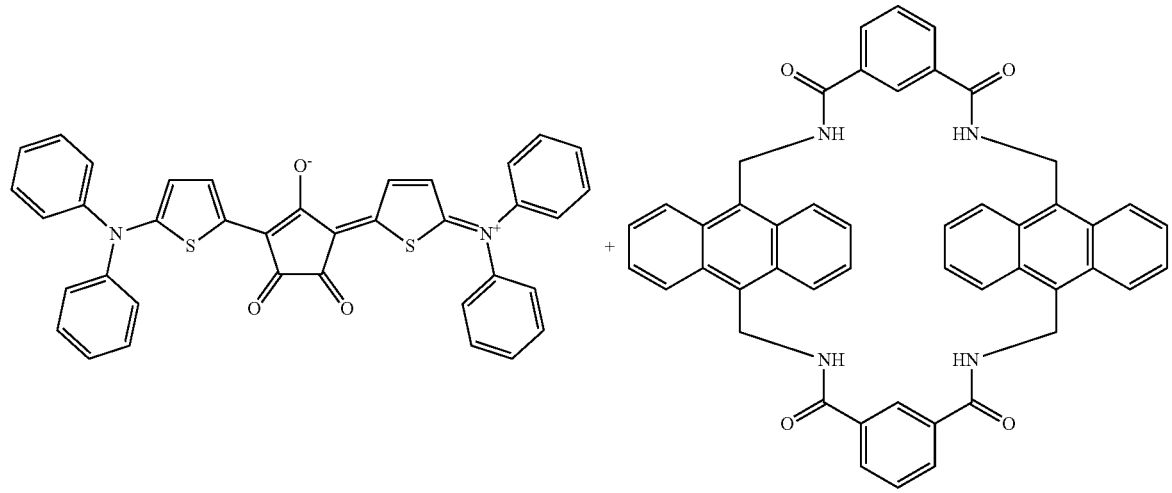
[Chemical Formula 5-26]
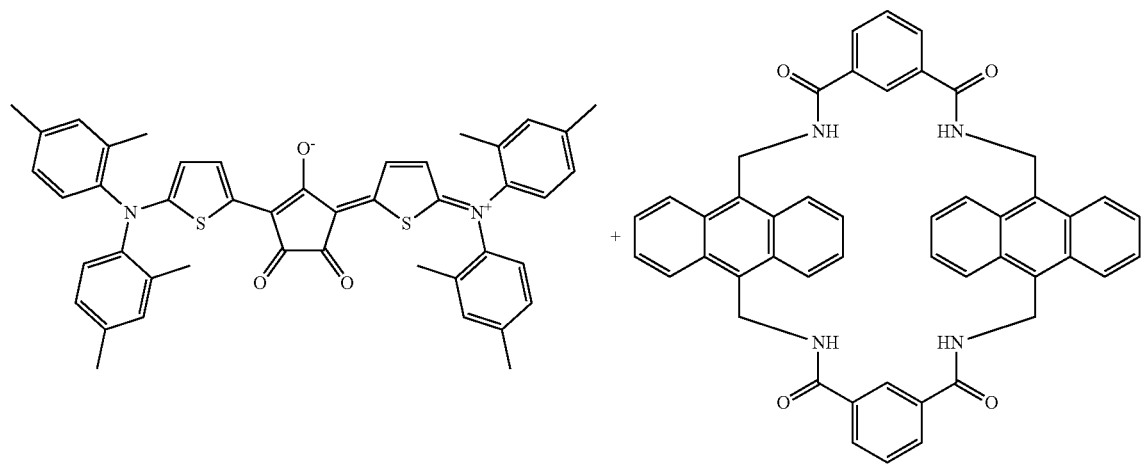
[Chemical Formula 5-27]
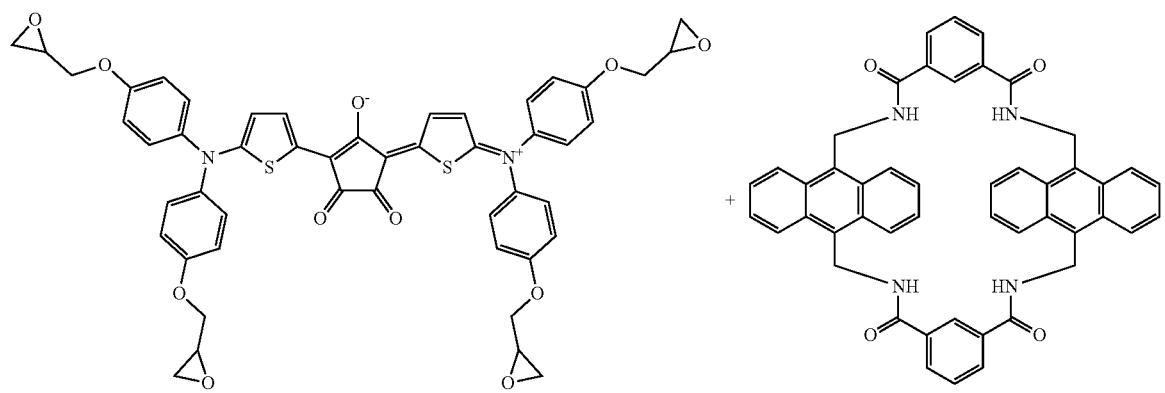

[Chemical Formula 5-28]
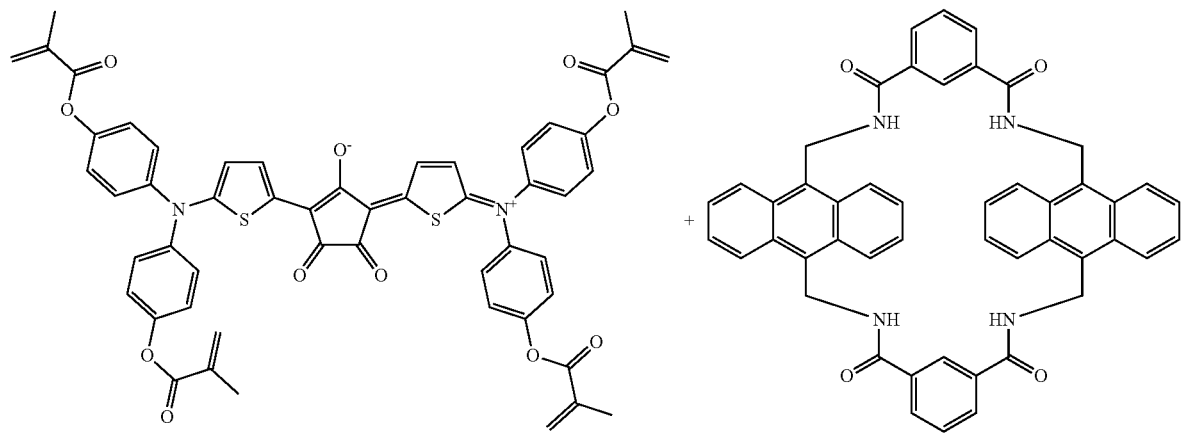
[Chemical Formula 5-29]
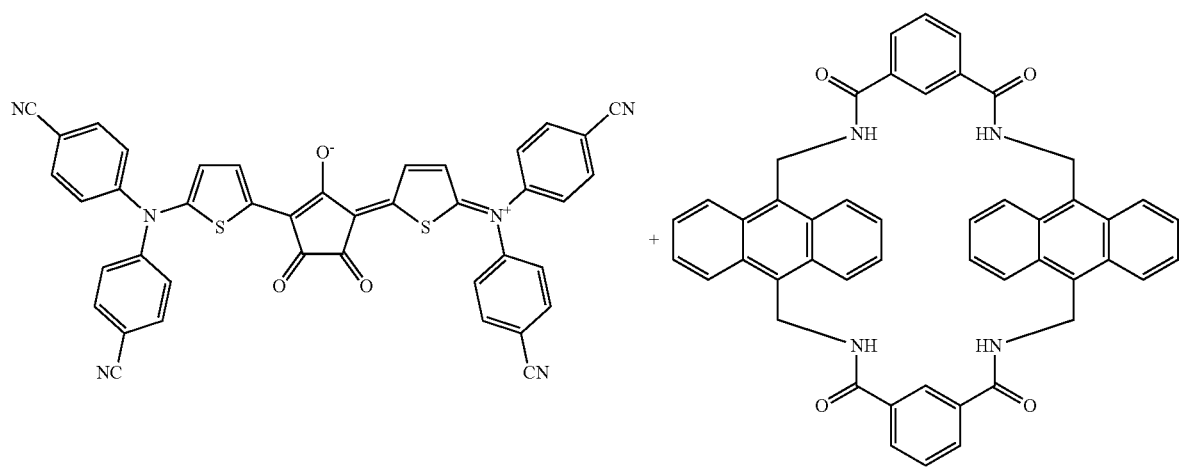
[Chemical Formula 5-30]
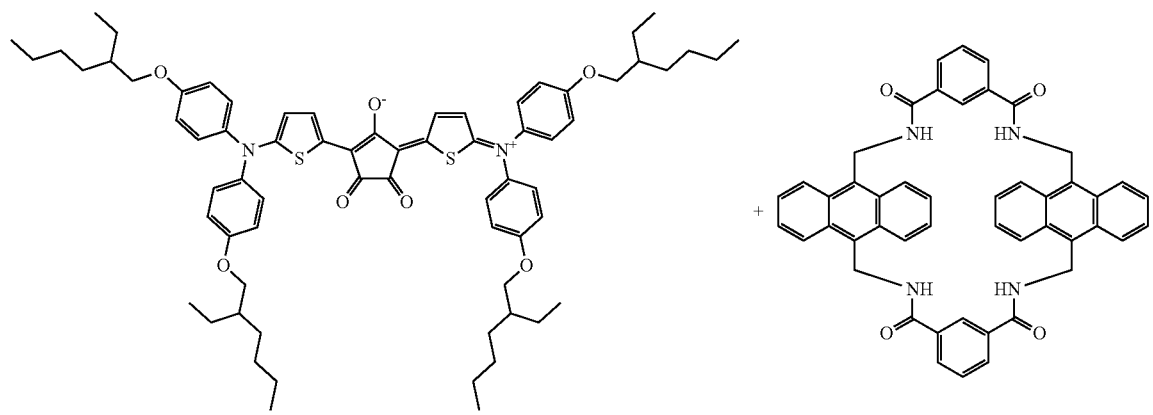

[Chemical Formula 5-31]
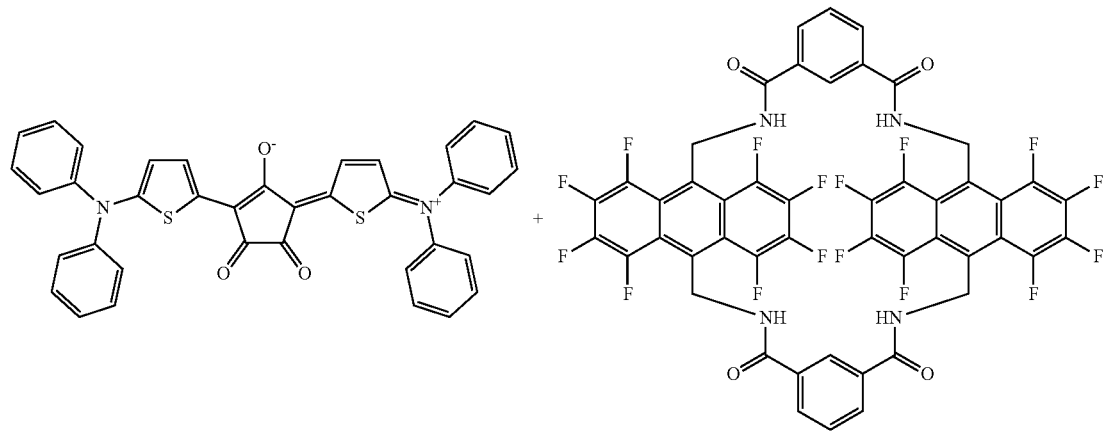
[Chemical Formula 5-32]
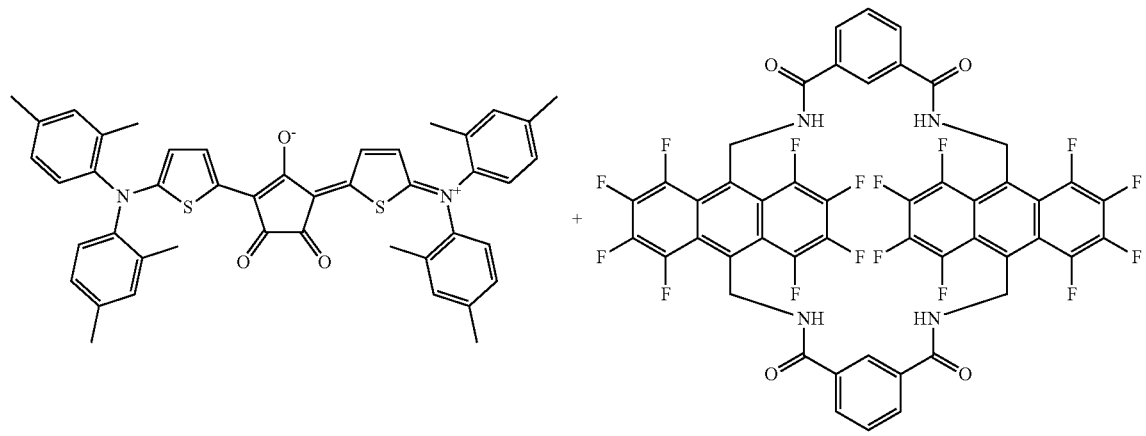
[Chemical Formula 5-33]
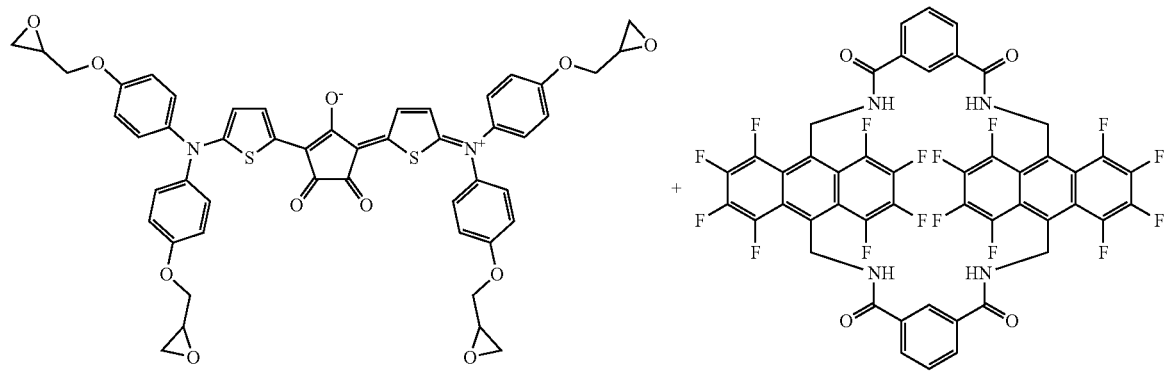

[Chemical Formula 5-34]
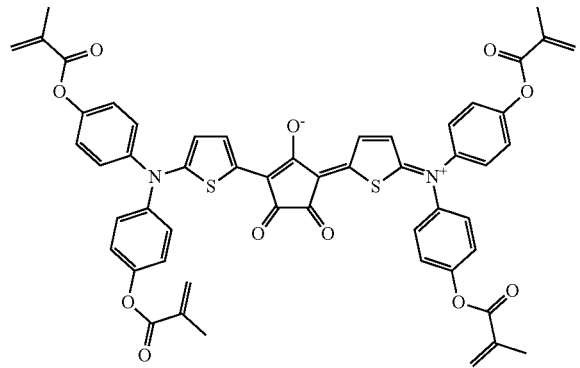 + 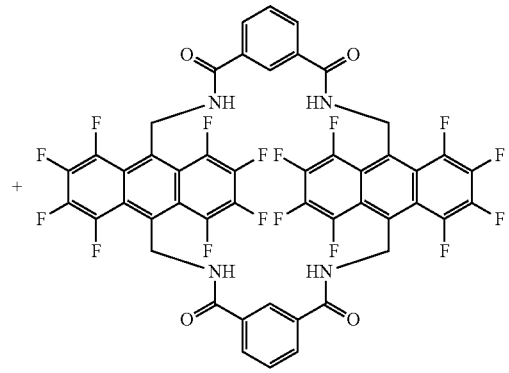
[Chemical Formula 5-35]
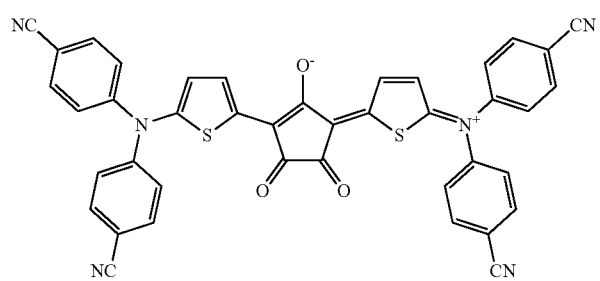 + 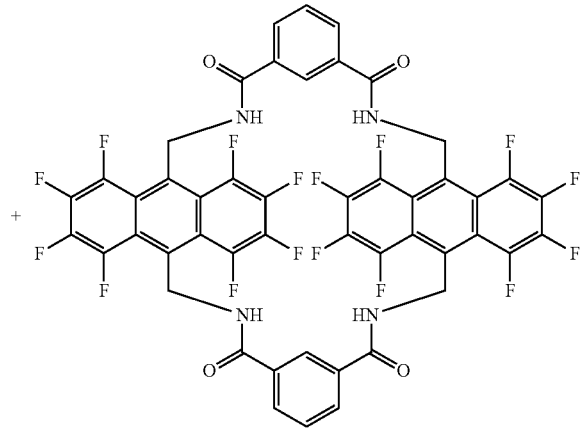
[Chemical Formula 5-36]
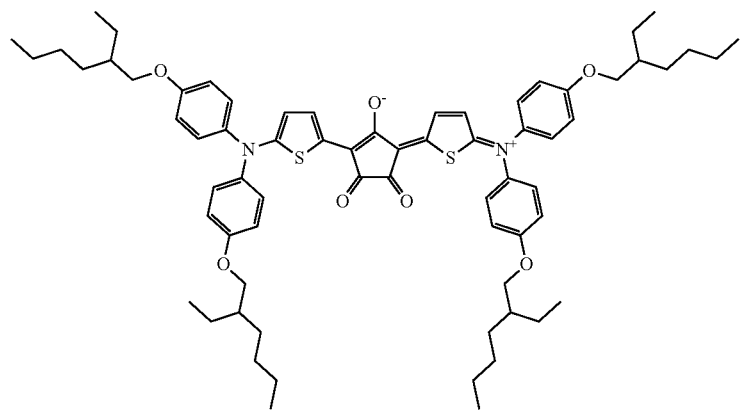 + 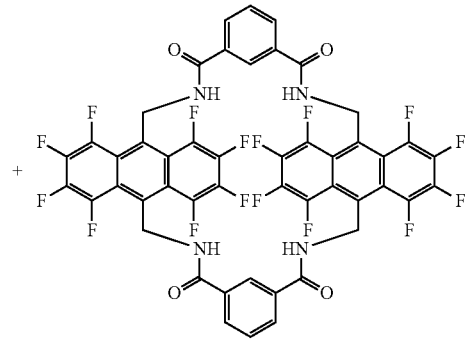

-continued
[Chemical Formula 5-37]
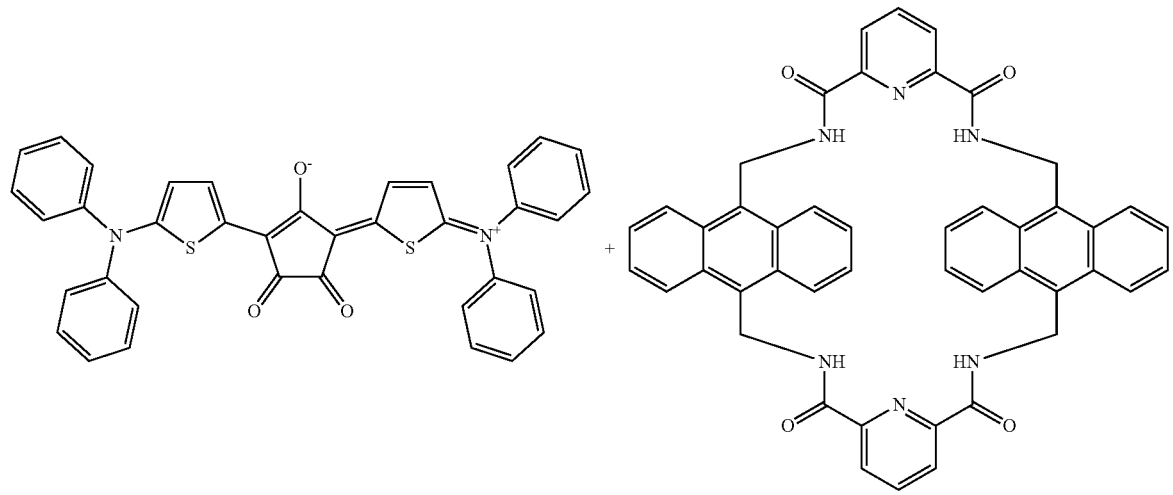
[Chemical Formula 5-38]
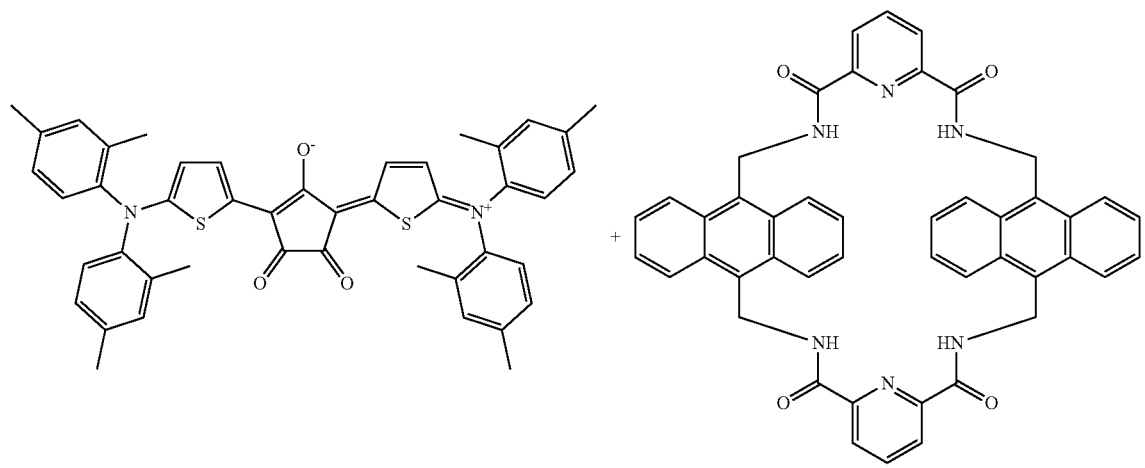
[Chemical Formula 5-39]
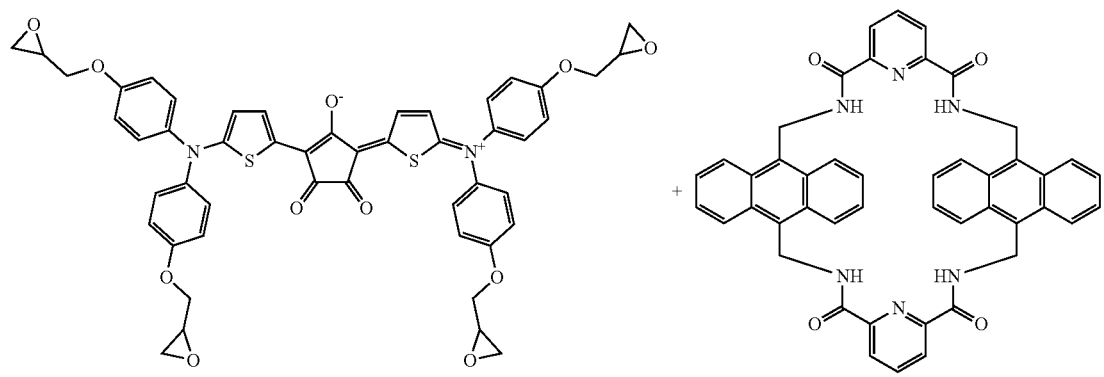

[Chemical Formula 5-40]
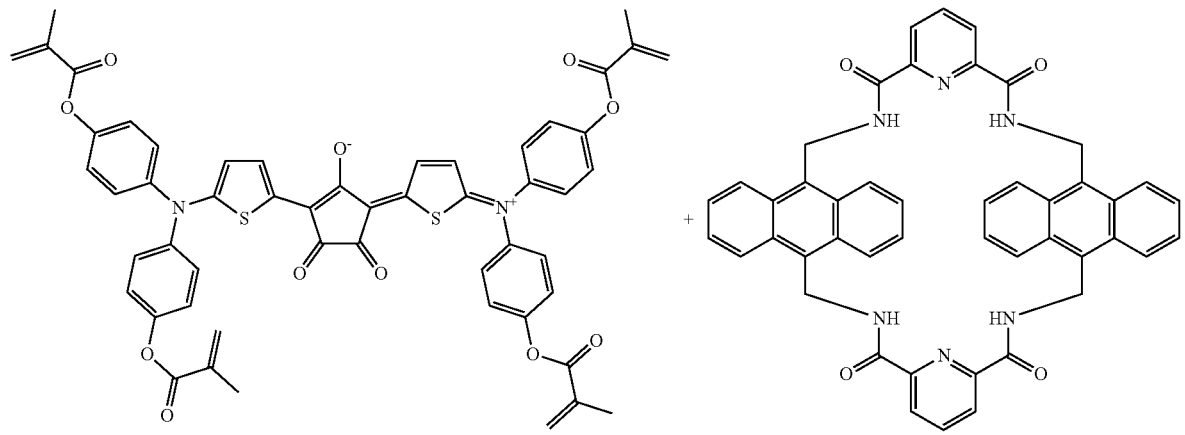
[Chemical Formula 5-41]
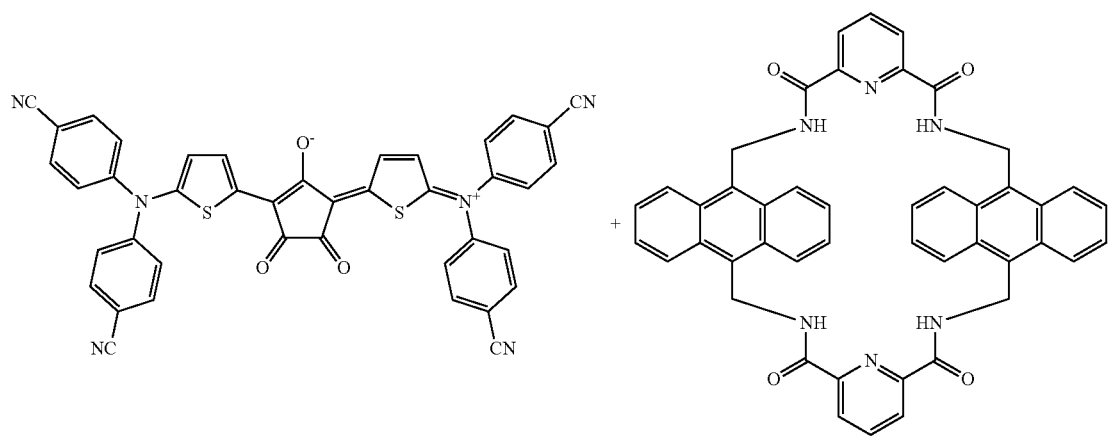
[Chemical Formula 5-42]
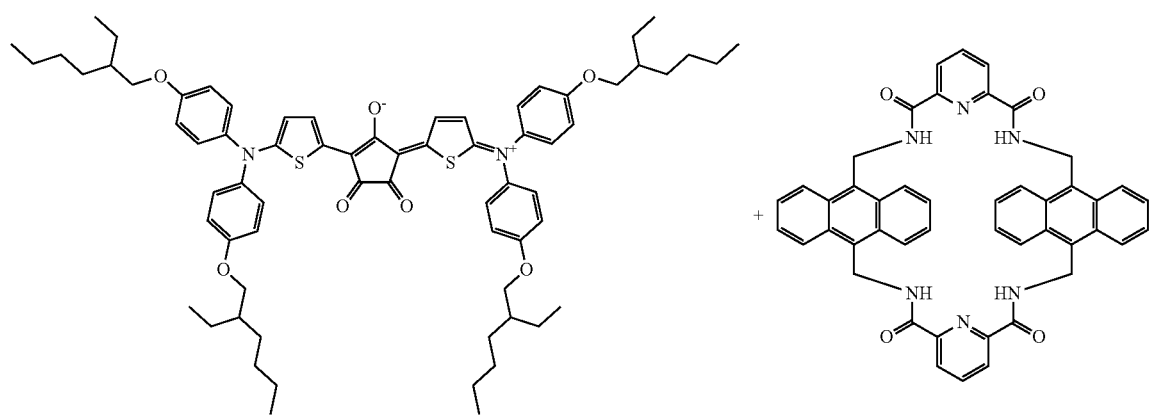

-continued
[Chemical Formula 5-43]
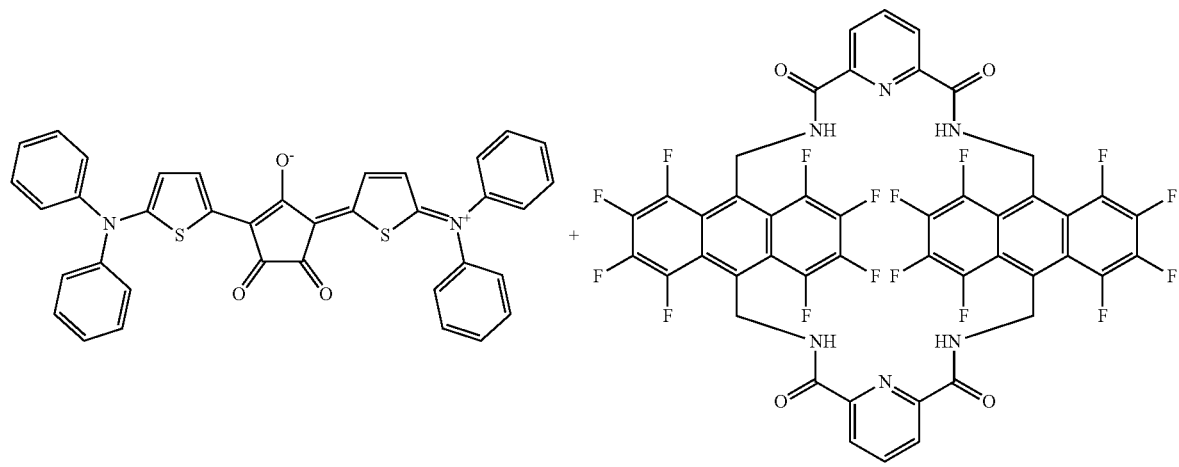
[Chemical Formula 5-44]
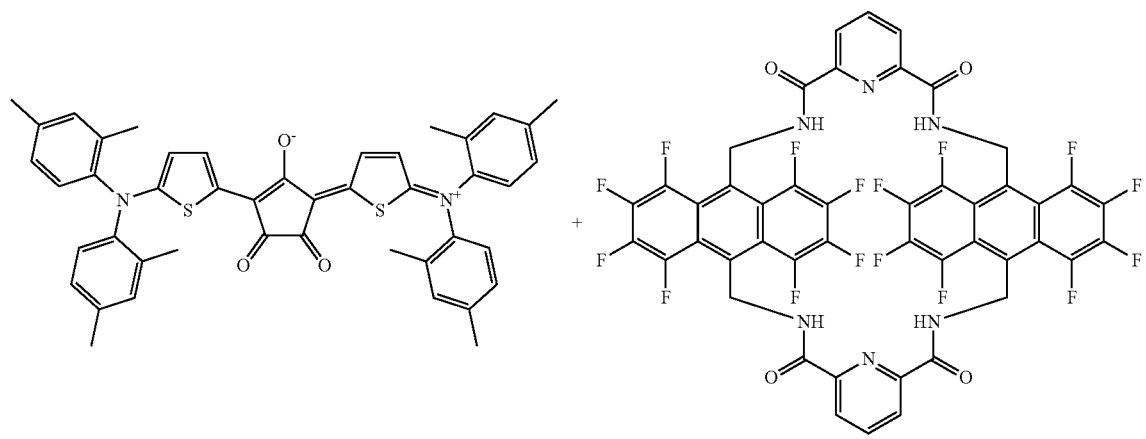
[Chemical Formula 5-45]
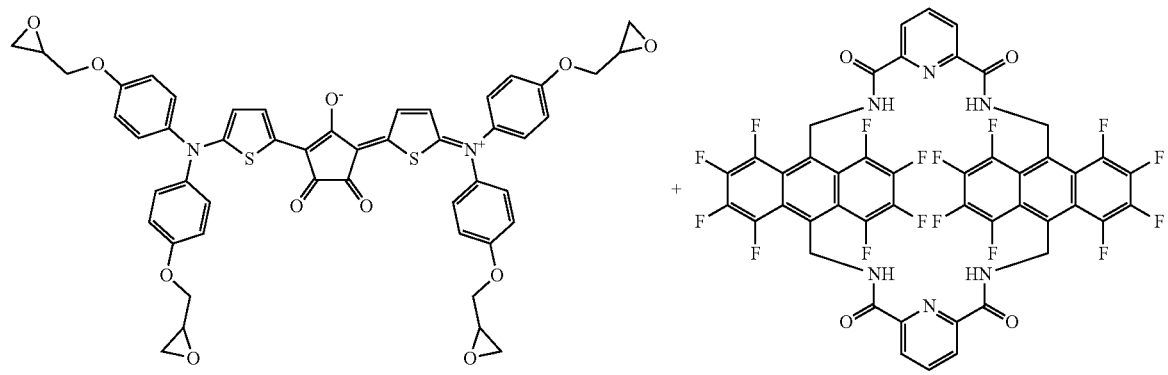

-continued

[Chemical Formula 5-46]

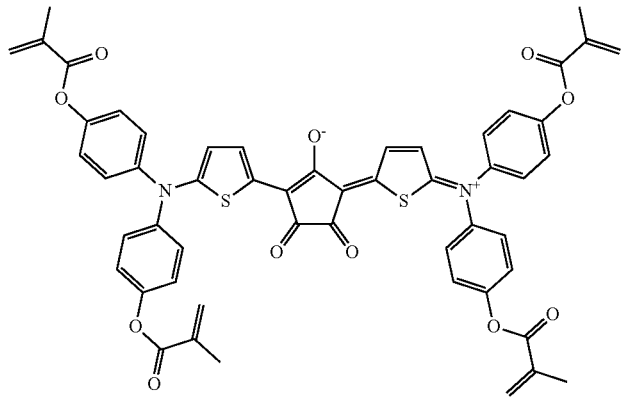
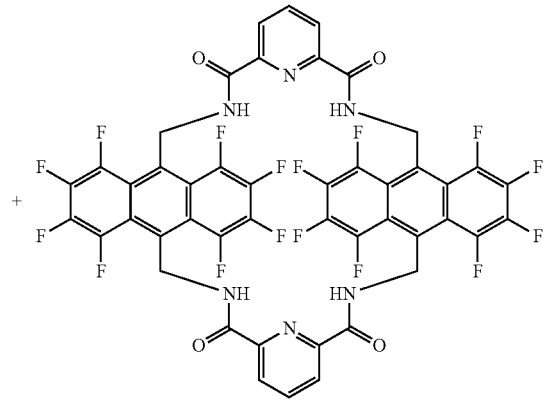

[Chemical Formula 5-47]

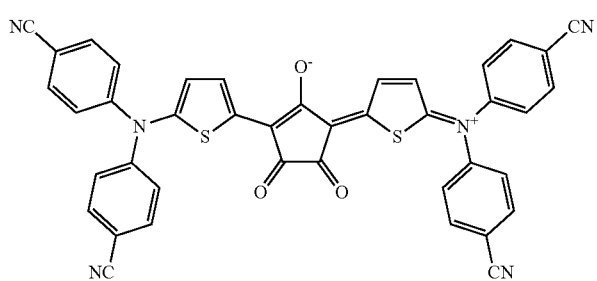
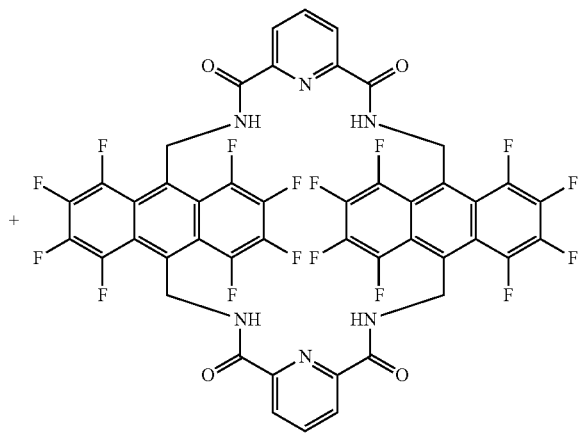

[Chemical Formula 5-48]

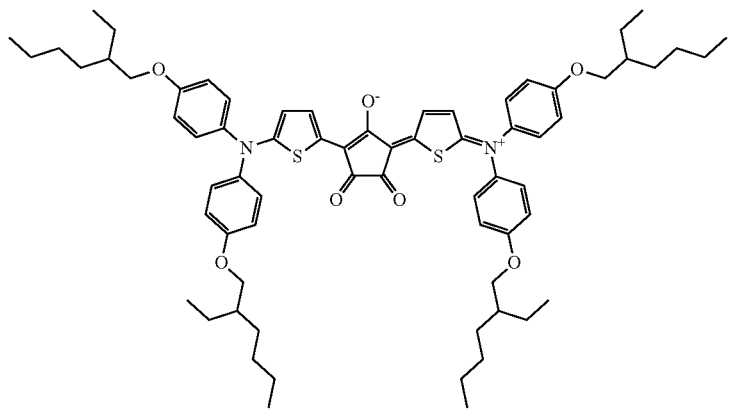
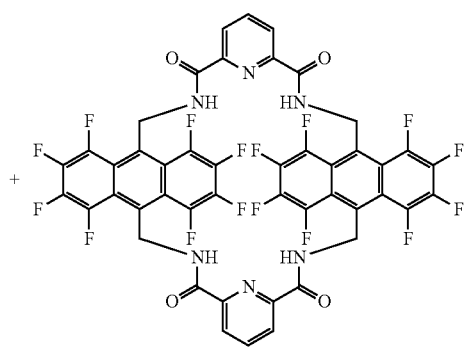

In an implementation, the core-shell dye may have a maximum absorption peak at a wavelength of, e.g., about 800 nm to about 1,000 nm.

In an implementation, a halogen group may not be included in the shell represented by Chemical Formula 2, and the core-shell dye including the same may have a maximum absorption peak at a wavelength of, e.g., about 800 nm to about 900 nm. In an implementation, a halogen group may be included in the shell represented by Chemical Formula 2, and it may have a maximum absorption peak at a wavelength of, e.g., about 850 nm to about 1,000 nm.

In an implementation, when a halogen group is included in the shell represented by Chemical Formula 2, the maximum absorption peak of the core-shell compound may shift to a long wavelength region, and the matching to the near-infrared absorption wavelength band may be improved, compared to a case where a halogen group is not included.

In an implementation, the core-shell dye may be used alone as a near-infrared absorbing dye, or may be used in combination with a toning dye.

Examples of the toning dye may include a triarylmethane dye, an anthraquinone dye, a benzylidene dye, a cyanine dye, a phthalocyanine dye, an azaporphyrin dye, an indigo dye, a xanthene dye, a pyridone azo dye, and the like.

(Near-Infrared Absorbing Resin Composition)

According to another embodiment, a near-infrared absorbing resin composition including the compound represented by Chemical Formula 1 or the core-shell dye is provided.

The near-infrared absorbing resin composition may include, e.g., (A) a colorant (the core-shell dye), (B) a binder resin, and (C) a solvent.

Hereinafter, each component is described in detail.

(A) Colorant

The colorant may include the core-shell dye, and the core-shell dye has been described above.

In an implementation, the colorant may further include, e.g., a pigment in addition to the core-shell dye.

The pigment may include, e.g., a green pigment, a blue pigment, a red pigment, a purple pigment, a yellow pigment, a black pigment, or the like.

In an implementation, the red pigment may include, e.g., C.I. red pigment 254, C.I. red pigment 255, C.I. red pigment 264, C.I. red pigment 270, C.I. red pigment 272, C.I. red pigment 177, C.I. red pigment 89, or the like within the color index, and these may be used alone or in combination of two or more.

In an implementation, the purple pigment may include, e.g., C.I. violet pigment 23 V.23, C.I. violet pigment 29, dioxazine violet, first violet B, methyl violet lake, indanthrene brilliant violet, or the like within the color index, and these may be used alone or in combination of two or more.

In an implementation, the green pigment may include, e.g., C.I. green pigment 7, C.I. green pigment 36, C.I. green pigment 58, C.I. green pigment 59, or the like within the color index, and these may be used alone or in combination of two or more.

In an implementation, the blue pigment may include, e.g., a copper phthalocyanine pigment such as C.I. blue pigment 15:6, C.I. blue pigment 15, C.I. blue pigment 15:1, C.I. blue pigment 15:2, C.I. blue pigment 15:3, C.I. blue pigment 15:4, C.I. blue pigment 15:5, C.I. blue pigment 15:6, or C.I. blue pigment 16 within the color index, and these may be used alone or in combination of two or more.

In an implementation, the yellow pigment may include, e.g., an isoindoline pigment such as C.I. yellow pigment 185, C.I. yellow pigment 139, or the like, a quinophthalone pigment such as C.I. yellow pigment 138, or a nickel complex pigment such as C.I. yellow pigment 150, within the color index, and these may be used alone or in combination of two or more.

In an implementation, the black pigment may include, e.g., aniline black, perylene black, titanium black, carbon black, or the like within the color index, and these may be used alone or in combination of two or more.

In an implementation, the pigments may be included in the near-infrared absorbing resin composition in the form of a dispersion. Such a pigment dispersion may be composed of the pigment, a solvent, a dispersant, a dispersion resin, or the like.

The solvent may include, e.g., ethylene glycol acetate, ethyl cellosolve, propylene glycol methyl ether acetate, ethyl lactate, polyethylene glycol, cyclohexanone, propylene glycol methyl ether, or the like. In an implementation, propylene glycol methyl ether acetate may be used.

The dispersant helps the pigment to be uniformly dispersed in the dispersion, and all the nonionic, anionic, or cationic dispersants may be used. In an implementation, polyalkylene glycol or its ester, polyoxyalkylene, a polyhydric alcohol ester alkylene oxide adduct, an alcohol alkylene oxide adduct, a sulfonic acid ester, a sulfonic acid salt, a carboxylic acid ester, a carboxylic acid salt, an alkyl amide alkylene oxide adduct, an alkylamine, or the like may be used, and these may be used alone or in combination of two or more.

In an implementation, as the dispersion resin, an acrylic resin including a carboxyl group may be used, which may improve the stability of the pigment dispersion as well as the patternability of the pixel.

When the core-shell dye and the pigment are mixed and used, they may be used in a weight ratio of, e.g., about 1:9 to about 9:1, or about 3:7 to about 7:3. When mixing in the above weight ratio ranges, chemical resistance, durability, and maximum absorption wavelength may be controlled in an appropriate range, and high luminance and contrast ratio may be exhibited in a desired color coordinate.

In an implementation, the core-shell dye may be included in an amount of, e.g., about 0.5 wt % to about 10 wt %, based on the total weight of the near-infrared absorbing resin composition. When the core-shell dye is used within the above range, chemical resistance, durability, and maximum absorption wavelength may be controlled in an appropriate range, and high luminance and contrast ratio may be exhibited in a desired color coordinate. In an implementation, it may be included in an amount of, e.g., about 0.5 wt % to about 5 wt %, and even if the amount of dye is reduced in this way, chemical resistance, durability, and maximum absorption wavelength may be controlled in an appropriate range.

(B) Binder Resin

The binder resin may be an organic binder, e.g., an acrylic binder. In an implementation, the acrylic binder may include, e.g., a curable binder, and may include, e.g., a thermosetting binder, a photocurable binder, or a combination thereof.

In an implementation, the organic binder may include, e.g., methyl cellulose, ethyl cellulose, hydroxypropyl methyl cellulose (HPMC), hydroxypropyl cellulose (HPC), xanthan gum, polyvinyl alcohol (PVA), polyvinyl pyrrolidone (PVP), carboxy methyl cellulose, hydroxyl ethyl cellulose, or a combination thereof.

In an implementation, a methacrylic acid/benzylmethacrylate copolymer may be used, as in examples to be described below, and their copolymerization ratio may be, e.g., about 1:99 to about 99:1, or about 10:90 to about 20:80, as a weight ratio of methacrylic acid:benzyl methacrylate.

(C) Solvent

In an implementation, the solvent may include, e.g., alcohols such as methanol or ethanol; ethers such as dichloroethyl ether, n-butyl ether, diisoamyl ether, methylphenyl ether, tetrahydrofuran, or the like; glycol ethers such as ethylene glycol methylether, ethylene glycol ethylether, propylene glycol methylether, or the like; cellosolve acetates such as methyl cellosolve acetate, ethyl cellosolve acetate, diethyl cellosolve acetate, or the like; carbitols such as methylethyl carbitol, diethyl carbitol, diethylene glycol monomethylether, diethylene glycol monoethylether, diethylene glycol dimethylether, diethylene glycol methylethylether, diethylene glycol diethylether, or the like; propylene glycol alkylether acetates such as propylene glycol methylether acetate, propylene glycol propylether acetate, or the like; aromatic hydrocarbons such as toluene, xylene or the like; ketones such as methylethylketone, cyclohexanone, 4-hydroxy-4-methyl-2-pentanone, methyl-n-propylketone, methyl-n-butylketone, methyl-n-amylketone, 2-heptanone, or the like; saturated aliphatic monocarboxylic acid alkyl esters such as ethyl acetate, n-butyl acetate, isobutyl acetate, or the like; lactate esters such as methyl lactate, ethyl lactate, or the like; hydroxyacetic acid alkyl esters such as methyl hydroxyacetate, ethyl hydroxyacetate, butyl hydroxyacetate, or the like; acetic acid alkoxyalkyl esters such as methoxymethyl acetate, methoxyethyl acetate, methoxybutyl acetate, ethoxymethyl acetate, ethoxyethyl acetate, or the like; 3-hydroxypropionic acid alkyl esters such as methyl 3-hydroxypropionate, ethyl 3-hydroxypropionate, or the like; 3-alkoxypropionic acid alkyl esters such as methyl 3-methoxypropionate, ethyl 3-methoxypropionate, ethyl 3-ethoxypropionate, methyl 3-ethoxypropionate, or the like; 2-hydroxypropionic acid alkyl esters such as methyl 2-hydroxypropionate, ethyl 2-hydroxypropionate, propyl 2-hydroxypropionate, or the like; 2-alkoxypropionic acid alkyl esters such as methyl 2-methoxypropionate, ethyl 2-methoxypropionate, ethyl 2-ethoxypropionate, methyl 2-ethoxypropionate, or the like; 2-hydroxy-2-methylpropionic acid alkyl esters such as methyl 2-hydroxy-2-methylpropionate, ethyl 2-hydroxy-2-methylpropionate, or the like; 2-alkoxy-2-methylpropionic acid alkyl esters such as methyl 2-methoxy-2-methylpropionate, ethyl 2-ethoxy-2-methylpropionate, or the like; esters such as 2-hydroxyethyl propionate, 2-hydroxy-2-methylethyl propionate, hydroxyethyl acetate, methyl 2-hydroxy-3-methylbutanoate, or the like; or ketonate esters such as ethyl pyruvate, or the like. In an implementation, the solvent may include, e.g., N-methylformamide, N,N-dimethyl formamide, N-methylformanilide, N-methylacetamide, N,N-dimethyl acetamide, N-methylpyrrolidone, dimethylsulfoxide, benzylethylether, dihexylether, acetylacetone, isophorone, caproic acid, caprylic acid, 1-octanol, 1-nonanol, benzylalcohol, benzyl acetate, ethyl benzoate, diethyl oxalate, diethyl maleate, γ-butyrolactone, ethylene carbonate, propylene carbonate, phenyl cellosolve acetate, or the like, and they may be used alone or as a mixture of two or more.

Considering miscibility and reactivity, the solvent may include glycol ethers such as ethylene glycol monoethyl ether, or the like; ethylene glycol alkylether acetates such as ethyl cellosolve acetate, or the like; esters such as 2-hydroxyethyl propionate, or the like; diethylene glycols such as diethylene glycol monomethyl ether, or the like; propylene glycol alkylether acetates such as propylene glycol monomethylether acetate, propylene glycol propylether acetate, or the like.

The solvent may be included in a balance amount, e.g., about 20 wt % to about 90 wt %, based on the total weight of the near-infrared absorbing resin composition. When the solvent is included within the above range, the near-infrared absorbing resin composition may have excellent applicability, and excellent flatness may be maintained in a film having a thickness of 3 μm or more.

(D) Other Additives

In an implementation, the near-infrared absorbing resin composition may further include other additives, e.g., malonic acid; 3-amino-1,2-propanediol; a silane coupling agent including a vinyl group or a (meth)acryloxy group; a leveling agent; a fluorine surfactant; or a radical polymerization initiator, in order to help prevent stains or spots during the coating, to adjust leveling, or to help prevent pattern residue due to non-development.

In an implementation, the near-infrared absorbing resin composition may further include an epoxy compound in order to help improve close-contacting properties with a substrate.

Examples of the epoxy compound may include a phenol novolac epoxy compound, a tetramethyl biphenyl epoxy compound, a bisphenol A epoxy compound, an alicyclic epoxy compound, or a combination thereof.

A use amount of the additive may be controlled depending on desired properties.

Another embodiment provides a near-infrared absorbing film manufactured using the aforementioned near-infrared absorbing resin composition. A method of manufacturing the near-infrared absorbing film is as follows.

The aforementioned near-infrared absorbing resin composition may be coated on the polymer film by using a suitable method such as bar coating, spin coating, or slit coating. Thereafter, drying, thermal curing, or light curing may be performed to finally obtain a near-infrared absorbing film.

The near-infrared absorbing film may effectively absorb light in the near-infrared region regardless of the incident direction, and it may effectively absorb and block the light in the near-infrared region that is incident from the side direction, so that it is possible to reduce or prevent distortion of a signal due to light in the visible region by the light in the near-infrared region incident from the side.

Another embodiment provides an optical filter including the aforementioned near-infrared absorbing film. In addition, another embodiment provides a CMOS image sensor including the aforementioned optical filter.

When the optical filter including the near-infrared absorbing film is applied to the CMOS image sensor, occurrence of optical distortion due to the near-infrared rays may be reduced or prevented.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

SYNTHESIS EXAMPLES

Synthesis Example 1: Synthesis of Core-shell Dye Represented by Chemical Formula 5-1

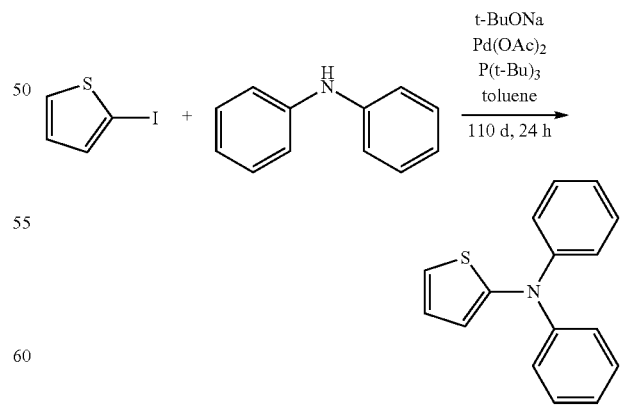

2-iodothiophene (4.7 mmol), diphenylamine (9.5 mmol), Pd(OAc)₂ (0.33 mmol), t-BuONa (5.9 mmol), and 10 ml of toluene were sequentially put in a round-bottomed flask and then stirred. Under a nitrogen atmosphere, P(t-Bu)₃ (0.75 mmol) was added thereto and then, stirred at 110° C. for 24 hours. Subsequently, ethyl acetate and distilled water were used to separate an organic layer therefrom, which was purified through column chromatography and dried. (Yield: 45%)

[Reaction Scheme 2]

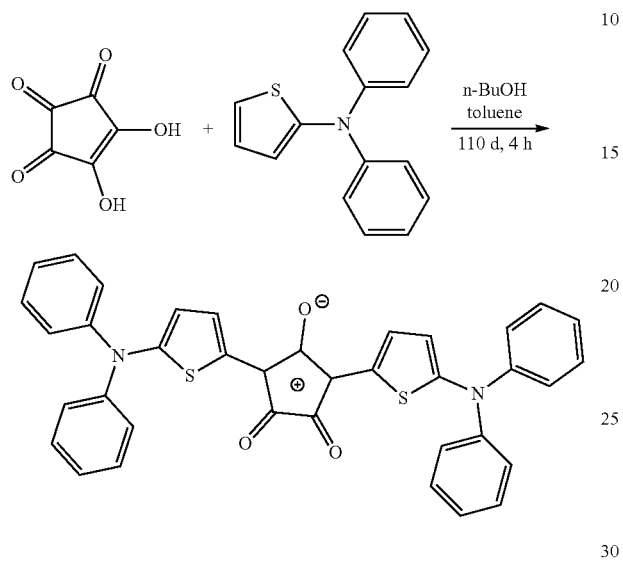

The product represented by Reaction Scheme 1 (14.3 mmol), croconic acid (7 mmol), 20 ml of n-BuOH, and 20 ml of toluene were put in a round-bottomed flask and then stirred at 110° ° C. for 4 hours. The resultant was cooled to ambient temperature, solidified, and washed with hexane, filtered, and dried. (Yield: 66%)

[Reaction Scheme 3]

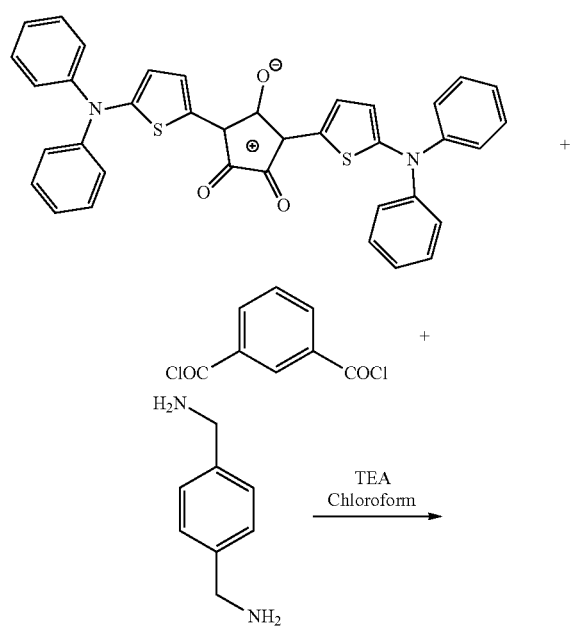

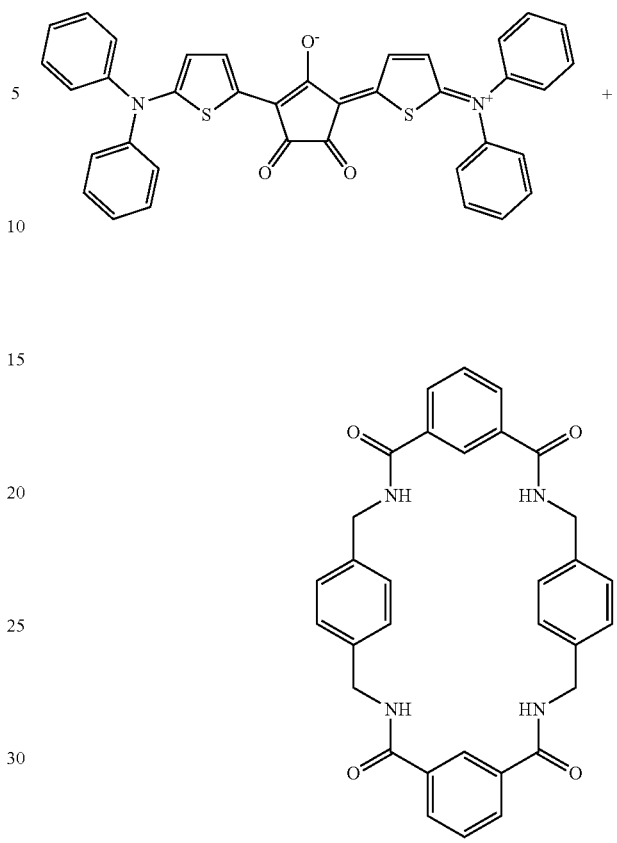

The product of Reaction Scheme 2 (5 mmol) was dissolved in 600 mL a chloroform solvent, and then, isophthaloyl chloride (20 mmol) and p-xylylene diamine (20 mmol) dissolved in 60 mL of chloroform were added dropwise thereto at ambient temperature for 5 hours at the same time. After 12 hours, the mixture was distilled under a reduced pressure and separated through column chromatography, obtaining a core-shell dye represented by Chemical Formula 5-1. (Yield: 23%)

[Chemical Formula 5-1]

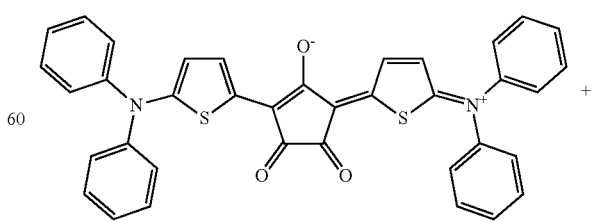

-continued

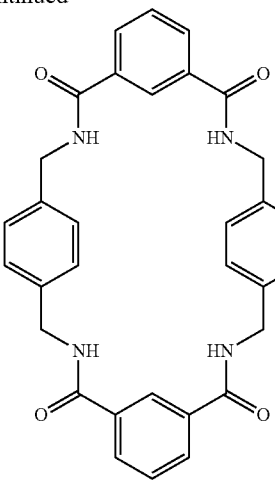

MALDI-TOF MS : 1141.33 m/z

Synthesis Example 2: Synthesis of Core-shell Dye Represented by Chemical Formula 5-7

A core-shell dye represented by Chemical Formula 5-7 was synthesized in the same manner as in Synthesis Example 1 except that tetrafluoro-p-xylylene diamine was used instead of the p-xylylene diamine.

[Chemical Formula 5-7]

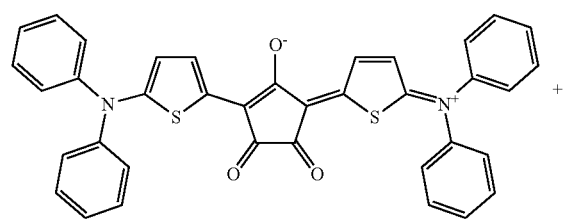

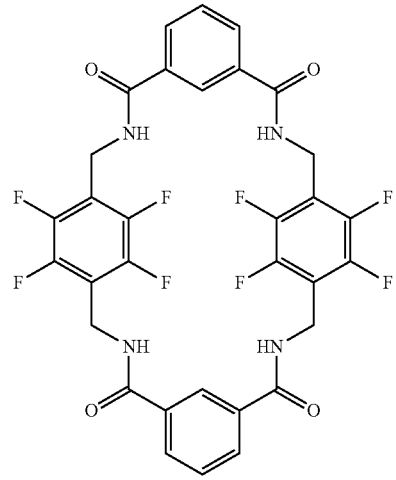

MALDI-TOF MS : 1285.2 m/z

Synthesis Example 3: Synthesis of Core-shell Dye Represented by Chemical Formula 5-13

A core-shell dye represented by Chemical Formula 5-13 was synthesized in the same manner as in Synthesis Example 1 except that pyridinedicarbonyl dichloride was used instead of the isophthaloyl chloride.

[Chemical Formula 5-13]

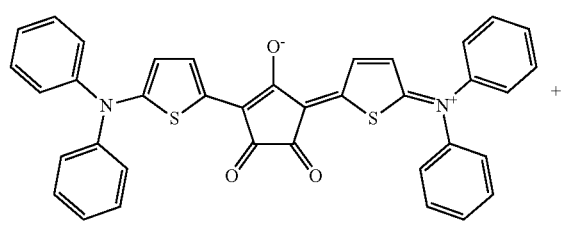

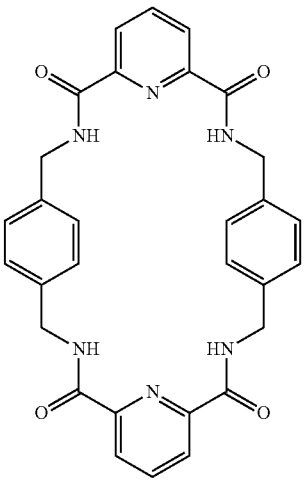

MALDI-TOF MS : 1143.3 m/z

Synthesis Example 4: Synthesis of Core-shell Dye Represented by Chemical Formula 5-19

A core-shell dye represented by Chemical Formula 5-19 was synthesized in the same manner as in Synthesis Example 1 except that pyridinedicarbonyl dichloride was used instead of the isophthaloyl chloride, and tetrafluoro-p-xylylene diamine was used instead of the p-xylylene diamine.

[Chemical Formula 5-19]

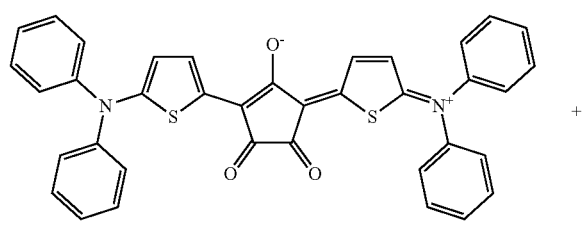

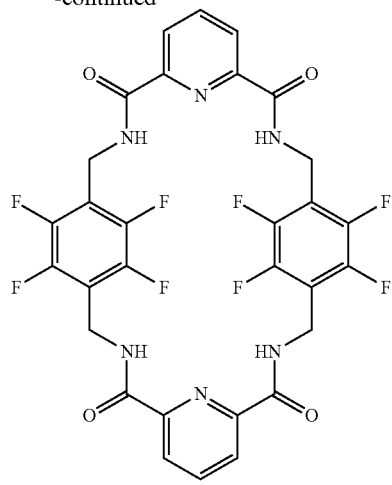

MALDI-TOF MS : 1287.2 m/z

Synthesis Example 5: Synthesis of Core-shell Dye Represented by Chemical Formula 5-25

A core-shell dye represented by Chemical Formula 5-25 was synthesized in the same manner as in Synthesis Example 1 except that 9,10-bismethylamine-anthracene was used instead of the p-xylylene diamine.

[Chemical Formula 5-25]

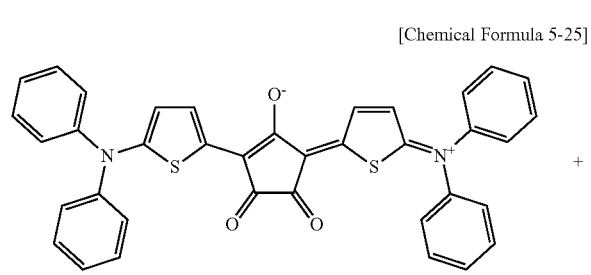

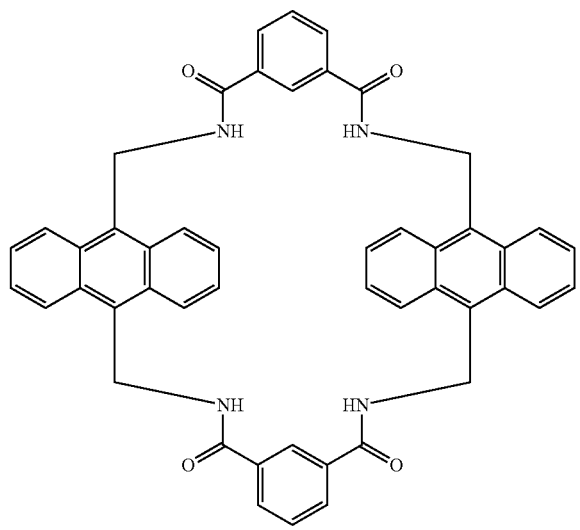

MALDI-TOF MS : 1341.5 m/z

Synthesis Example 6: Synthesis of Core-shell Dye Represented by Chemical Formula 5-31

A core-shell dye represented by Chemical Formula 5-31 was synthesized in the same manner as in Synthesis Example 1 except that octafluoro-9,10-bismethylamine-anthracene was used instead of the p-xylylene diamine.

[Chemical Formula 5-31]

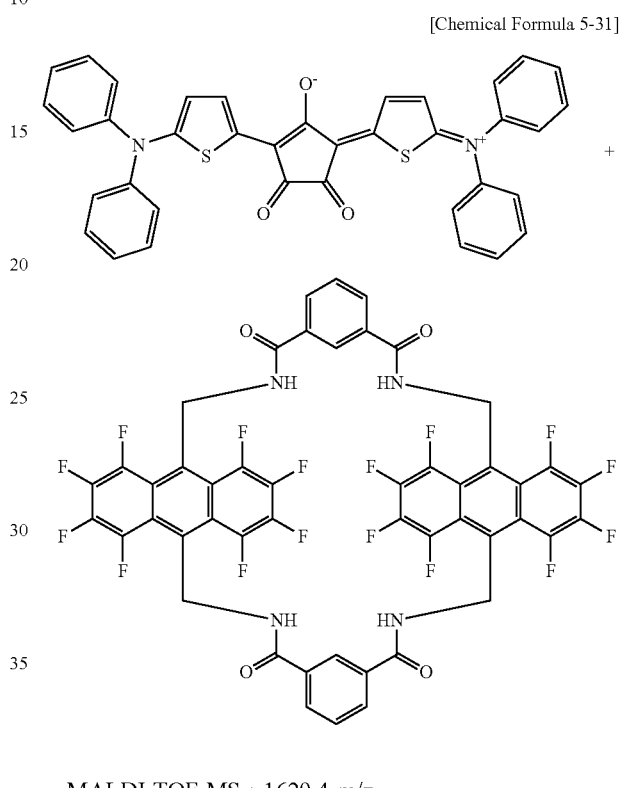

MALDI-TOF MS : 1629.4 m/z

Synthesis Example 7: Synthesis of Core-shell Dye Represented by Chemical Formula 5-37

A core-shell dye represented by Chemical Formula 5-37 was synthesized in the same manner as in Synthesis Example 1 except that pyridinedicarbonyl dichloride was used instead of the isophthaloyl chloride, and 9,10-bismethylamine-anthracene was used instead of the p-xylylene diamine.

[Chemical Formula 5-37]

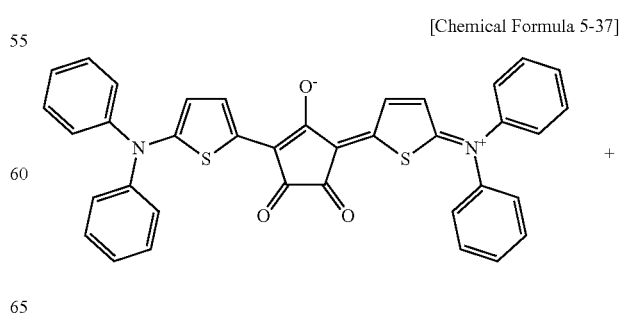

57
-continued

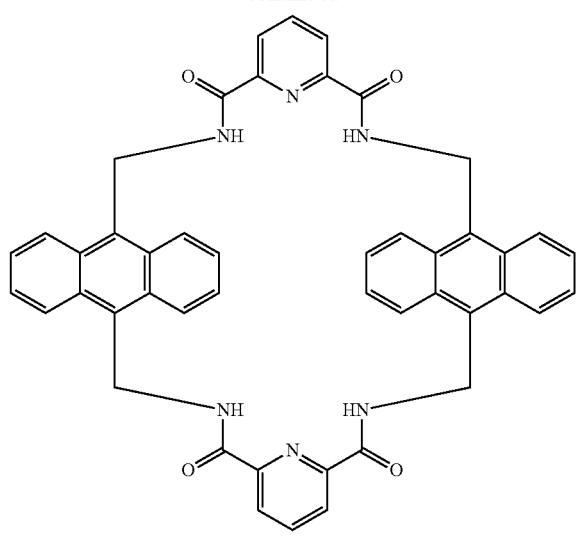

MALDI-TOF MS : 1343.5 m/z

Synthesis Example 8: Synthesis of Core-shell Dye Represented by Chemical Formula 5-43

A core-shell dye represented by Chemical Formula 5-43 was synthesized in the same manner as in Synthesis Example 1 except that pyridinedicarbonyl dichloride was used instead of the isophthaloyl chloride, and tetrafluoro-9,10-bismethylamine-anthracene was used instead of the p-xylylene diamine.

[Chemical Formula 5-43]

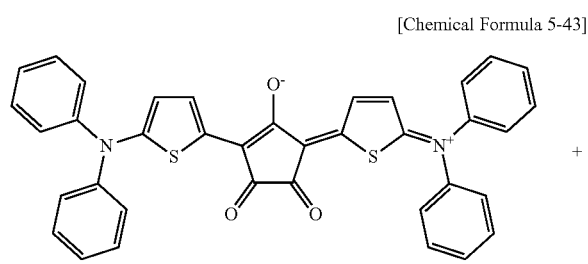

58
Synthesis Example 9: Synthesis of Core-shell Dye Represented by Chemical Formula 5-44

A core-shell dye represented by Chemical Formula 5-44 was synthesized in the same manner as in Synthesis Example 1 except that bis(2,4-dimethylphenyl)amine instead of the diphenylamine, pyridinedicarbonyl dichloride instead of the isophthaloyl chloride, and tetrafluoro-9,10-bismethylamine-anthracene instead of the p-xylylene diamine were used.

[Chemical Formula 5-44]

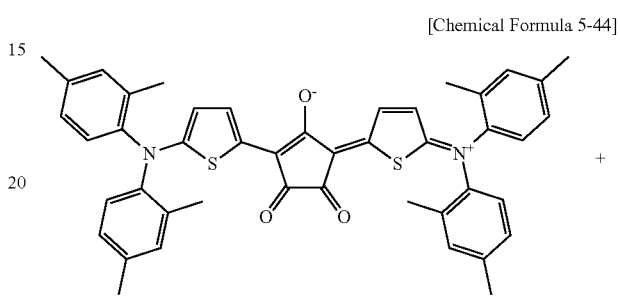

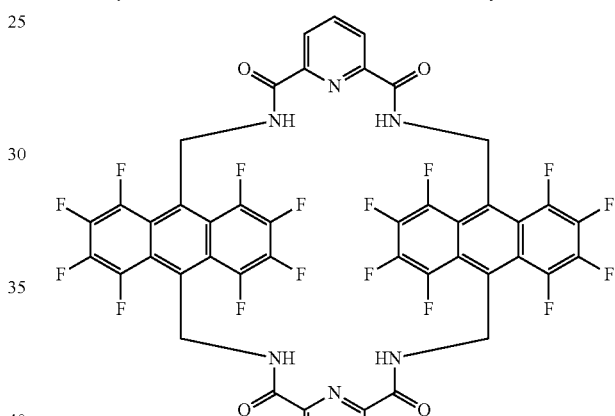

MALDI-TOF MS : 1743.6 m/z

Synthesis Example 10: Synthesis of Core-shell Dye Represented by Chemical Formula 5-45

[Reaction Scheme 4]

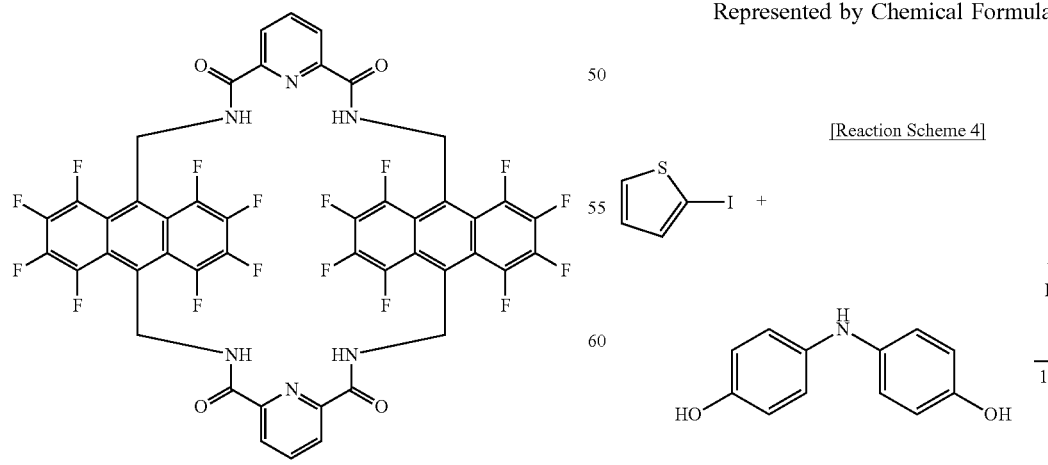

MALDI-TOF MS : 1631.3 m/z

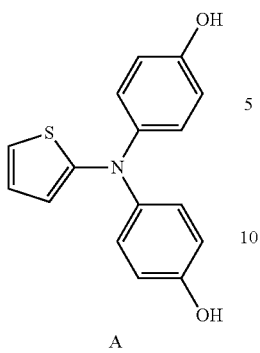

A

Compound A as an intermediate was obtained in same synthesis method as Reaction Scheme 1 except that 4,4'-dihydroxydiphenylamine was used instead of the diphenylamine.

[Reaction Scheme 5]

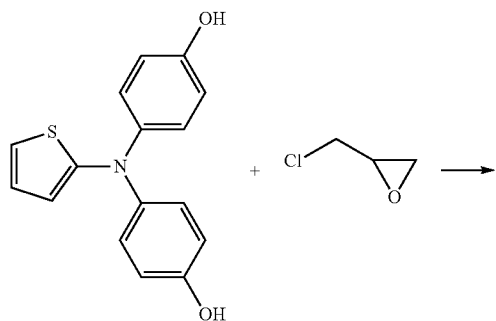

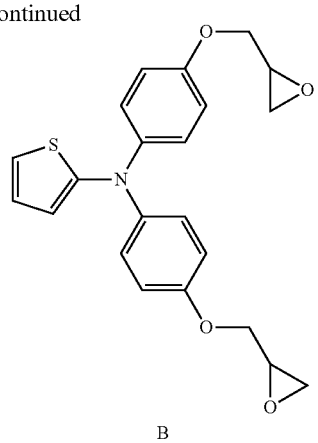

B

In a round-bottomed flask, Intermediate A (3 mmol), KOH (7.5 mmol), epichlolrohydrin (9 mmol), and 10 ml of DMSO were sequentially put and then, stirred at 50° ° C.for 4 hours. Subsequently, ethyl acetate and distilled water were used to separate an organic layer, which was purified through column chromatography, and dried, obtaining Compound B. (Yield: 30%)

A core-shell dye represented by Chemical Formula 5-45 was synthesized in the same manner as in Synthesis Example 1 except that Compound B was used, and pyridinedicarbonyl dichloride instead of the isophthaloyl chloride and tetrafluoro-9,10-bismethylamine-anthracene instead of the p-xylylene diamine were used.

[Chemical Formula 5-45]

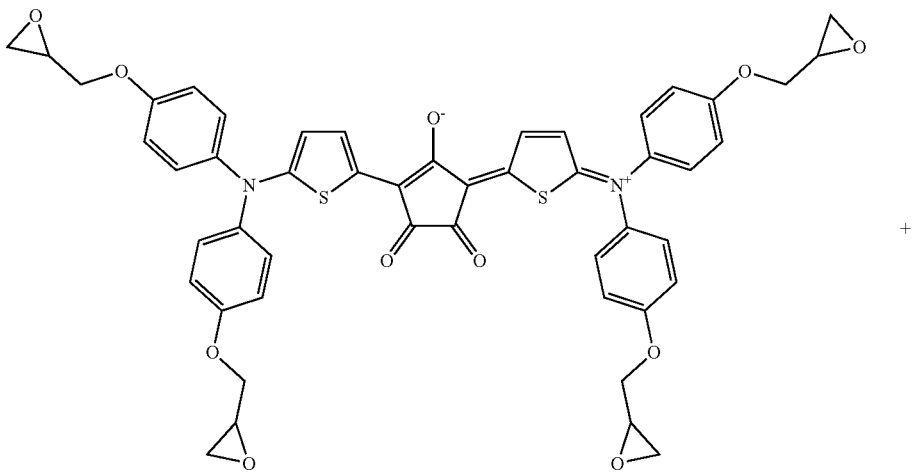

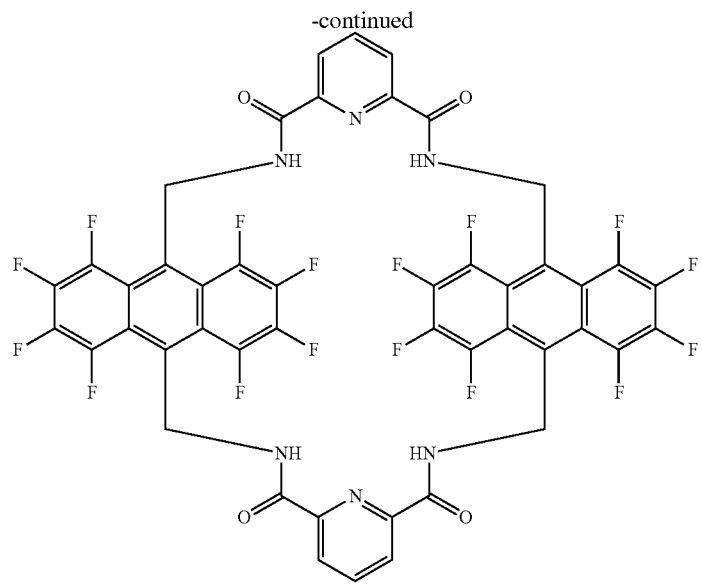

MALDI-TOF MS : 1919.5 m/z

Synthesis Example 11: Synthesis of Core-shell Dye Represented by Chemical Formula 5-46

[Reaction Scheme 6]

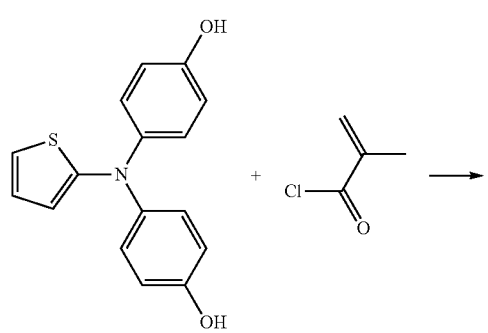

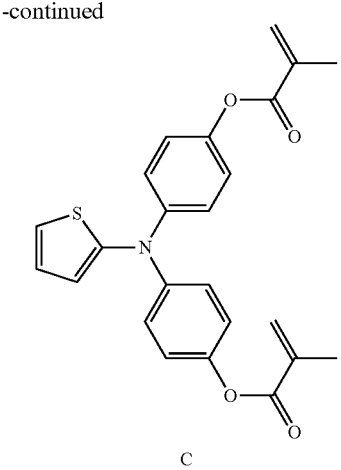

C

In a round-bottomed flask, Intermediate A (3 mmol), triethylamine (7.5 mmol), methacryloyl chloride (9 mmol), and 10 ml of methyl chloride were sequentially put and then, stirred at ambient temperature for 30 minutes. Subsequently, ethyl acetate and distilled water were used to separate an organic layer therefrom, which was purified through column chromatography and dried, obtaining Compound C as an intermediate. (Yield: 50%)

A core-shell dye represented by Chemical Formula 5-46 was synthesized in the same synthesis method as in Synthesis Example 1, except that Compound C was used, and pyridinedicarbonyl dichloride instead of the isophthaloyl chloride and tetrafluoro-9,10-bismethylamine-anthracene instead of the p-xylylene diamine were used.

[Chemical Formula 5-46]

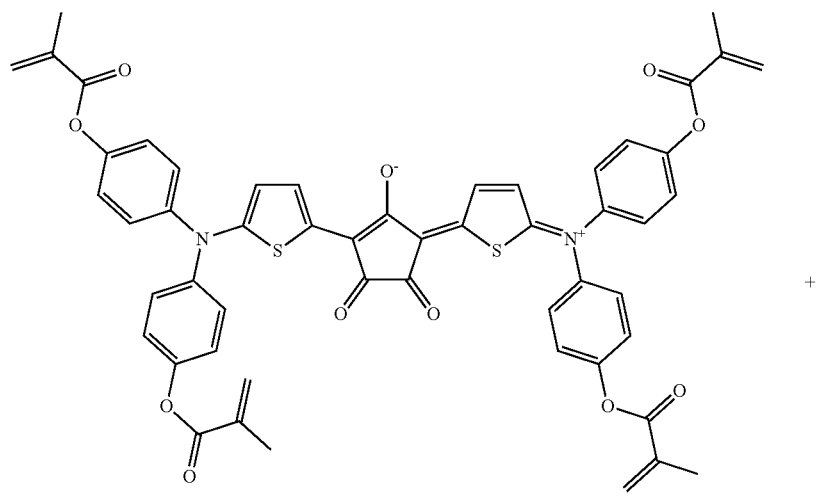

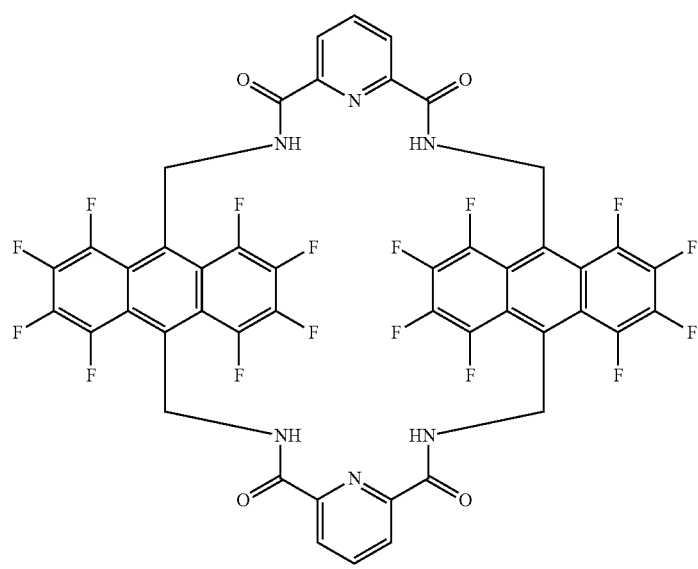

MALDI-TOF MS : 1967.6 m/z

Synthesis Example 12: Synthesis of Core-shell Dye Represented by Chemical Formula 5-47

A core-shell dye represented by Chemical Formula 5-47 was synthesized in the same synthesis method as in Synthesis Example 1, except that 4,4'-dicyanophenylamine instead of the diphenylamine, pyridinedicarbonyl dichloride instead of the isophthaloyl chloride, and tetrafluoro-9,10-bismethylamine-anthracene instead of the p-xylylene diamine were used.

[Chemical Formula 5-47]

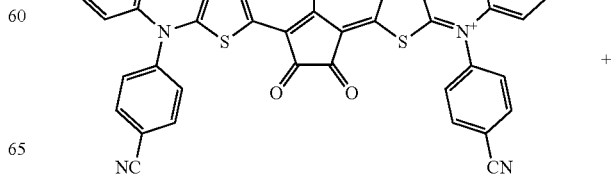

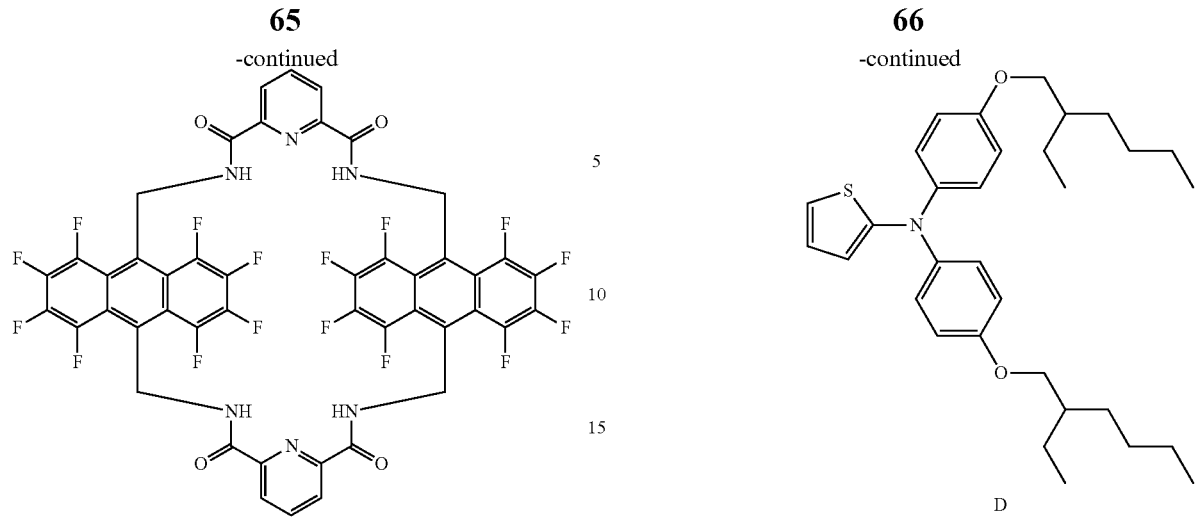

MALDI-TOF MS : 1731.4 m/z

Synthesis Example 13: Synthesis of Core-shell Dye Represented by Chemical Formula 5-48

[Reaction Scheme 7]

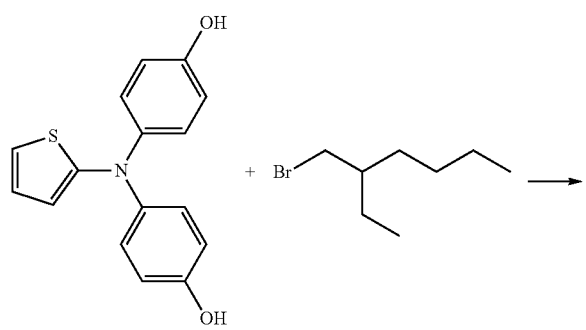

In a round-bottomed flask, Intermediate A (3 mmol), K2CO3 (7.5 mmol), 1-bromo-2-ethylhexane (7.5 mmol), and 10 ml of DMF were sequentially put and then, stirred at 120 ° C. for 24 hours. Subsequently, ethyl acetate and distilled water were used to separate an organic layer, which was purified through column chromatography and dried, obtaining Compound D as an intermediate. (Yield: 75%)

A core-shell dye represented by Chemical Formula 5-48 was synthesized in the same synthesis method as in Synthesis Example 1, except that Compound D was used, and pyridinedicarbonyl dichloride instead of the isophthaloyl chloride and tetrafluoro-9,10-bismethylamine-anthracene instead of the p-xylylene diamine were used.

[Chemical Formula 5-48]

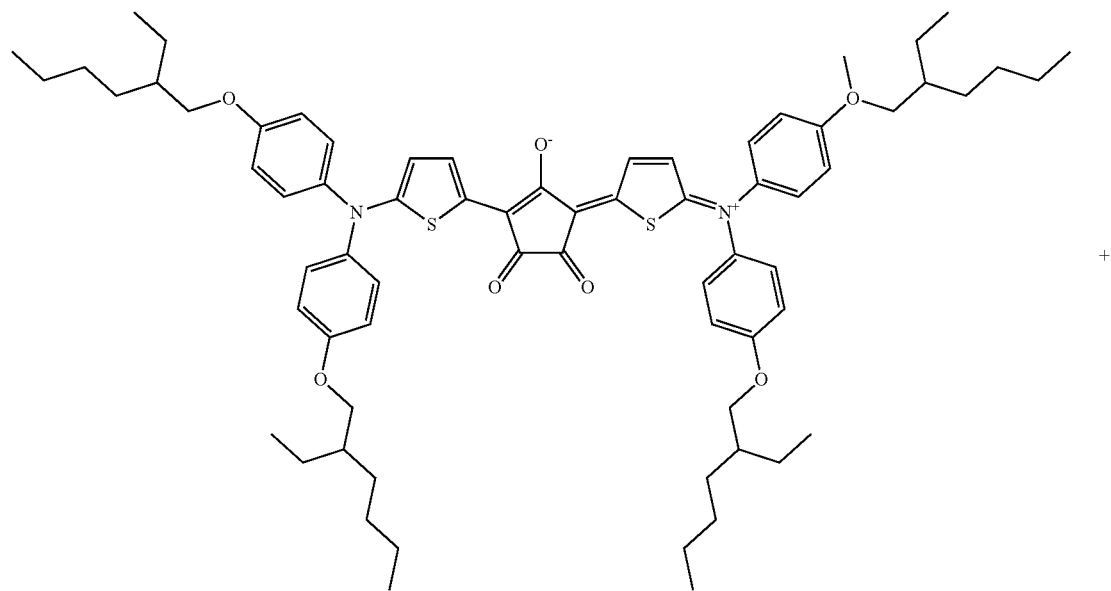

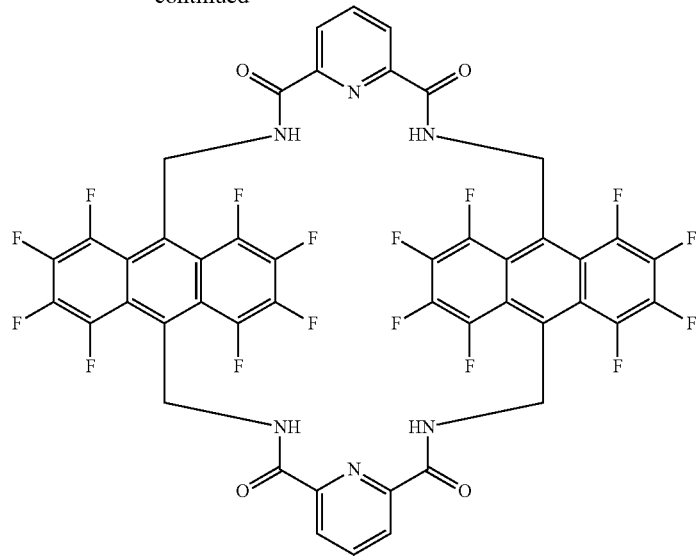

MALDI-TOF MS : 2144.2 m/z

Comparative Synthesis Example 1: Synthesis of Dye Including Core Represented by Chemical Formula E Alone A core-alone compound represented by Chemical Formula E was synthesized in the same synthesis method as in Reaction Schemes 1 and 2, except that di(2-ethylhexyl)amine was used instead of the diphenylamine.

[Chemical Formula E]

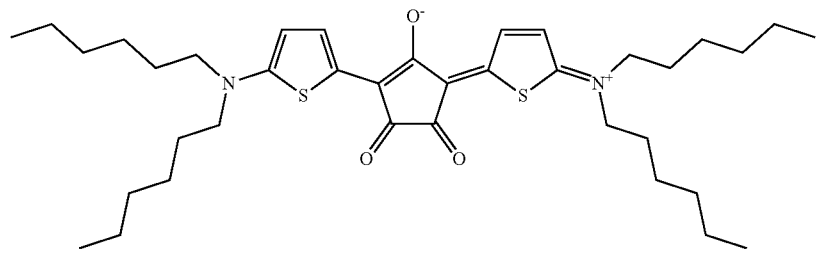

MALDI-TOF MS : 640.9 m/z

Comparative Synthesis Example 2: Synthesis of Core-shell Dye Represented by Chemical Formula F A core-shell dye represented by Chemical Formula F was synthesized in the same synthesis method as in Synthesis Example 1, except that di(2-ethylhexyl)amine was used instead of the diphenylamine.

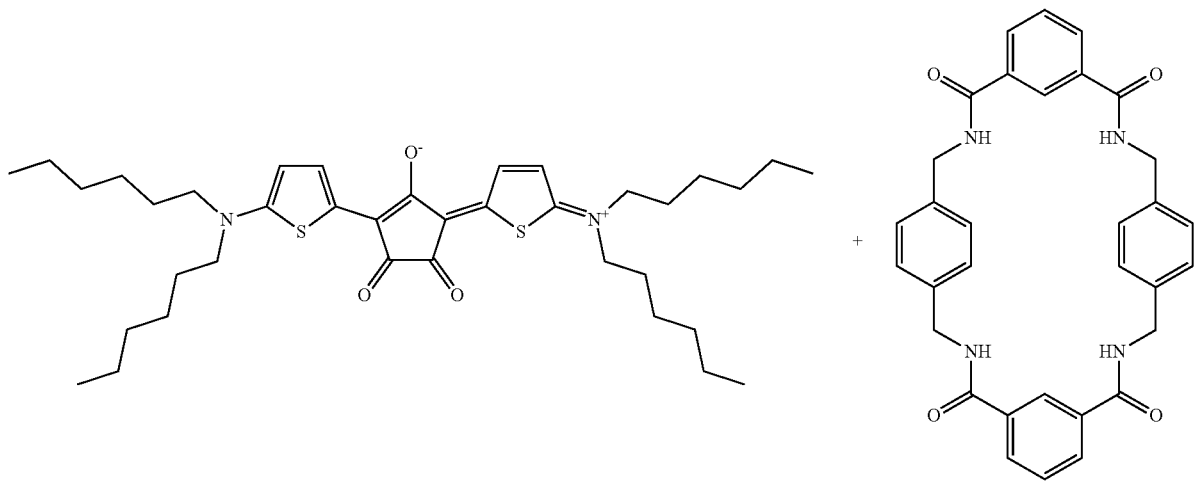

MALDI-TOF MS : 1173.5 m/z

Comparative Synthesis Example 3: Synthesis of Core-shell Dye Represented by Chemical Formula G A compound represented by Chemical Formula G was synthesized in the same synthesis method as in Synthesis Example 1, except that dicyclohexylamine was used instead of the diphenylamine.

[Chemical Formula G]

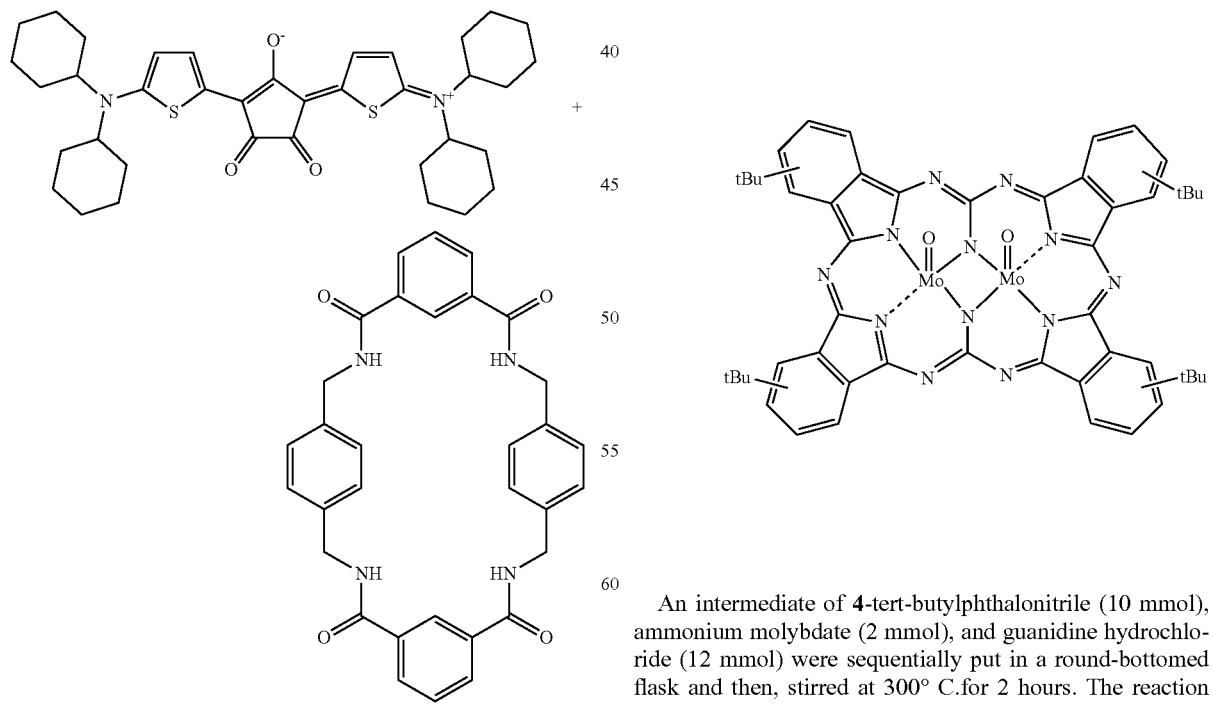

MALDI-TOF MS : 1165.5 m/z

Comparative Synthesis Example 4: Inorganic Colorant Represented by

Chemical Formula H

[Reaction Scheme 8]

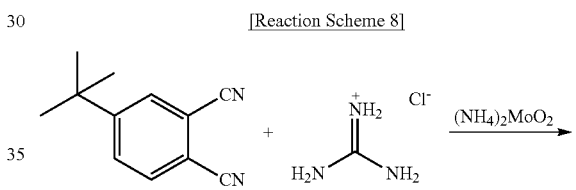

An intermediate of 4-tert-butylphthalonitrile (10 mmol), ammonium molybdate (2 mmol), and guanidine hydrochloride (12 mmol) were sequentially put in a round-bottomed flask and then, stirred at 300° C. for 2 hours. The reaction mixture was purified through column chromatography and dried, obtaining a compound represented by Chemical Formula H. (Yield: 15%)

[Chemical Formula H]

(Structure: dimeric molybdenum phthalocyanine-like complex with four tBu groups, two Mo=O centers bridged, formula shown)

MALDI-TOF MS : 1105.1 m/z (Preparation of Near-infrared Absorbing Resin Composition)

Near-infrared absorbing resin compositions were prepared using the following components.

(A) Colorant
(A-1) Core-shell dye prepared in Synthesis Example 1 (Chemical Formula 5-1)
(A-2) Core-shell dye prepared in Synthesis Example 2 (Chemical Formula 5-7)
(A-3) Core-shell dye prepared in Synthesis Example 3 (Chemical Formula 5-13)
(A-4) Core-shell dye prepared in Synthesis Example 4 (Chemical Formula 5-19)
(A-5) Core-shell dye prepared in Synthesis Example 5 (Chemical Formula 5-25)
(A-6) Core-shell dye prepared in Synthesis Example 6 (Chemical Formula 5-31)
(A-7) Core-shell dye prepared in Synthesis Example 7 (Chemical Formula 5-37)
(A-8) Core-shell dye prepared in Synthesis Example 8 (Chemical Formula 5-43)
(A-9) Core-shell dye prepared in Synthesis Example 9 (Chemical Formula 5-44)
(A-10) Core-shell dye prepared in Synthesis Example 10 (Chemical Formula 5-45)
(A-11) Core-shell dye prepared in Synthesis Example 11 (Chemical Formula 5-46)
(A-12) Core-shell dye prepared in Synthesis Example 12 (Chemical Formula 5-47)
(A-13) Core-shell dye prepared in Synthesis Example 13 (Chemical Formula 5-48)
(A-14) Core-shell dye prepared in Comparative Synthesis Example 1 (Chemical Formula E)
(A-15) Core-shell dye prepared in Comparative Synthesis Example 2 (Chemical Formula F)
(A-16) Core-shell dye prepared in Comparative Synthesis Example 3 (Chemical Formula G)
(A-17) Inorganic dye prepared in Comparative Synthesis Example 4 (Chemical Formula H)

(B) Binder Resin
Methacrylic acid/benzyl methacrylate copolymer having a weight average molecular weight of 22,000 g/mol (mixed weight ratio 15 wt %/85 wt %)

(C) Solvent
(C-1) Cyclohexanone
(C-2) Propylene glycol methyl ether acetate

Examples 1 to 13 and Comparative Examples 1 to 4

Each photosensitive resin composition was prepared by mixing components in compositions shown in Tables 1 to 3. Specifically, a colorant was added to a solvent and then, stirred for 30 minutes, and a binder resin was added thereto and then, stirred at room temperature for 2 hours. This solution was filtered three times to remove impurities, obtaining a near-infrared absorbing resin composition.

TABLE 1

(unit: wt %)

| | | | Examples | | | | | | |
|---|---|---|---|---|---|---|---|---|---|
| | | | 1 | 2 | 3 | 4 | 5 | 6 | 7 |
| (A) Colorant | A-1 | | 2 | — | — | — | — | — | — |
| | A-2 | | — | 2 | — | — | — | — | — |
| | A-3 | | — | — | 2 | — | — | — | — |
| | A-4 | | — | — | — | 2 | — | — | — |
| | A-5 | | — | — | — | — | 2 | — | — |
| | A-6 | | — | — | — | — | — | 2 | — |
| | A-7 | | — | — | — | — | — | — | 2 |
| (B) Binder resin | | | 13 | 13 | 13 | 13 | 13 | 13 | 13 |
| (C) Solvent | C-1 | | 40 | 40 | 40 | 40 | 40 | 40 | 40 |
| | C-2 | | 45 | 45 | 45 | 45 | 45 | 45 | 45 |
| Total | | | 100 | 100 | 100 | 100 | 100 | 100 | 100 |

TABLE 2

(unit: wt %)

| | | | Examples | | | | | |
|---|---|---|---|---|---|---|---|---|
| | | | 8 | 9 | 10 | 11 | 12 | 13 |
| (A) Colorant | A-8 | | 2 | — | — | — | — | — |
| | A-9 | | — | 2 | — | — | — | — |
| | A-10 | | — | — | 2 | — | — | — |
| | A-11 | | — | — | — | 2 | — | — |
| | A-12 | | — | — | — | — | 2 | — |
| | A-13 | | — | — | — | — | — | 2 |
| (B) Binder resin | | | 13 | 13 | 13 | 13 | 13 | 13 |
| (C) Solvent | C-1 | | 40 | 40 | 40 | 40 | 40 | 40 |
| | C-2 | | 45 | 45 | 45 | 45 | 45 | 45 |
| Total | | | 100 | 100 | 100 | 100 | 100 | 100 |

TABLE 3

(unit: wt %)

| | | | Comparative Examples | | | |
|---|---|---|---|---|---|---|
| | | | 1 | 2 | 3 | 4 |
| (A) Colorant | A-14 | | 2 | — | — | — |
| | A-15 | | — | 2 | — | — |
| | A-16 | | — | — | 2 | — |
| | A-17 | | — | — | — | 2 |
| | A-18 | | — | — | — | — |
| (B) binder resin | | | 13 | 13 | 13 | 13 |
| (C) solvent | C-1 | | 40 | 40 | 40 | 40 |
| | C-2 | | 45 | 45 | 45 | 45 |
| Total | | | 100 | 100 | 100 | 100 |

(Evaluation)
Evaluation 1: Wavelength Matching Evaluation

Each near-infrared absorbing resin composition according to Examples 1 to 13 and Comparative Examples 1 to 4 was used, preparing optical filter specimens. Specifically, each near-infrared absorbing resin composition was coated 1 μm to 3 μm thick on a 1 mm-thick glass substrate that was degreased and washed, dried on a 90° C. hot plate for 2 minutes to form a near-infrared absorbing film, obtaining an optical filter specimen including the near-infrared absorbing film.

The optical filter specimen was examined with respect to wavelength matching through a maximum absorption wavelength (λmax). Specifically, a UV-Vis-NIR spectrometer (UV-3600 Plus UV-Vis-NIR spectrometer, Shimadzu Corp.) was used to measure a maximum absorption wavelength (λmax) of each optical filter specimen and simultaneously, absorption intensity at the wavelength. The measured maximum absorption wavelengths are shown in Table 4.

TABLE 4

|  | Maximum absorption wavelength (wavelength matching) |
|---|---|
| Example 1 | 865 nm |
| Example 2 | 880 nm |
| Example 3 | 870 nm |
| Example 4 | 885 nm |
| Example 5 | 879 nm |
| Example 6 | 894 nm |
| Example 7 | 884 nm |
| Example 8 | 899 nm |
| Example 9 | 897 nm |
| Example 10 | 899 nm |
| Example 11 | 899 nm |
| Example 12 | 898 nm |
| Example 13 | 897 nm |
| Comparative Example 1 | 783 nm |
| Comparative Example 2 | 798 nm |
| Comparative Example 3 | 796 nm |
| Comparative Example 4 | 927 nm |

Referring to Table 4, the core-shell dyes according to Examples 1 to 13 were suitable for near-infrared absorption.

The core-shell dyes of Examples 1 to 13 included a croconium-based organic dye as a core and exhibited a maximum absorption peak at a wavelength of 750 nm or more. The core included in the core-shell dyes of Examples 1 to 3 was represented by Chemical Formula 1, a substituted or unsubstituted C6 to C30 aryl group was independently introduced into $R^1$ to $R^4$, compared with when a substituted or unsubstituted C1 to C30 alkyl group or C3 to C30 cycloalkyl group was independently introduced into the same position (Comparative Examples 1 to 3), and the maximum absorption peak was shifted to a long wavelength region.

In Examples 1 to 13, an effect of the structure of the cores was almost the same, but a maximum absorption wavelength thereof varied depending on whether a halogen group (e.g., F) was introduced into the shells.

When the cores thereof had the same structure, when the halogen group was introduced into the shells, a maximum absorption wavelength shifted to a long wavelength region by about 20 nm, achieving excellent matching with a near-infrared absorption wavelength band at a comparable level to that of an inorganic dye (Comparative Example 4).

The core-shell dye of an embodiment exhibited excellent matching with a near-infrared absorption wavelength band due to a single effect of the core represented by Chemical Formula 1; or a synergistic effect of the core represented by Chemical Formula 1 and the shell represented by Chemical Formula 2.

Evaluation 2: Evaluation of Light Resistance and Chemical Resistance (1) Light Resistance Evaluation: The optical filter specimens obtained under the same conditions as in Evaluation 1 were exposed to light using a high-pressure mercury lamp having a dominant wavelength of 365 nm, and then dried in an oven at 230° C. for 20 minutes.

The substrate (after the exposure as described above) was measured with respect to absorption intensity at the maximum absorption wavelength (λmax) in the aforementioned method. This measurement value and the measurement value of Evaluation 1 were put in Equation 1 to calculate light resistance, and the results are shown in Table 5.

Light resistance=100%×{1−(absorption intensity after exposure treatment)/(absorption intensity before exposure treatment)}    [Equation 1]

(2) Evaluation of Chemical Resistance: The optical filter specimens obtained under the same conditions as in Evaluation 1 were immersed in NMP (N-methylpyrrolidone) solution at ambient temperature for 10 minutes.

The substrate (after the chemical treatment as described above) was measured with respect to absorption intensity at the maximum absorption wavelength (λmax) in the aforementioned method. This measurement value and a measurement value of Evaluation 1 were put in Equation 2 to calculate light resistance, and the results are shown in Table 5.

Chemical resistance=100%×{1−(absorption intensity after chemical treatment)/(absorption intensity before chemical treatment)}    [Equation 2]

TABLE 5

|  | Light resistance | Chemical resistance |
|---|---|---|
| Example 1 | 20% | 30% |
| Example 2 | 21% | 28% |
| Example 3 | 19% | 28% |
| Example 4 | 18% | 27% |
| Example 5 | 27% | 36% |
| Example 6 | 25% | 33% |
| Example 7 | 24% | 33% |
| Example 8 | 24% | 31% |
| Example 9 | 23% | 30% |
| Example 10 | 23% | 18% |
| Example 11 | 22% | 19% |
| Example 12 | 17% | 25% |
| Example 13 | 24% | 32% |
| Comparative Example 1 | 53% | 67% |
| Comparative Example 2 | 42% | 51% |
| Comparative Example 3 | 45% | 49% |
| Comparative Example 4 | 17% | 20% |

Referring to Table 5, the core-shell dyes of Examples 1 to 13 exhibited significantly improved durability (light resistance and chemical resistance), compared with that of the Comparative Examples.

Specifically, compared with a dye composed of a core alone according to Comparative Example 1, the core-shell dyes according to Examples 1 to 13 further included the shell represented by Chemical Formula 2 and thus compensated for insufficient durability of the core represented by Chemical Formula 1.

The dye of Comparative Example 2 had a core-shell structure, compared with the dye composed of a core alone according to Comparative Example 1, exhibited improved durability (light resistance and chemical resistance).

However, the core included in the core-shell dyes of Examples 1 to 13, which was represented by Chemical Formula 1 and in which a substituted or unsubstituted C6 to C30 aryl group was independently introduced into $R^1$ to $R^4$, compared with when a substituted or unsubstituted C1 to C30 alkyl group or C3 to C30 cycloalkyl group was independently introduced into the same position, (Comparative Examples 2 and 3), improved durability (light resistance and chemical resistance).

In Examples 1 to 13, the effect of the structure of the shell was almost the same, but durability varied depending on whether an epoxy group or a (meth)acrylate group was introduced into the core.

Specifically, the (meth)acrylate group was a functional group contributing to improving heat resistance, and the *—O—* (epoxy) group was a functional group contributing to improving chemical resistance. Accordingly, compared with when the $R^1$ was not substituted, when substituted by at least one (meth)acrylate group, *—O—* (epoxy) group, or a combination thereof, chemical resistance, heat resistance, or the like of the core were appropriately improved.

By way of summation and review, a compound for a near-infrared absorbing film may be an inorganic dye. Inorganic dyes may have low near-infrared absorption intensity and may need to be used in excessively high amounts when manufacturing the near-infrared absorbing film. As such, an amount of the inorganic dyes may be increased, and viscosity of the composition may be increased, thereby deteriorating processability and thickening the film.

Accordingly, as the compound for a near-infrared absorbing film, the inorganic dyes may be replaced with organic dyes. Organic dyes could have inferior durability (e.g., chemical resistance, light resistance, or the like), compared with inorganic dyes, organic pigments, and the like.

One or more embodiments may provide a core-shell dye that exhibits high near-infrared absorption intensity while ensuring durability.

The core-shell dye according to an embodiment may have excellent durability while exhibiting improved matching to the near-infrared absorption wavelength band.

Accordingly, the near-infrared absorbing resin composition including the core-shell dye may form a fine pattern while reducing a dye content, thereby contributing to economically providing a near-infrared absorbing film for a CMOS image sensor.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A core-shell dye, comprising
   a core represented by Chemical Formula 1; and
   a shell surrounding the core, the shell being represented by Chemical Formula 2;

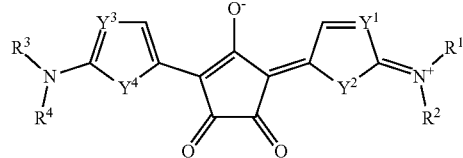

[Chemical Formula 1]

wherein, in Chemical Formula 1;
$Y^1$ and $Y^3$ are each independently =CH—, or a nitrogen atom;
$Y^2$ and $Y^4$ are each independently —$CH_2$—, a sulfur atom, —NH—, or an oxygen atom; and
$R^1$ to $R^4$ are each independently a substituted or unsubstituted C6 to C30 aryl group;

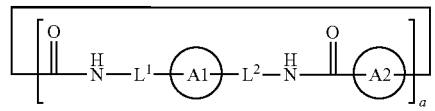

[Chemical Formula 2]

wherein, in Chemical Formula 2,
A1 and A2 are each independently a divalent substituted or unsubstituted C6 to C30 aromatic ring group;
$L^1$ and $L^2$ are each independently a single bond or a substituted or unsubstituted C1 to C30 alkylene group; and
a is an integer of 2 to 10.

2. The core-shell dye as claimed in claim 1, wherein $Y^2$ and $Y^4$ are both sulfur atoms.

3. The core-shell dye as claimed in claim 2, wherein $Y^1$ and $Y^3$ are both =CH—.

4. The core-shell dye as claimed in claim 1, wherein $R^1$ to $R^4$ are each independently an unsubstituted C6 to C30 aryl group or are a substituted C6 to C30 aryl group that is substituted at a terminal end thereof with a C1 to C10 alkyl group, a C1 to C10 alkoxy group, an epoxy group, a (meth)acrylate group, or a cyano group.

5. The core-shell dye as claimed in claim 4, wherein:
$R^1$ to $R^4$ are each independently a group represented by Chemical Formula 3;

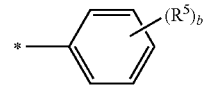

[Chemical Formula 3]

in Chemical Formula 3,
$R^5$ is a group represented by Chemical Formula 3-1; and
b is an integer from 0 to 5; and
* is a linking point;

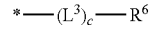

[Chemical Formula 3-1]

in Chemical Formula 3-1,
$L^3$ is a single bond, an oxygen atom, or a substituted or unsubstituted C1 to C10 alkylene group;
$R^6$ is a substituted or unsubstituted C1 to C10 alkyl group, a substituted or unsubstituted C1 to C10 alkoxy group, an epoxy group, a (meth)acrylate group, or a cyano group;

c is an integer of 1 to 5; and
* is a linking point.

6. The core-shell dye as claimed in claim 5, wherein $R^1$ to $R^4$ are all the same.

7. The core-shell dye as claimed in claim 1, wherein the core is represented by one of Chemical Formulae 1-1 to 1-6:

[Chemical Formula 1-1]

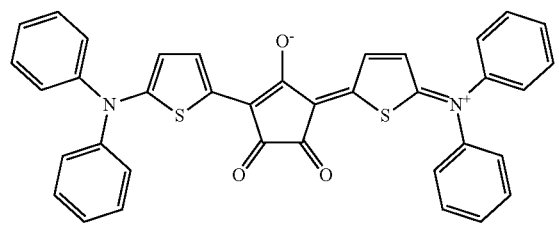

[Chemical Formula 1-2]

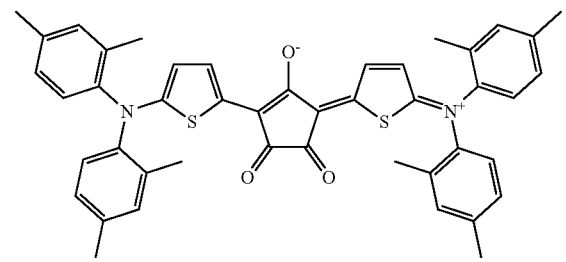

[Chemical Formula 1-3]

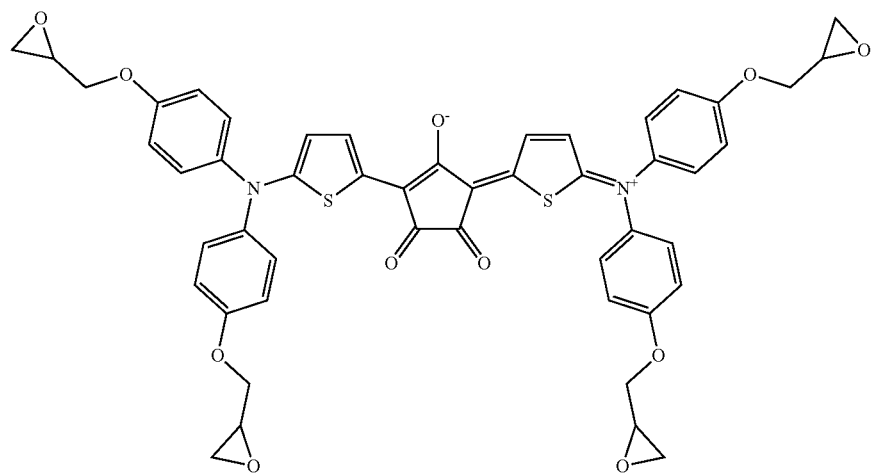

[Chemical Formula 1-4]

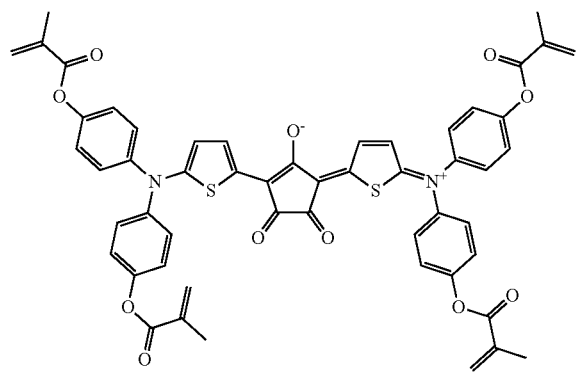

[Chemical Formula 1-5]

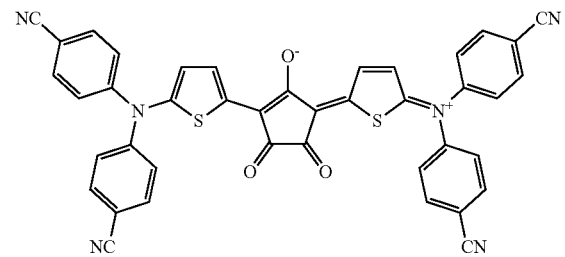

-continued

[Chemical Formula 1-6]

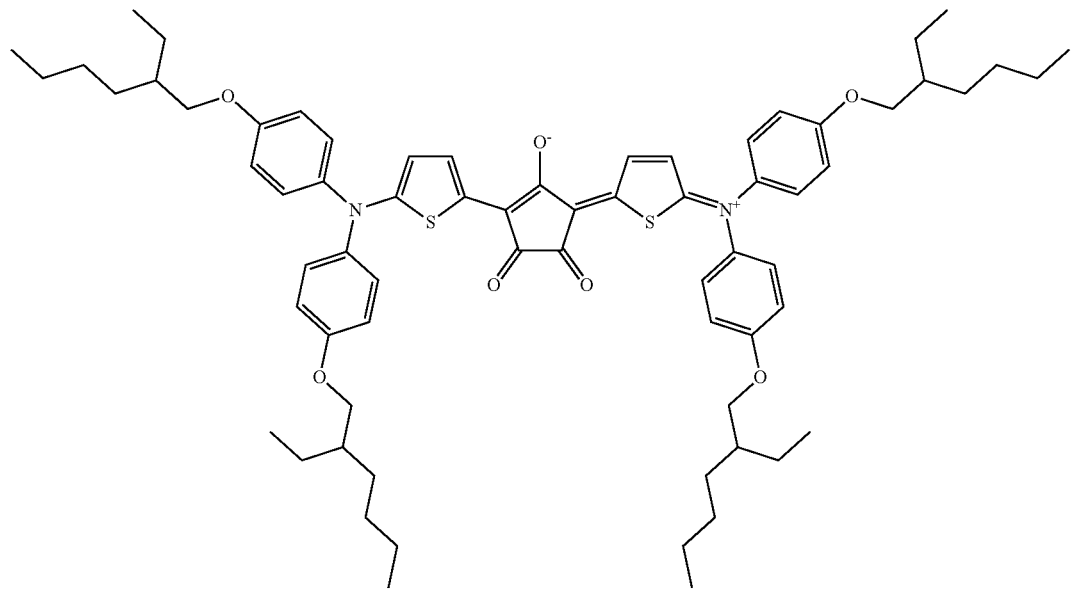

8. The core-shell dye as claimed in claim 1, wherein A1 and A2 are each independently a divalent substituted or unsubstituted benzene ring, a divalent substituted or unsubstituted pyridine ring, or a divalent substituted or unsubstituted anthracene ring.

9. The core-shell dye as claimed in claim 8, wherein:
A1 and A2 are each independently represented by Chemical Formula 4-1 or Chemical Formula 4-2;

[Chemical Formula 4-1]

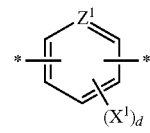

[Chemical Formula 4-2]

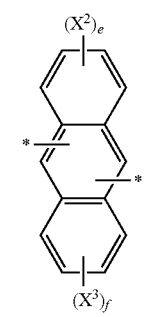

in Chemical Formulae 4-1 and 4-2;
$Z^1$ *—CH—* or a nitrogen atom;
$X^1$ to $X^3$ are each independently a halogen group or a substituted or unsubstituted C1 to C20 alkyl group;
d, e, and f are each independently an integer of 0 to 4; and
* is a linking point.

10. The core-shell dye as claimed in claim 9, wherein:
Chemical Formula 2 is represented by Chemical Formula 2-1 or Chemical Formula 2-2;

[Chemical Formula 2-1]

$$\left[ \begin{array}{c} O \\ \parallel \\ -N-L^{11}- \end{array} \underset{(X^{11})_{d1}}{\overset{Z^{11}}{\bigcirc}} -L^{21}-N- \underset{(X^{12})_{d2}}{\overset{Z^{12}}{\bigcirc}} \right]_{a1}$$

in Chemical Formula 2-1;
$L^{11}$ and $L^{21}$ are each independently a substituted or unsubstituted C1 to C10 alkylene group;
$Z^{11}$ and $Z^{12}$ are each independently *—CR—* or a nitrogen atom, in which R is a hydrogen atom or a substituted or unsubstituted C1 to C10 alkyl group;
$X^{11}$ and $X^{12}$ are each independently a halogen group or a substituted or unsubstituted C1 to C10 alkyl group;
d1 and d2 are each independently an integer of 0 to 4; and
a1 is an integer of 2 to 10;

[Chemical Formula 2-2]

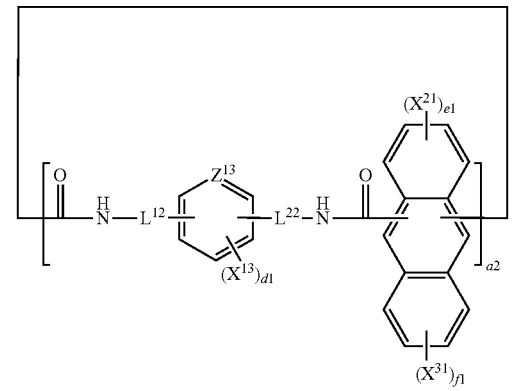

in Chemical Formula 2-2;

L$^{12}$ and L$^{22}$ are each independently a single bond or a substituted or unsubstituted c1 to c10 alkylene group;

Z$^{13}$ is *—CR—* or a nitrogen atom, in which R is a hydrogen atom or a substituted or unsubstituted C1 to C10 alkyl group;

X$^{13}$, X$^{21}$, and X$^{31}$ are each independently a halogen group or a substituted or unsubstituted C1 to C10 alkyl group;

a2 is an integer of 2 to 10; and d3, e1, and f1 are each independently an integer of 0 to 4.

11. The core-shell dye as claimed in claim 10, wherein:
Chemical Formula 2 is represented by Chemical Formula 2-1,
one of Z$^{11}$ and Z$^{12}$ is *—CH—* or a nitrogen atom, and the other of Z$^{11}$ and Z$^{12}$ is *—CH—*.

12. The core-shell dye as claimed in claim 10, wherein:
Chemical Formula 2 is represented by Chemical Formula 2-1,
X$^{11}$ and X$^{12}$ are each independently a halogen group, and
d1+d2 is an integer of 1 to 8.

13. The core-shell dye as claimed in claim 10, wherein:
Chemical Formula 2 is represented by Chemical Formula 2-1, and
L$^{11}$ and L$^{21}$ are each independently a substituted or unsubstituted C1 to C10 alkylene group.

14. The core-shell dye as claimed in claim 10, wherein:
Chemical Formula 2 is represented by Chemical Formula 2-1, and a1 is 2.

15. The core-shell dye as claimed in claim 10, wherein:
Chemical Formula 2 is represented by Chemical Formula 2-2,
X$^{13}$, x$^{21}$, and X$^{31}$ are each independently a halogen group, and
d3+e1+f1 is an integer of 1 to 12.

16. The core-shell dye as claimed in claim 10, wherein:
Chemical Formula 2 is represented by Chemical Formula 2-2, and
L$^{12}$ and L$^{22}$ are each independently a substituted or unsubstituted C1 to C10 alkylene group.

17. The core-shell dye as claimed in claim 10, wherein:
Chemical Formula 2 is represented by Chemical Formula 2-2, and a2 is 2.

18. The core-shell dye as claimed in claim 10, wherein the shell is represented by one of Chemical Formula 2-1-1 to Chemical Formula 2-2-4:

[Chemical Formula 2-1-1]

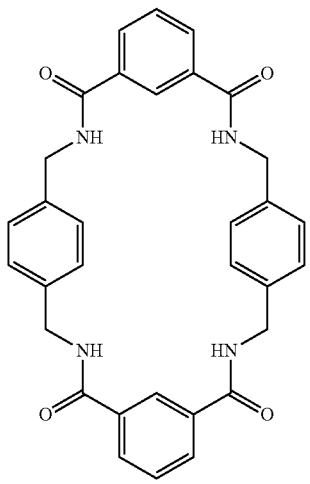

[Chemical Formula 2-1-2]

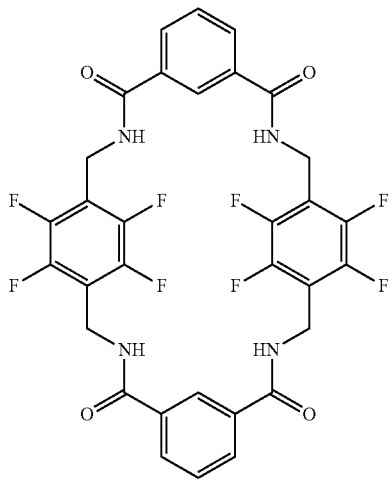

[Chemical Formula 2-1-3]

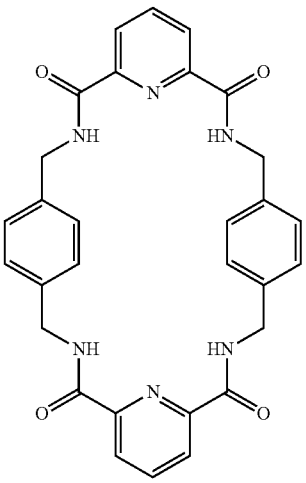

[Chemical Formula 2-1-4]

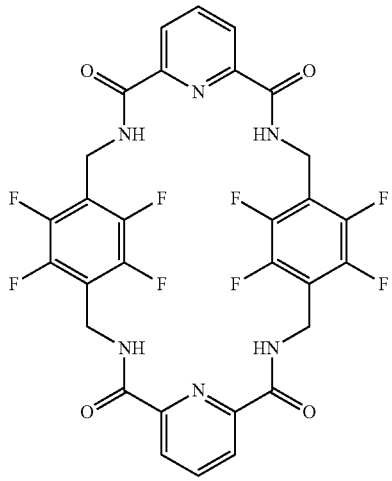

[Chemical Formula 2-2-1]
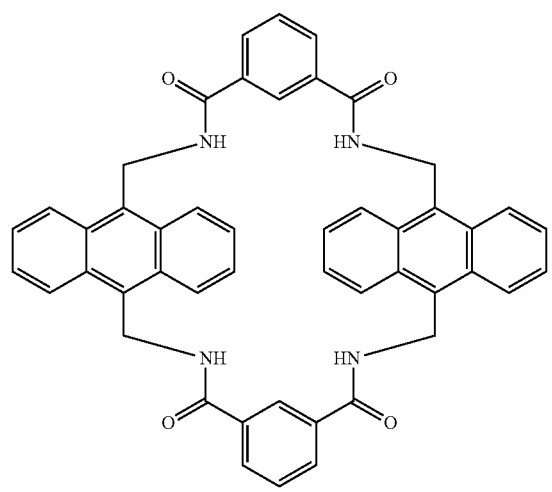
[Chemical Formula 2-2-2]
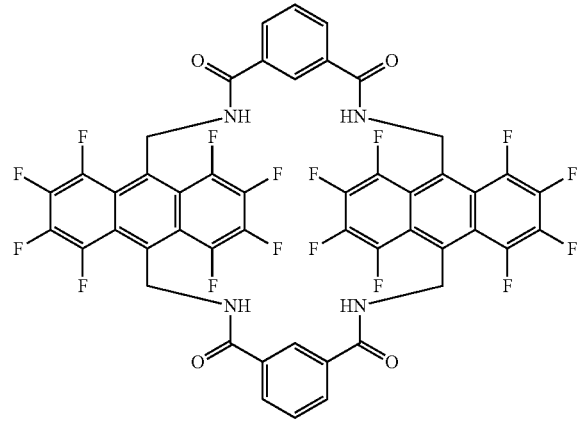
[Chemical Formula 2-2-3]
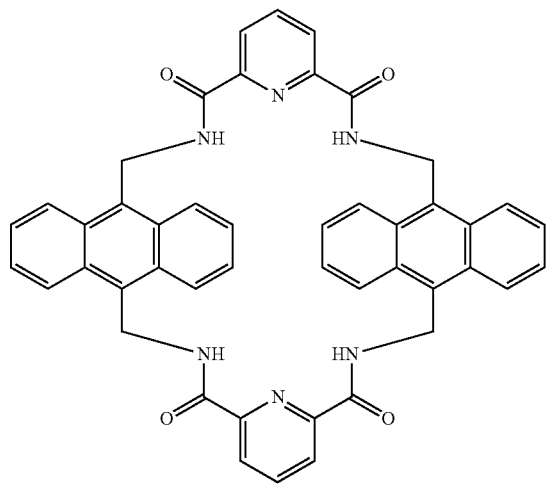
[Chemical Formula 2-2-4]
19. The core-shell dye as claimed in claim 1, wherein the core-shell dye includes the core and the shell in a mole ratio of about 1:1.
20. The core-shell dye as claimed in claim 1, wherein the core-shell dye is represented by one of Chemical Formula 5-1 to Chemical Formula 5-48:
[Chemical Formula 5-1]
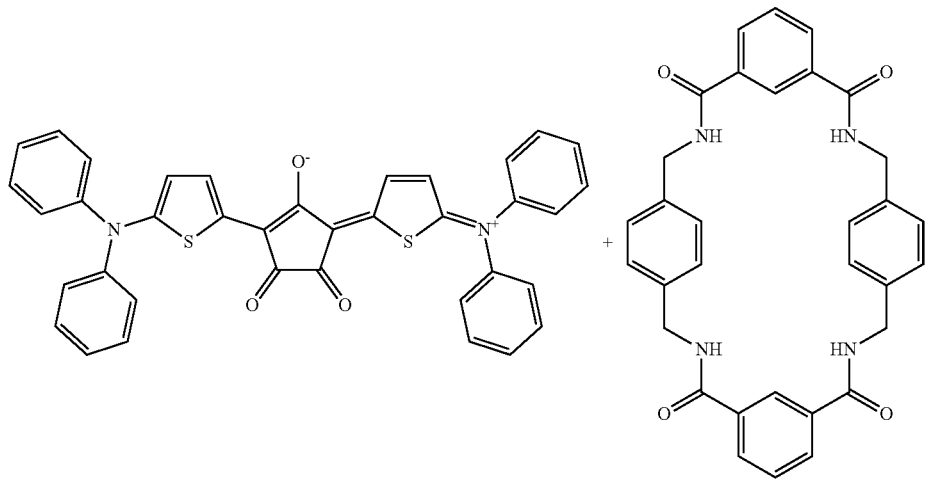

[Chemical Formula 5-2]
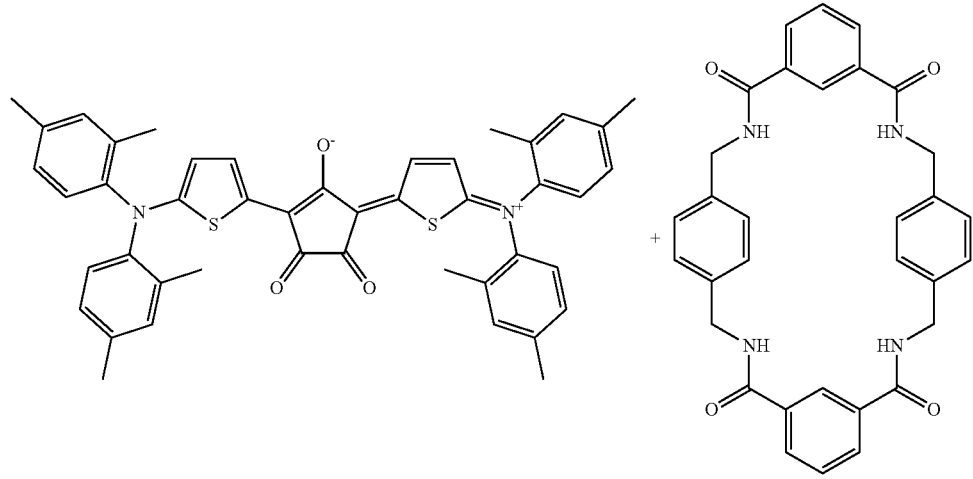
[Chemical Formula 5-3]
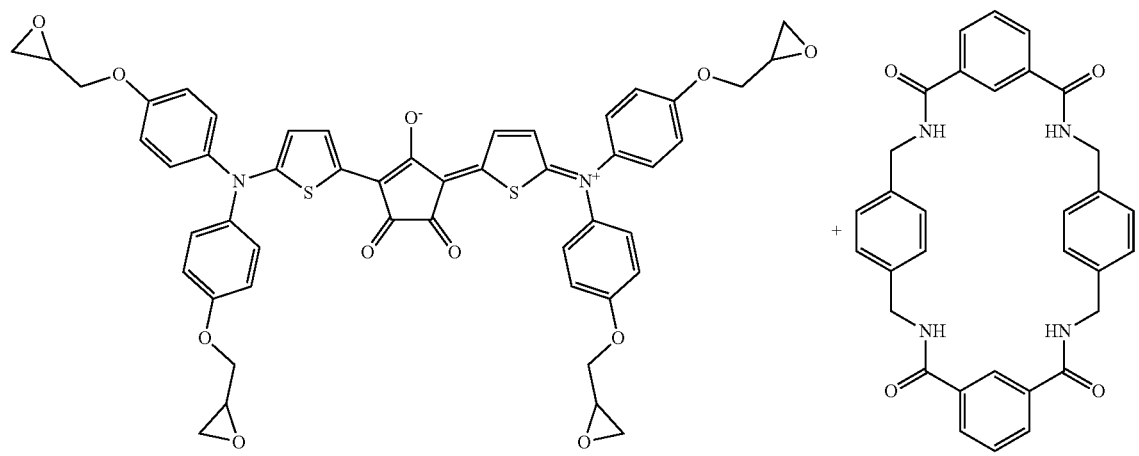
[Chemical Formula 5-4]
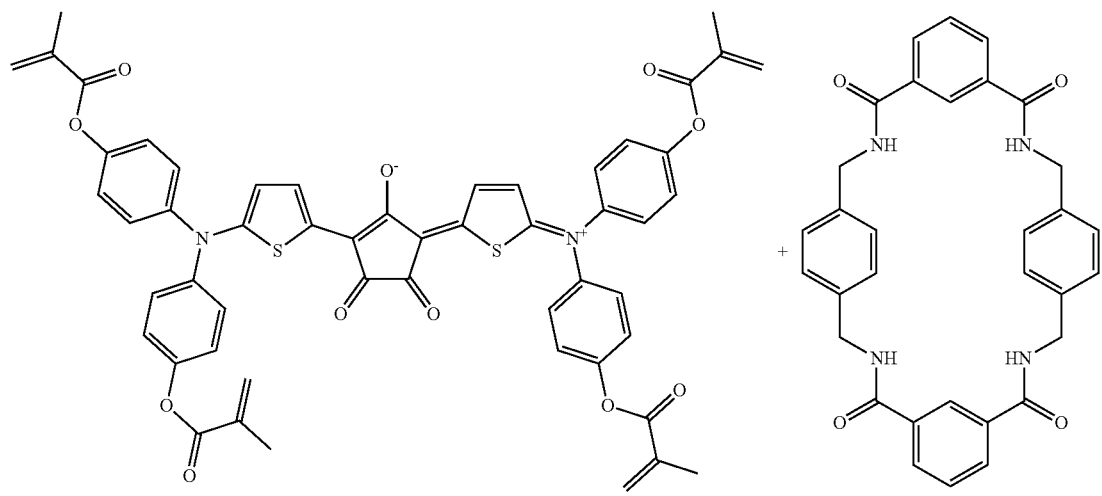

[Chemical Formula 5-5]
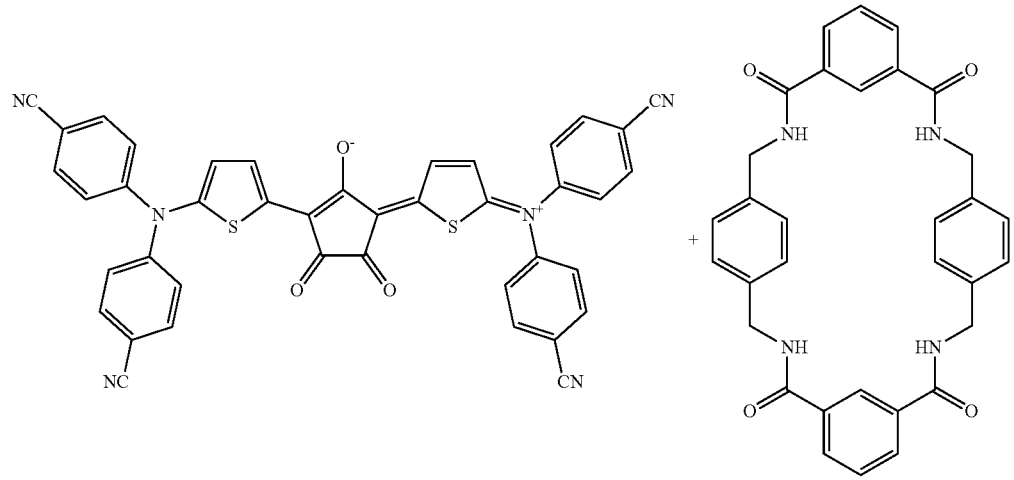
[Chemical Formula 5-6]
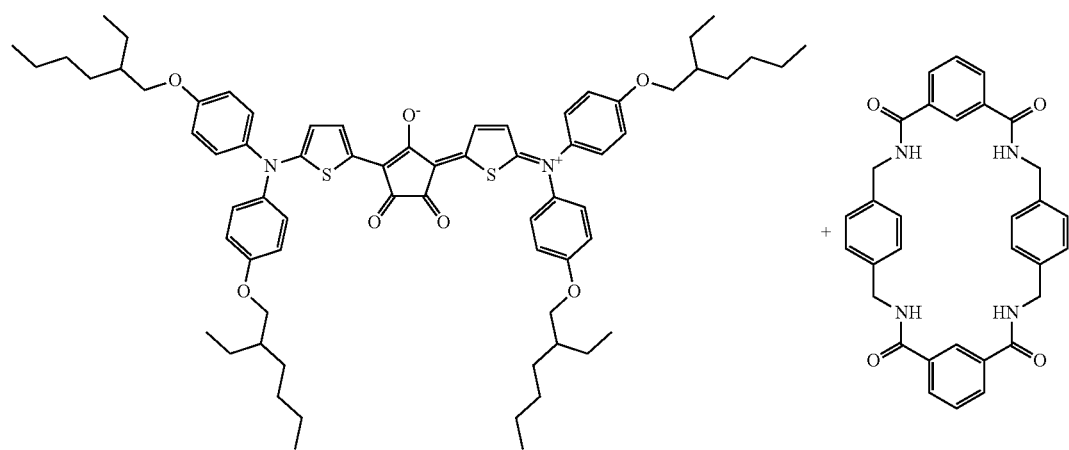
[Chemical Formula 5-7]
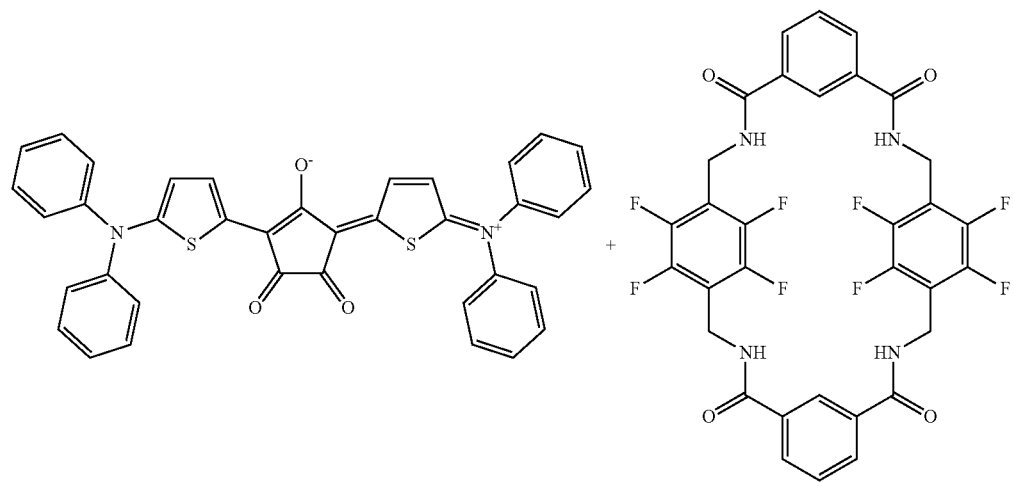

[Chemical Formula 5-8]
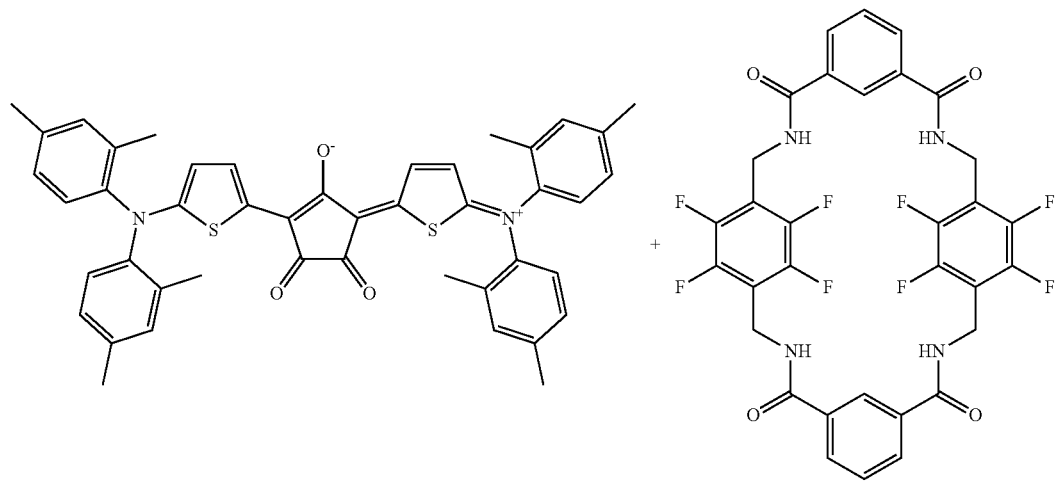
[Chemical Formula 5-9]
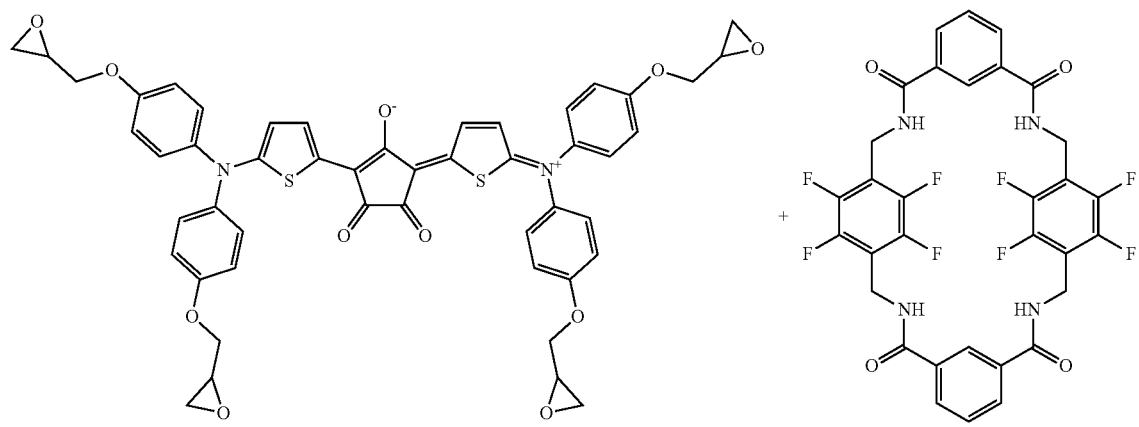
[Chemical Formula 5-10]
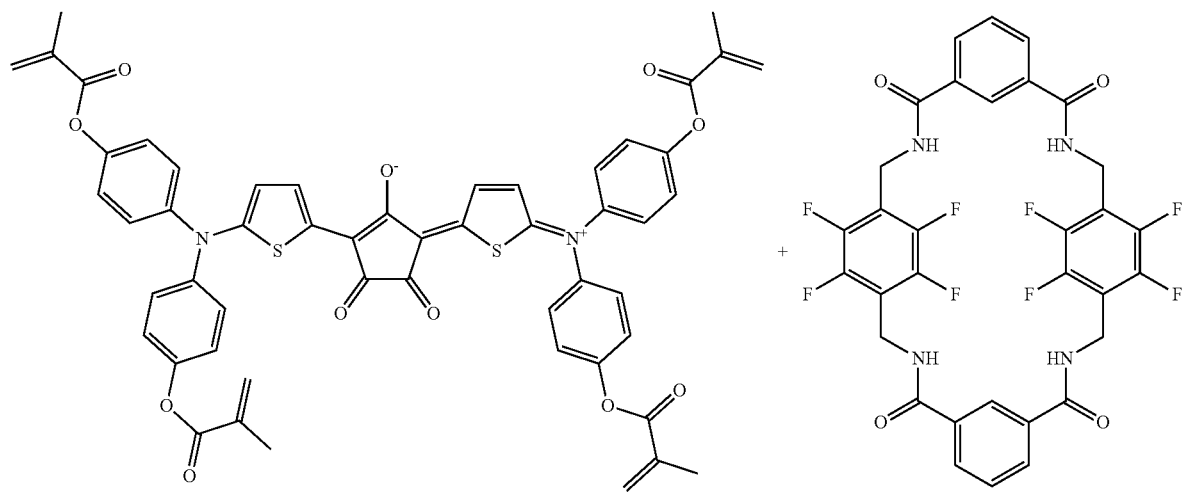

91 92
-continued
[Chemical Formula 5-11]
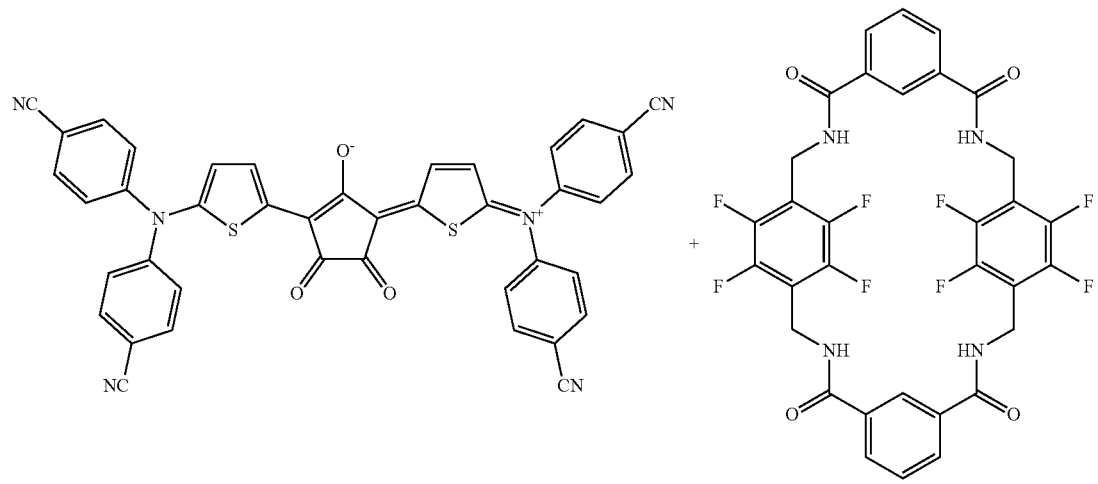
[Chemical Formula 5-12]
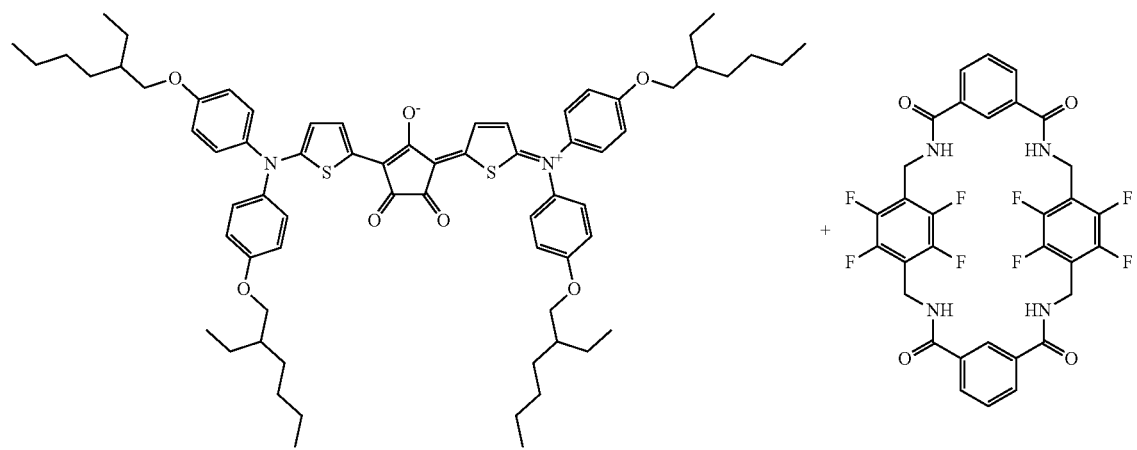
[Chemical Formula 5-13]
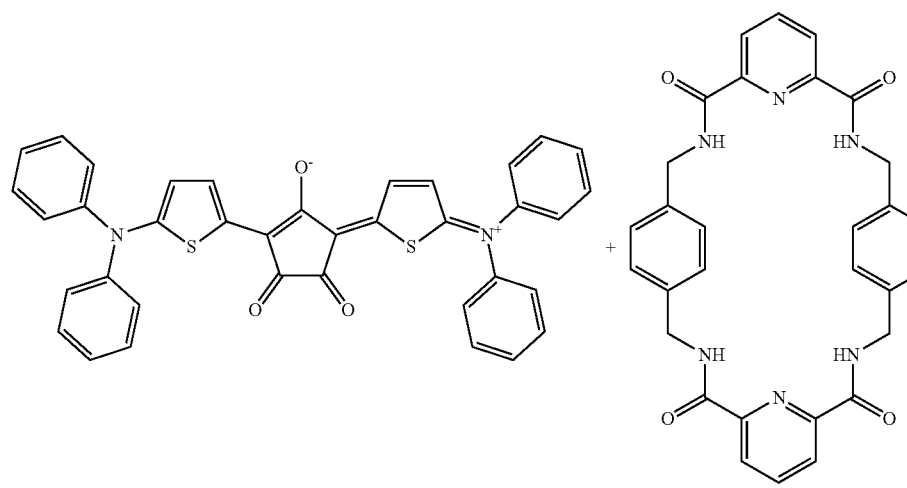

[Chemical Formula 5-14]
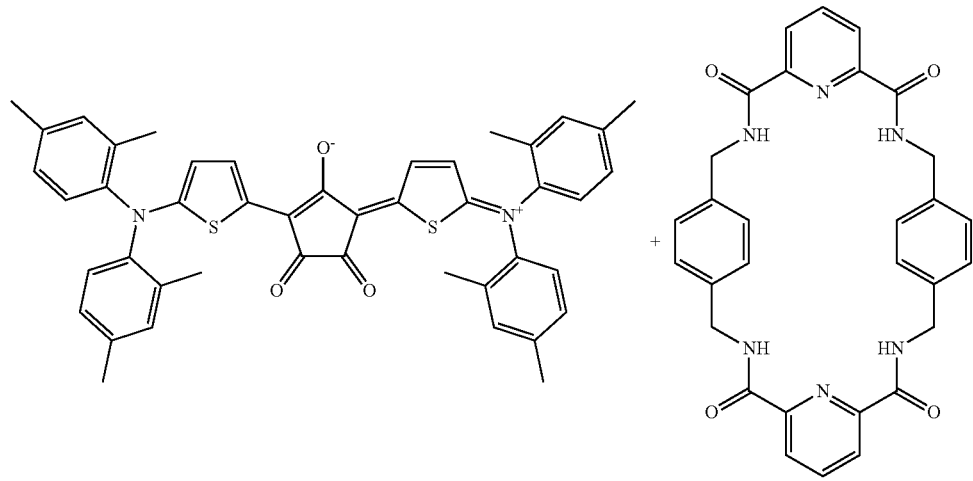
[Chemical Formula 5-15]
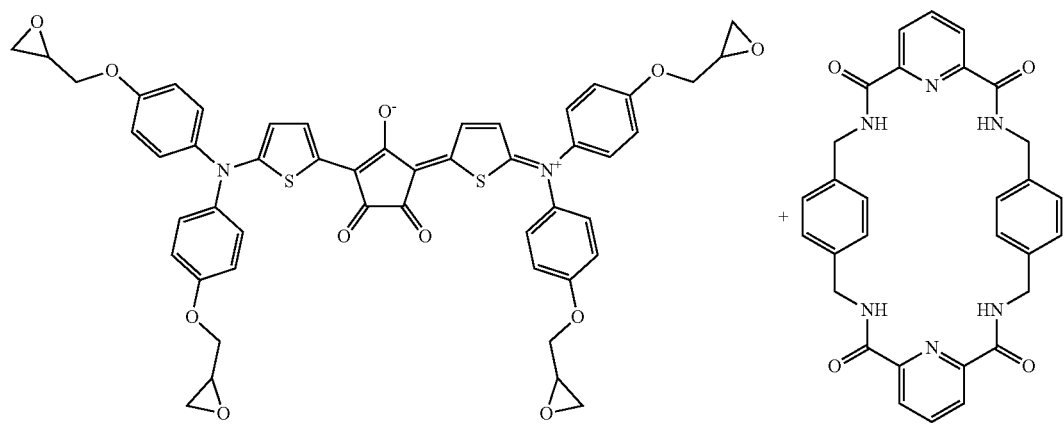
[Chemical Formula 5-16]
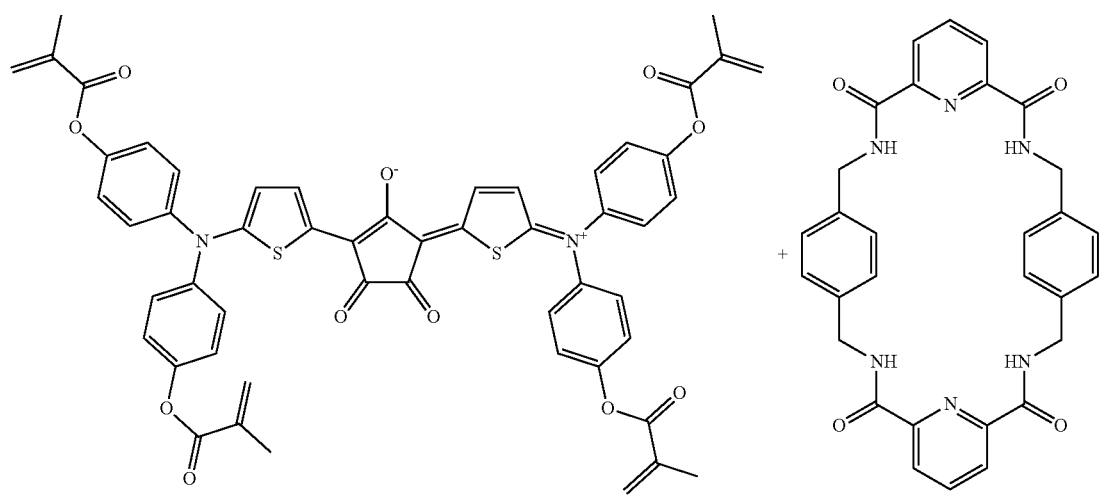

[Chemical Formula 5-17]
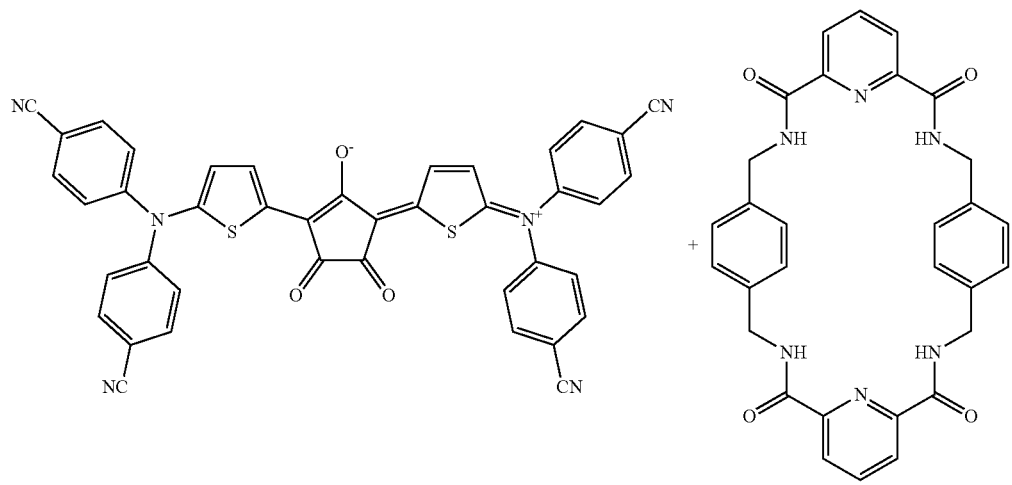
[Chemical Formula 5-18]
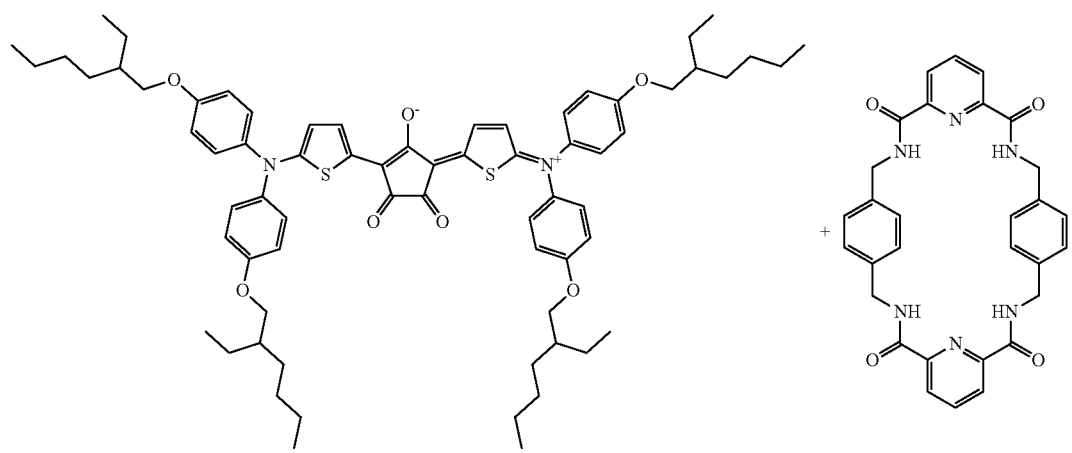
[Chemical Formula 5-19]
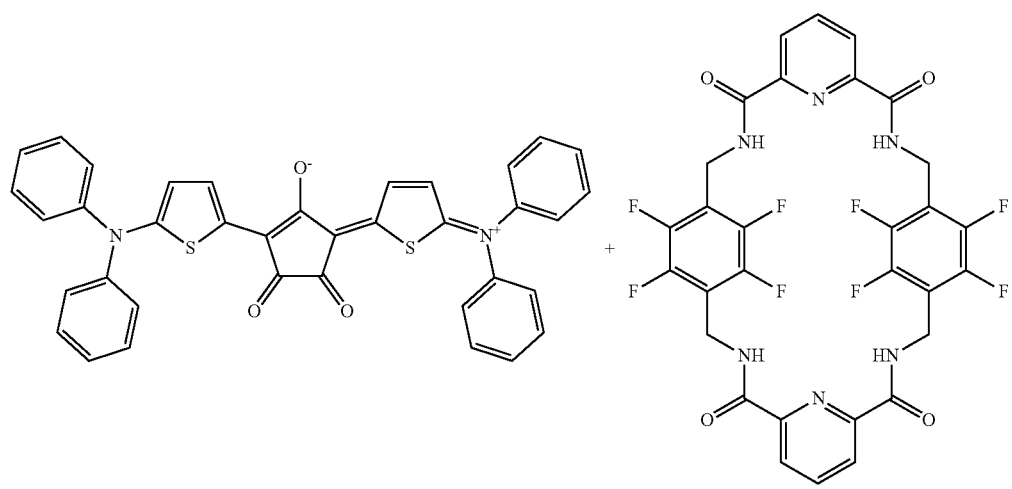

[Chemical Formula 5-20]
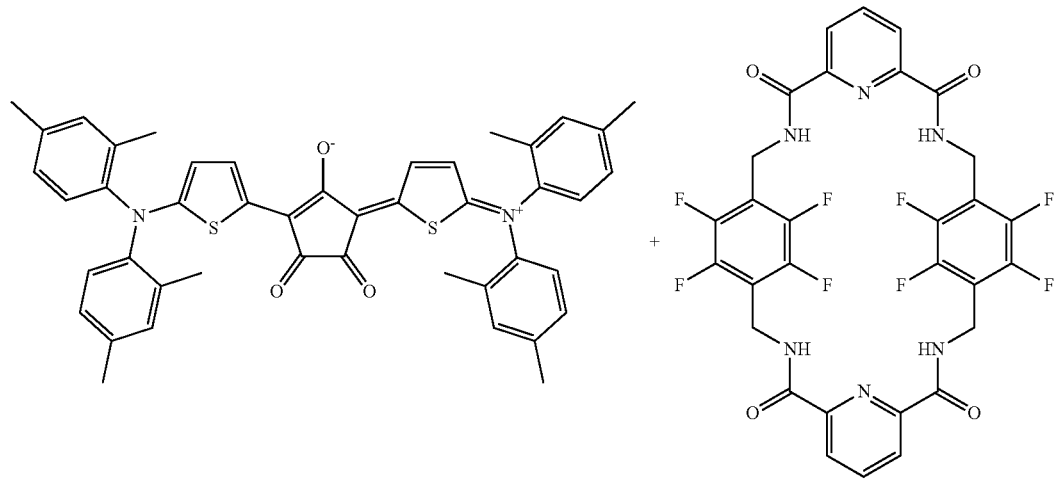
[Chemical Formula 5-21]
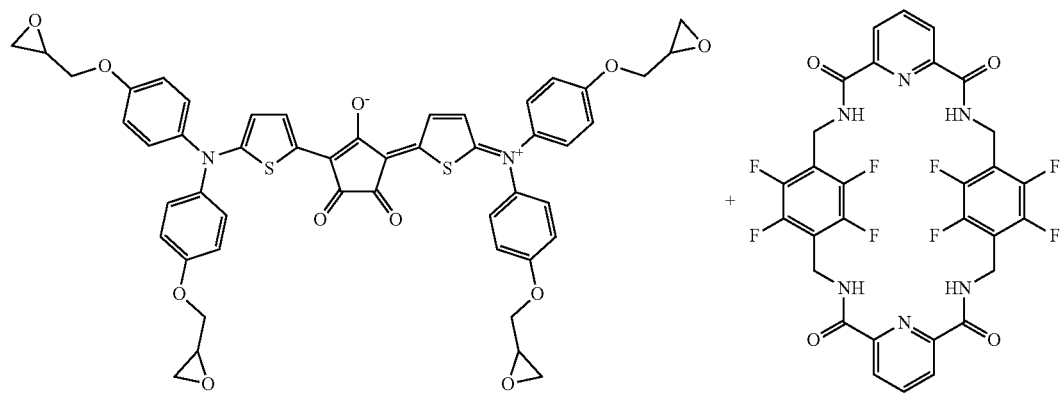
[Chemical Formula 5-22]
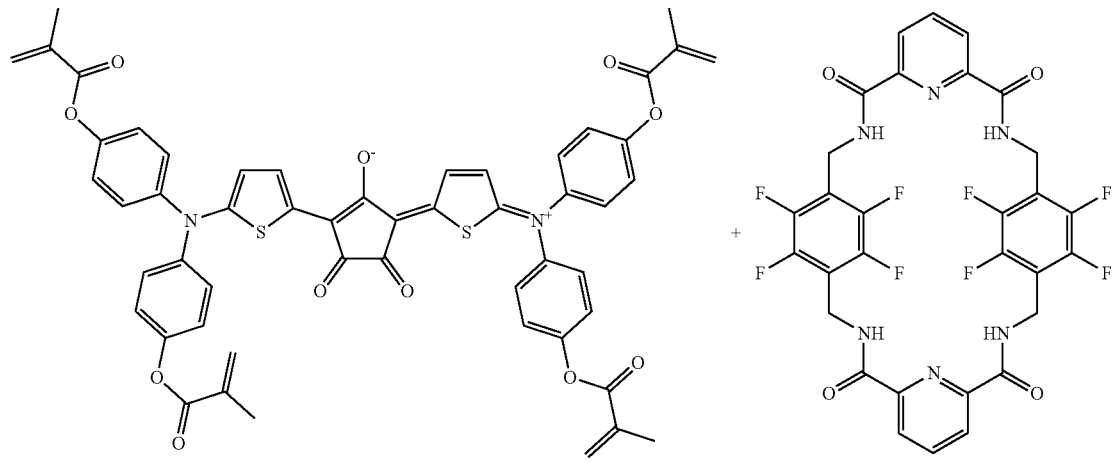

-continued
[Chemical Formula 5-23]
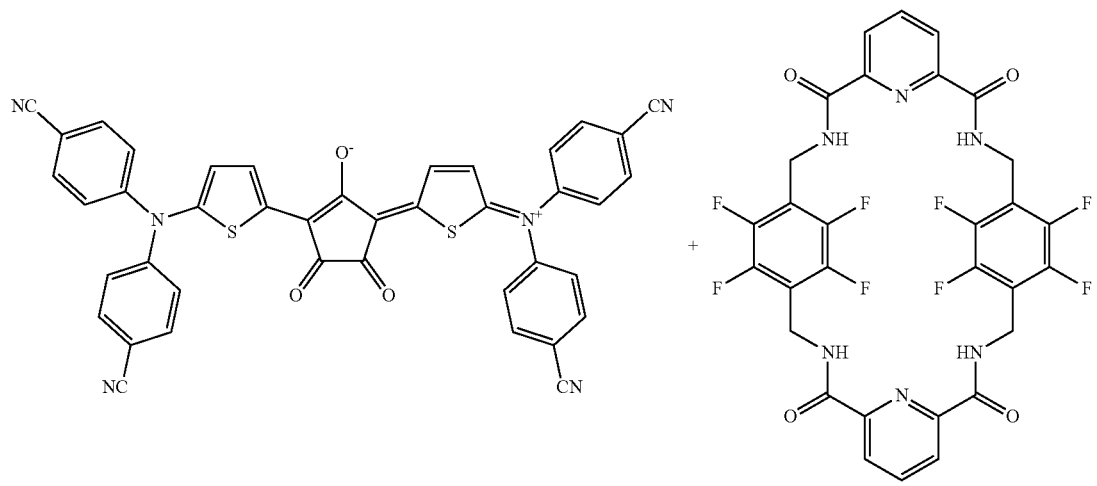
[Chemical Formula 5-24]
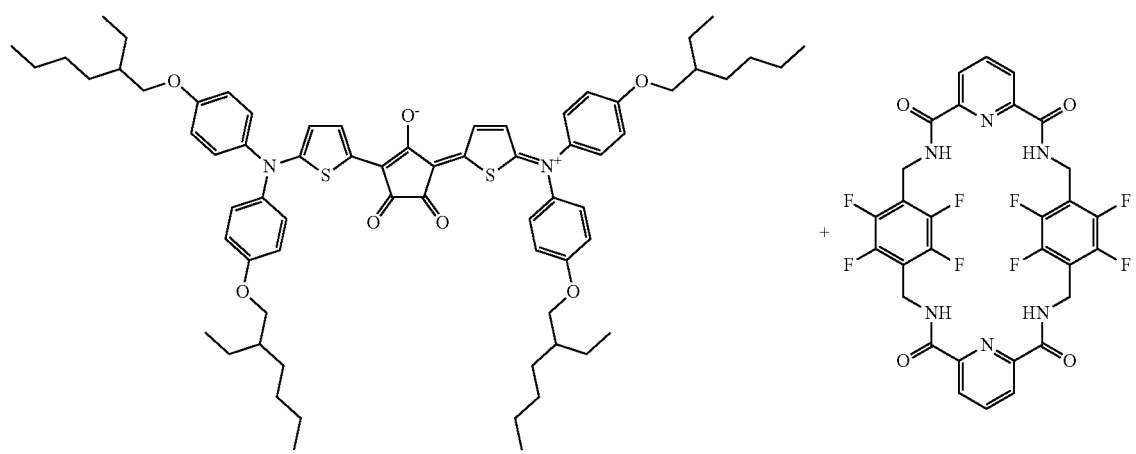
[Chemical Formula 5-25]
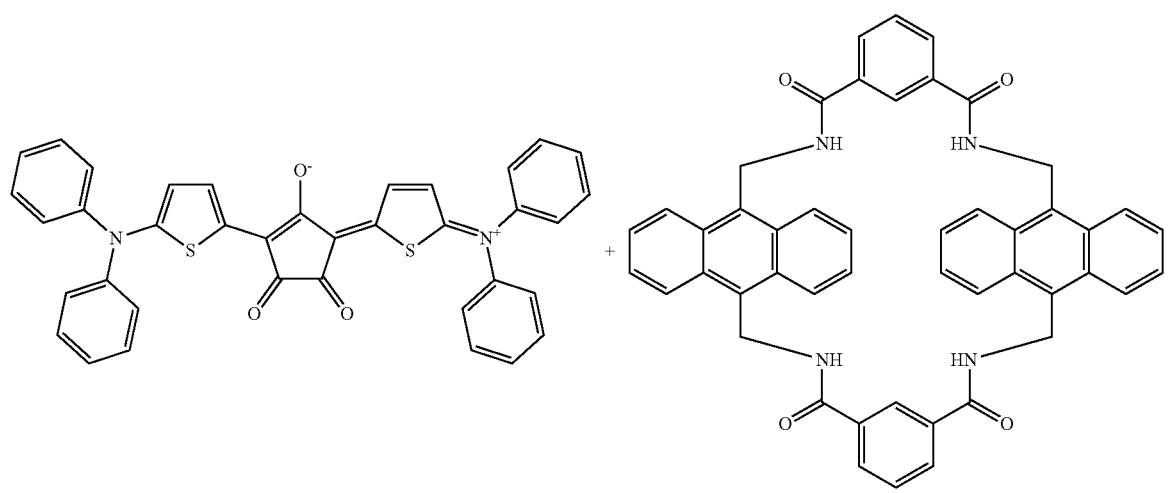

101 102
-continued
[Chemical Formula 5-26]
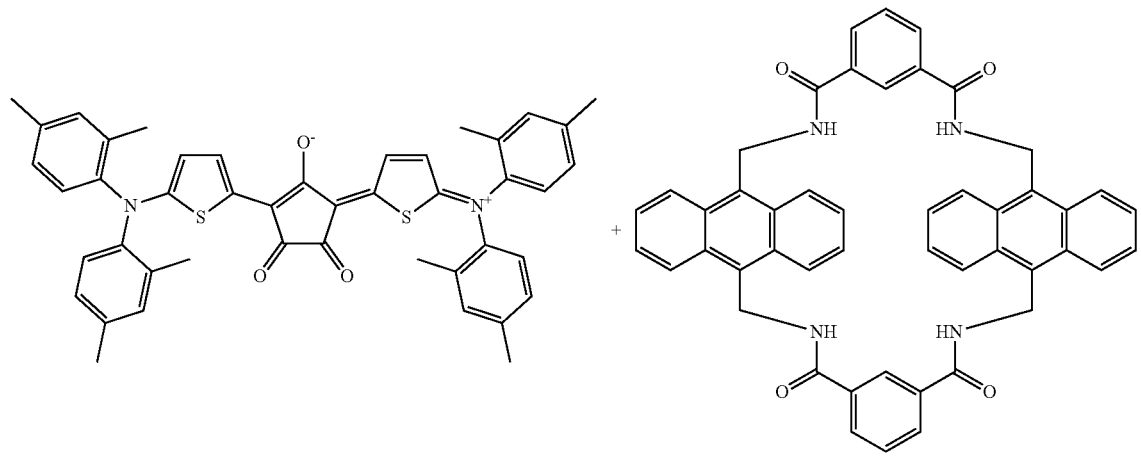
[Chemical Formula 5-27]
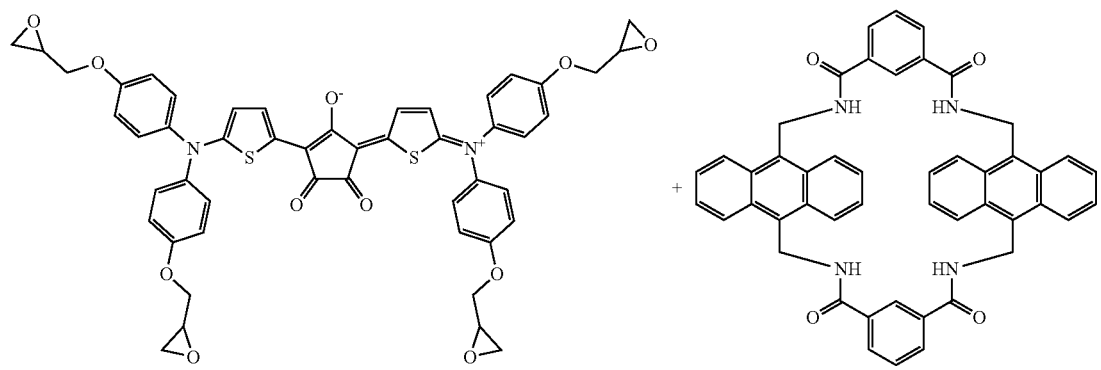
[Chemical Formula 5-28]
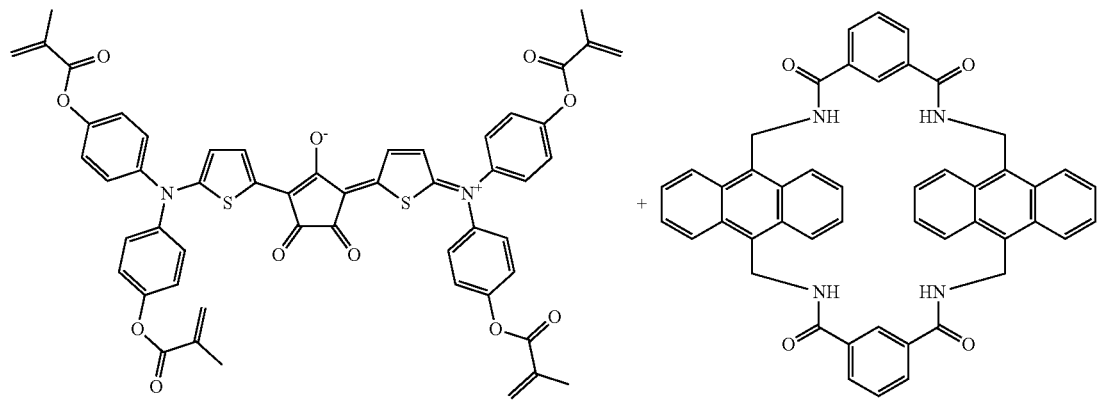

103
104
-continued
[Chemical Formula 5-29]
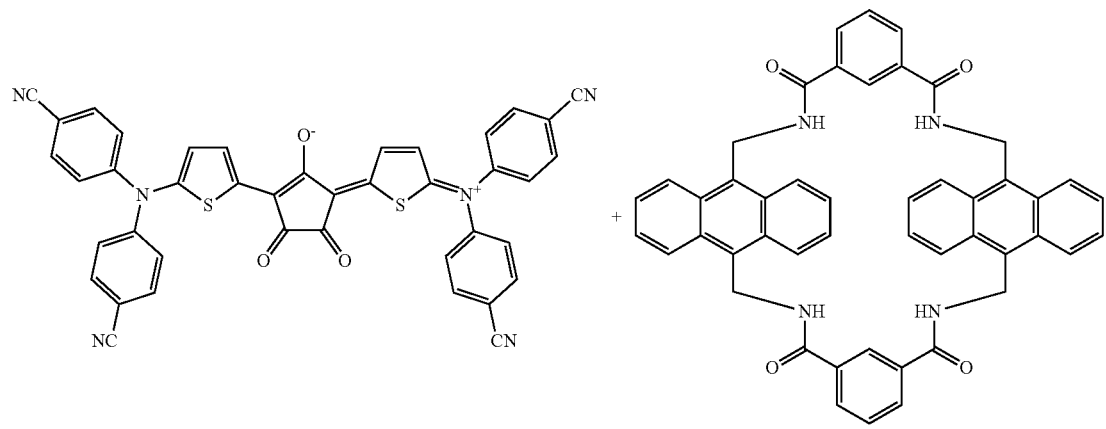
[Chemical Formula 5-30]
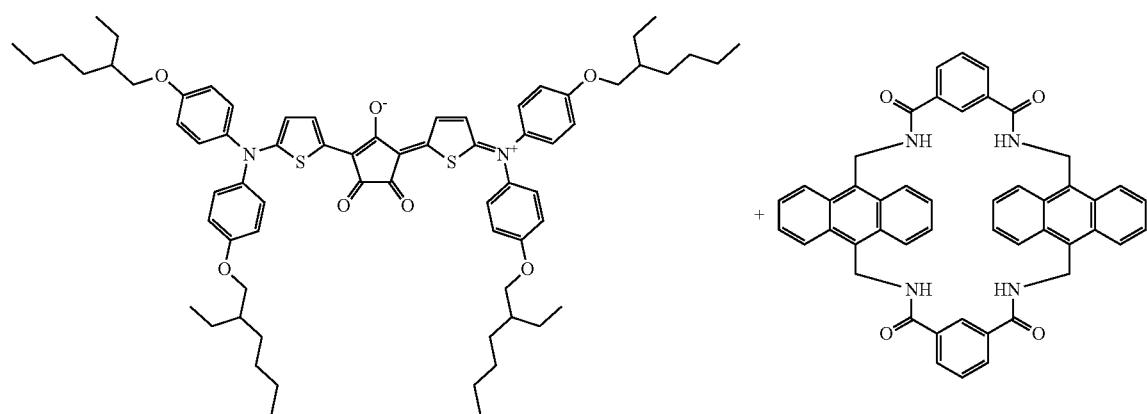
[Chemical Formula 5-31]
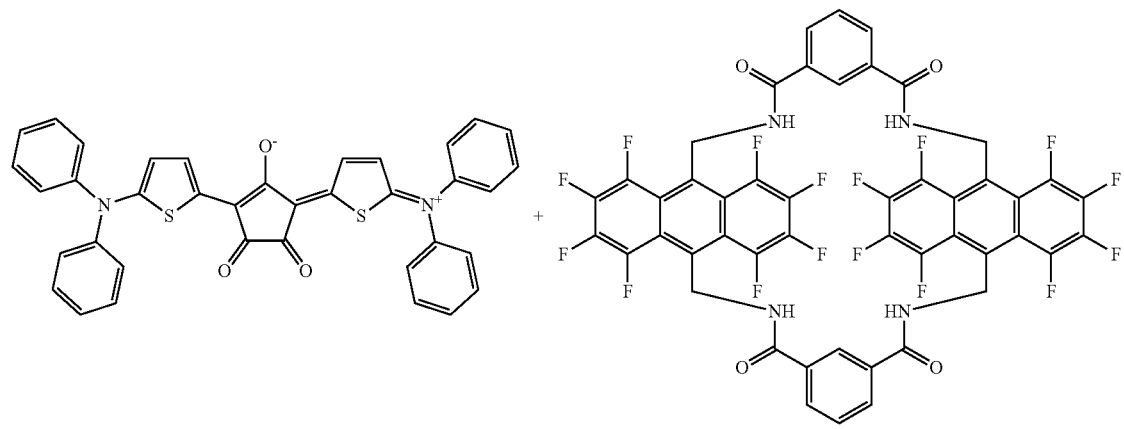

-continued
[Chemical Formula 5-32]
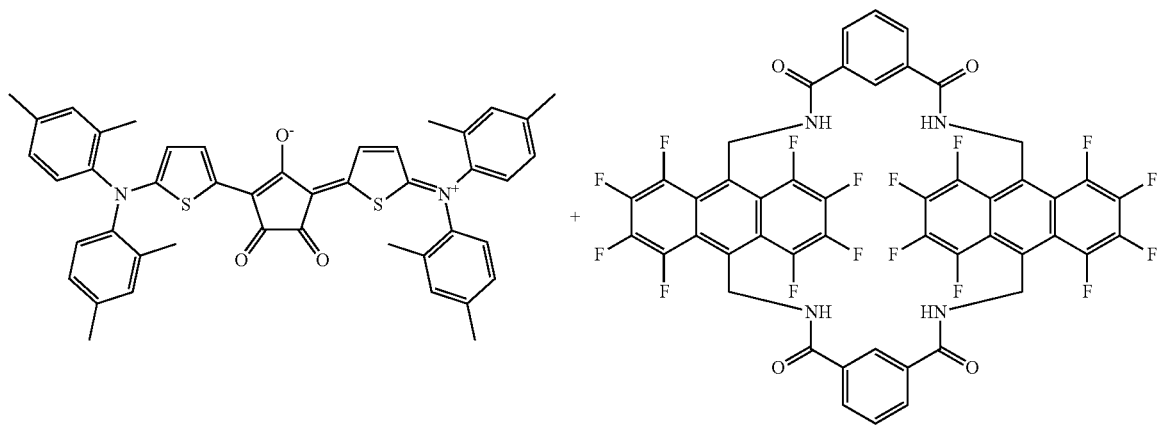
[Chemical Formula 5-33]
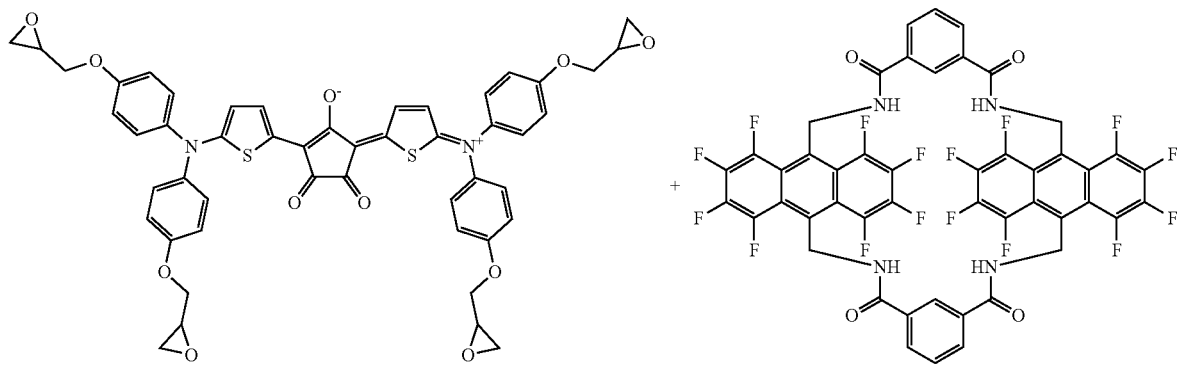
[Chemical Formula 5-34]
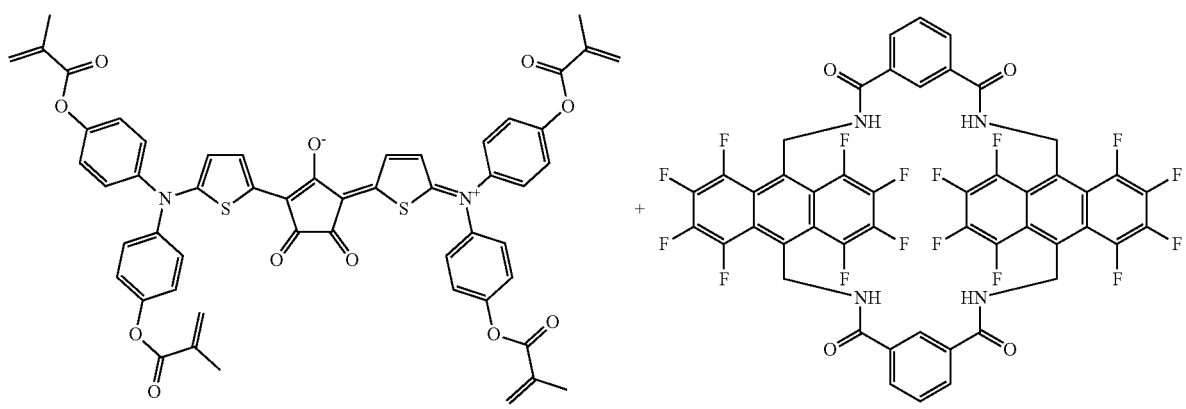

[Chemical Formula 5-35]
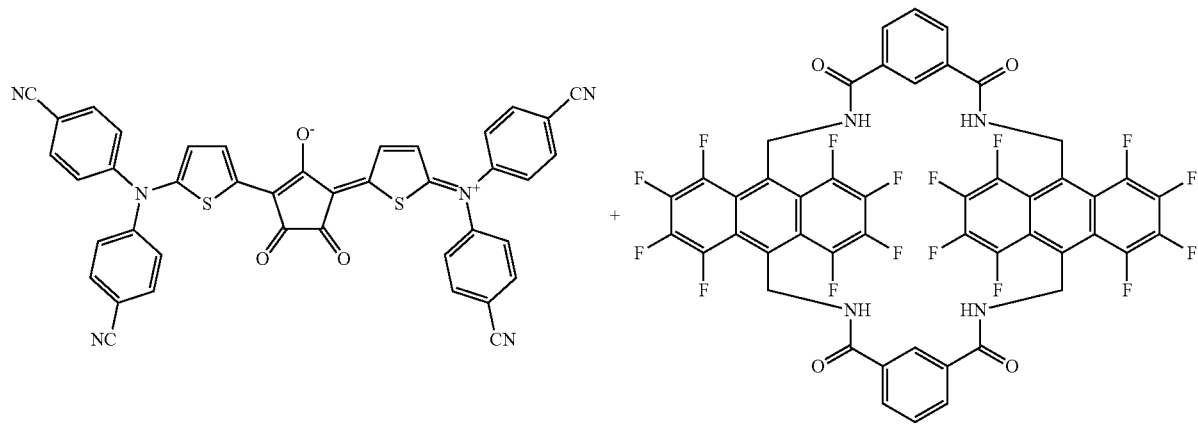
[Chemical Formula 5-36]
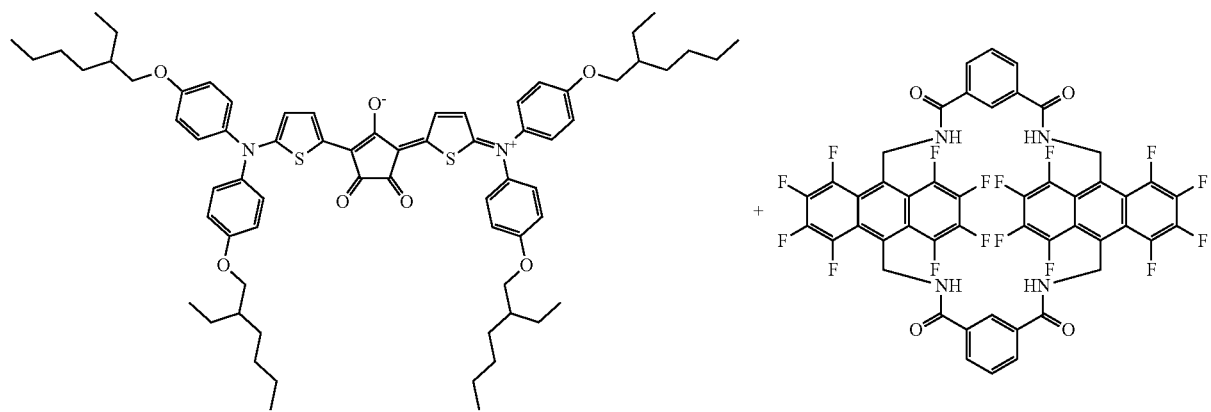
[Chemical Formula 5-37]
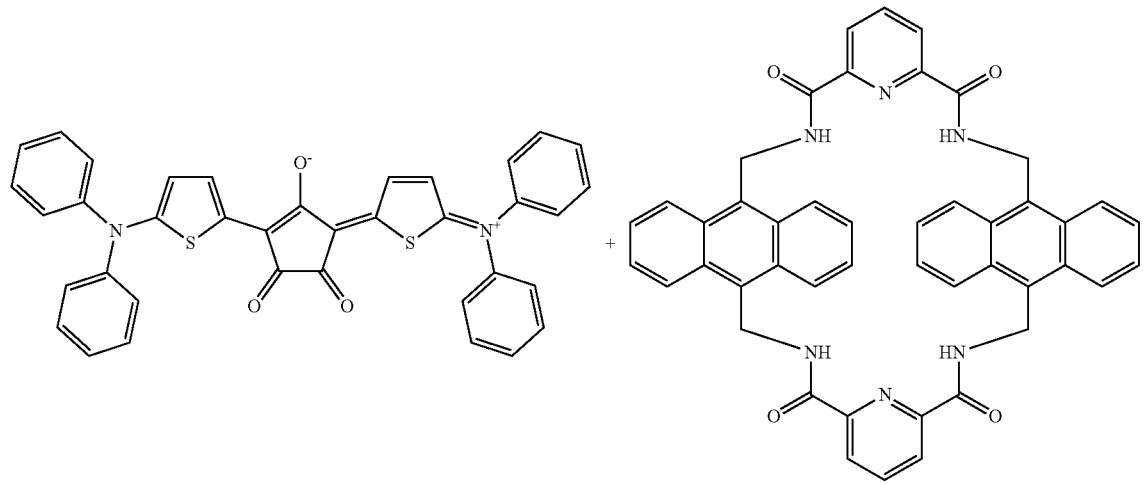

[Chemical Formula 5-38]
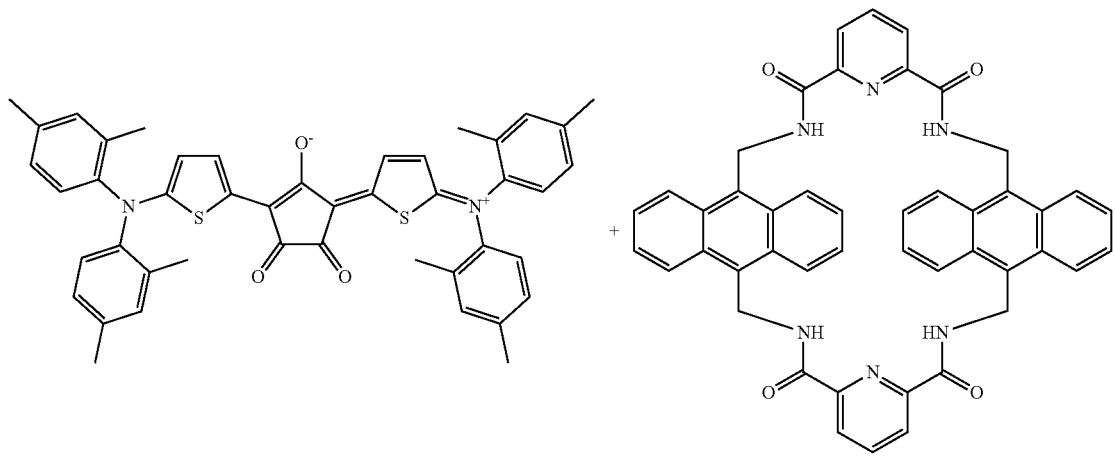
[Chemical Formula 5-39]
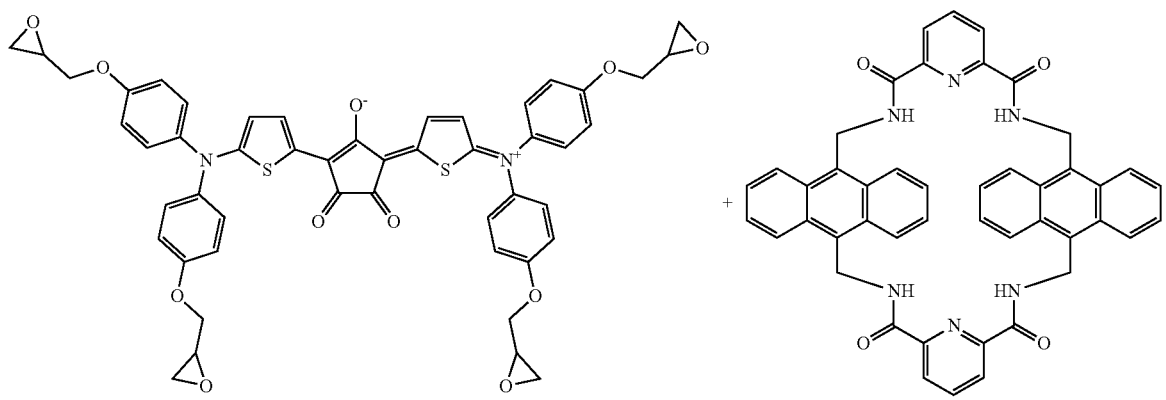
[Chemical Formula 5-40]
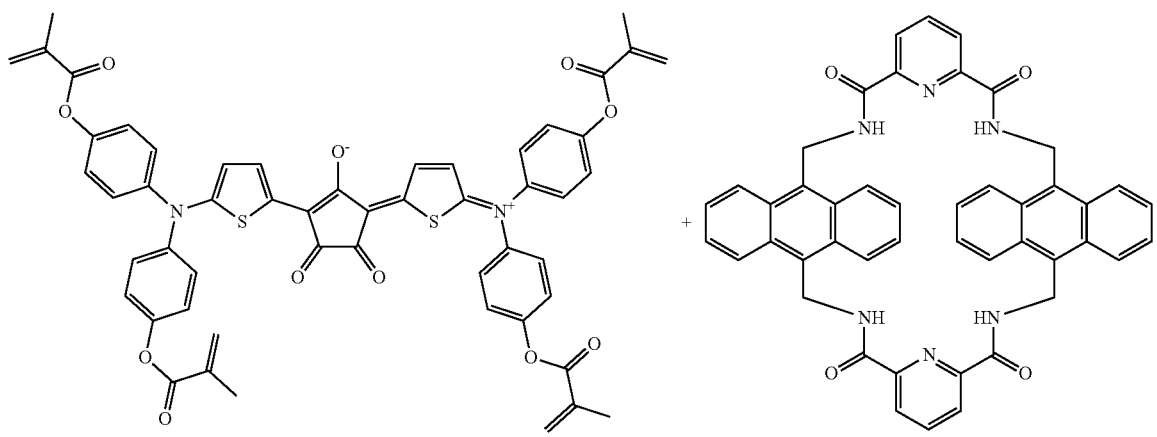

111 112
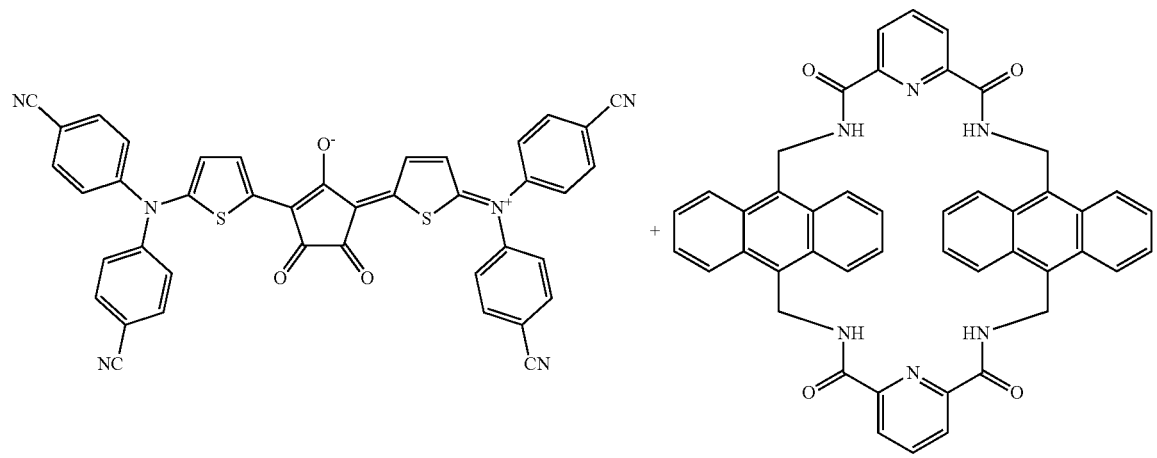
[Chemical Formula 5-41]
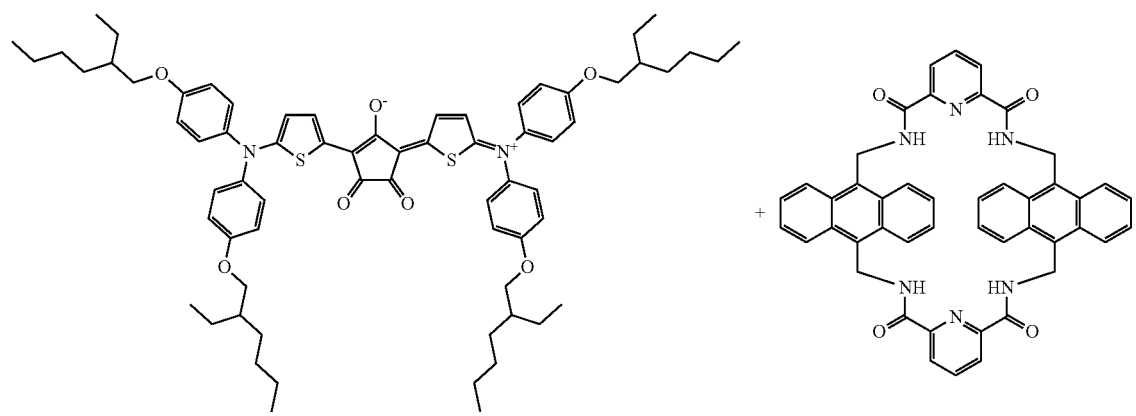
[Chemical Formula 5-42]
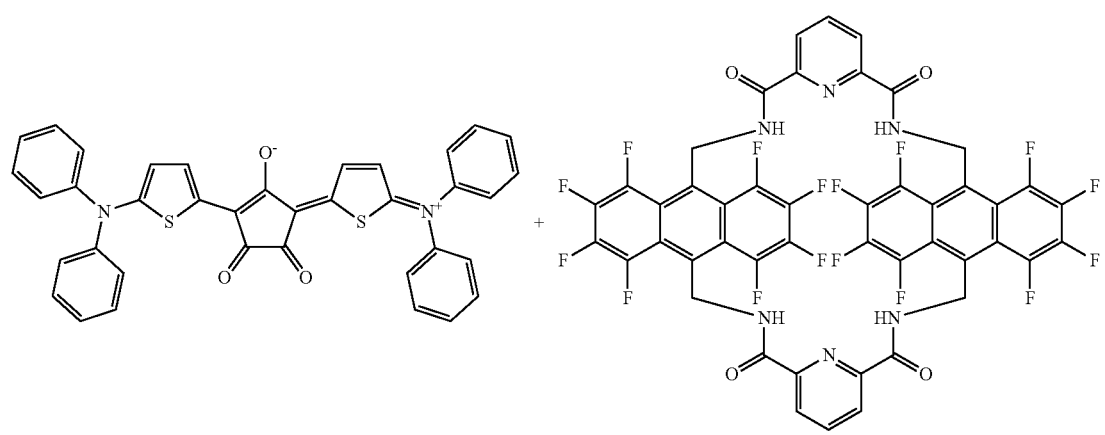
[Chemical Formula 5-43]

[Chemical Formula 5-44]
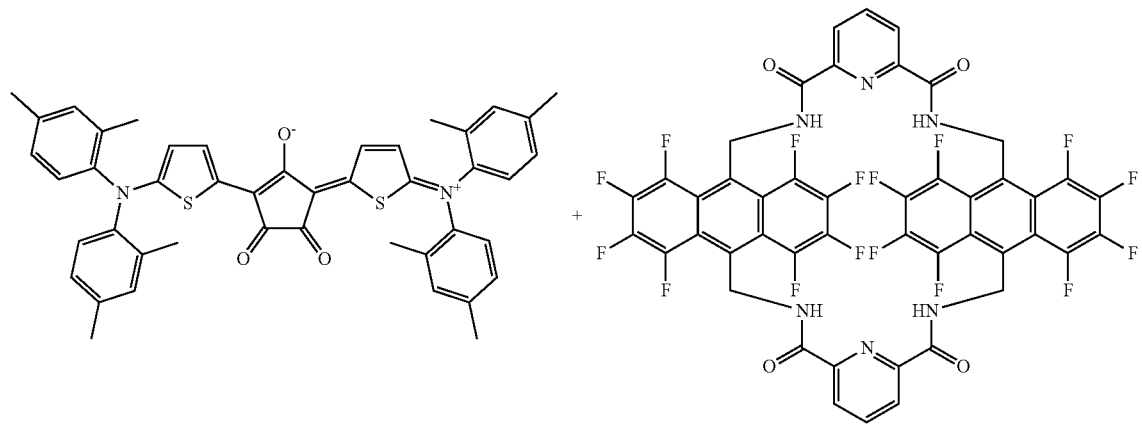
[Chemical Formula 5-45]
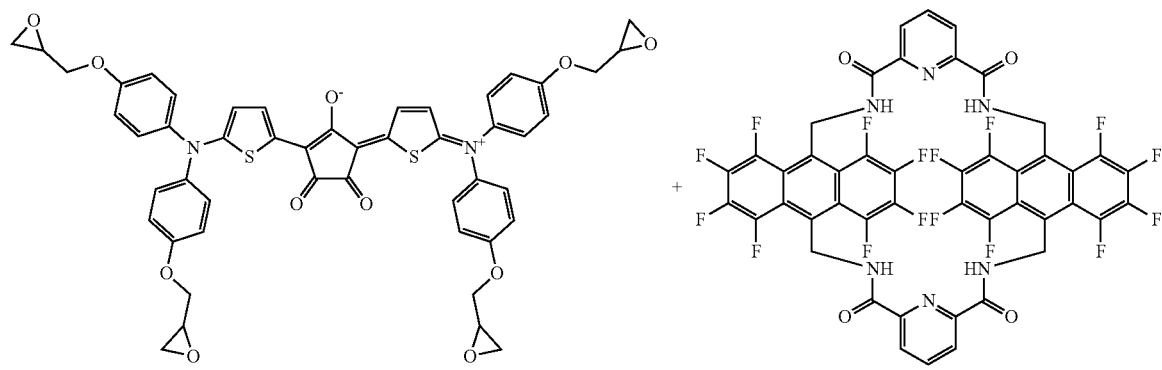
[Chemical Formula 5-46]
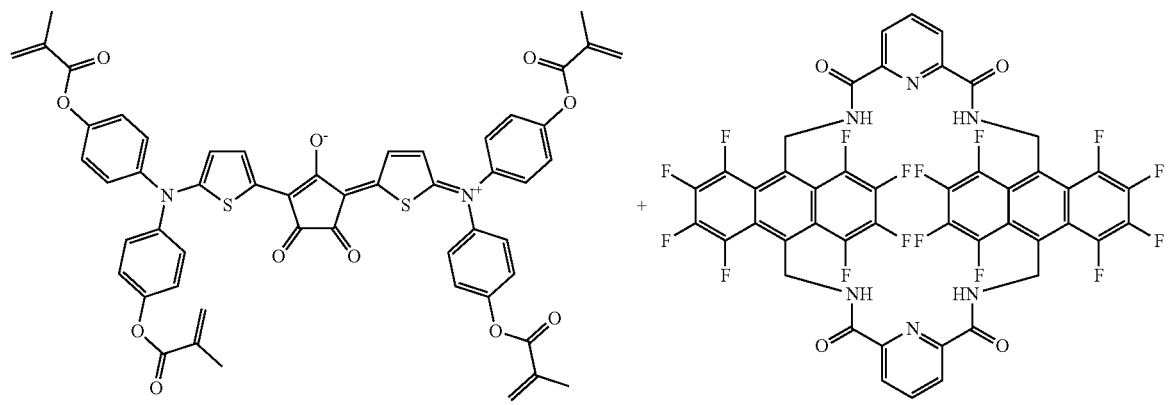

-continued

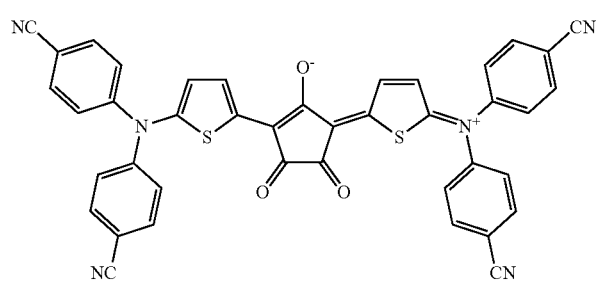

[Chemical Formula 5-47]

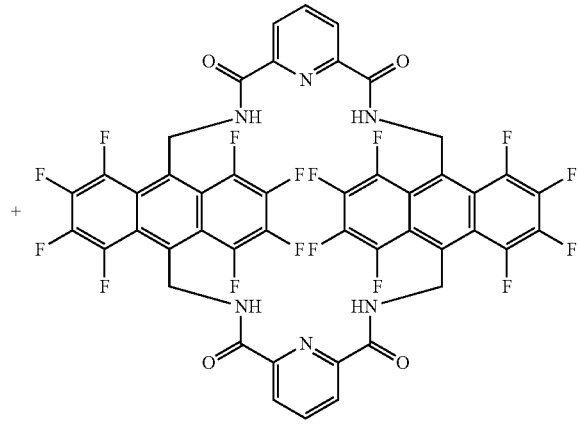

+

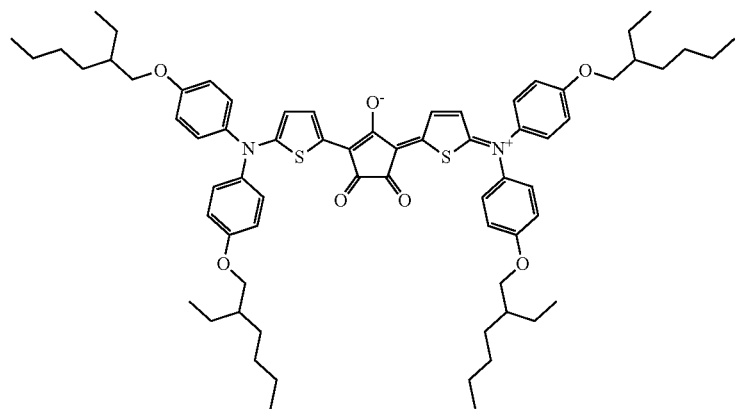

[Chemical Formula 5-48]

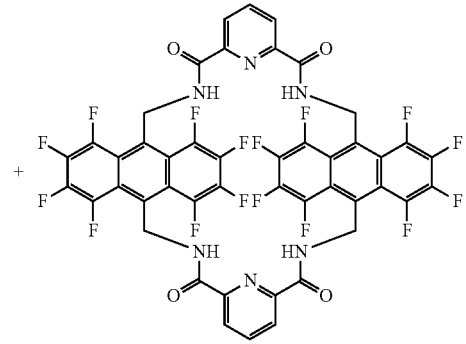

+

21. The core-shell dye as claimed in claim 1, wherein the core has a maximum absorption peak at a wavelength of about 750 nm to about 850 nm.

22. The core-shell dye as claimed in claim 21, wherein the core-shell dye has a maximum absorption peak in a wavelength of about 800 nm to about 1,000 nm.

23. The core-shell dye as claimed in claim 1, wherein the core-shell dye is a near-infrared absorbing dye.

24. A near-infrared absorbing resin composition comprising the core-shell dye as claimed in claim 1.

25. The near-infrared absorbing resin composition as claimed in claim 24, further comprising a binder resin and a solvent.

26. The near-infrared absorbing resin composition as claimed in claim 24, wherein the near-infrared absorbing resin composition is for a CMOS image sensor.

27. A near-infrared absorbing film manufactured by using the near-infrared absorbing resin composition as claimed in claim 24.

28. An optical filter comprising the near-infrared absorbing film as claimed in claim 27.

29. A CMOS image sensor comprising the optical filter as claimed in claim 28.

* * * * *